Dec. 16, 1969  L. D. BARRY  3,483,829
CONTAINER, ROUTING STORAGE, AND TRANSFER SYSTEM
Filed Oct. 14, 1966  32 Sheets-Sheet 1
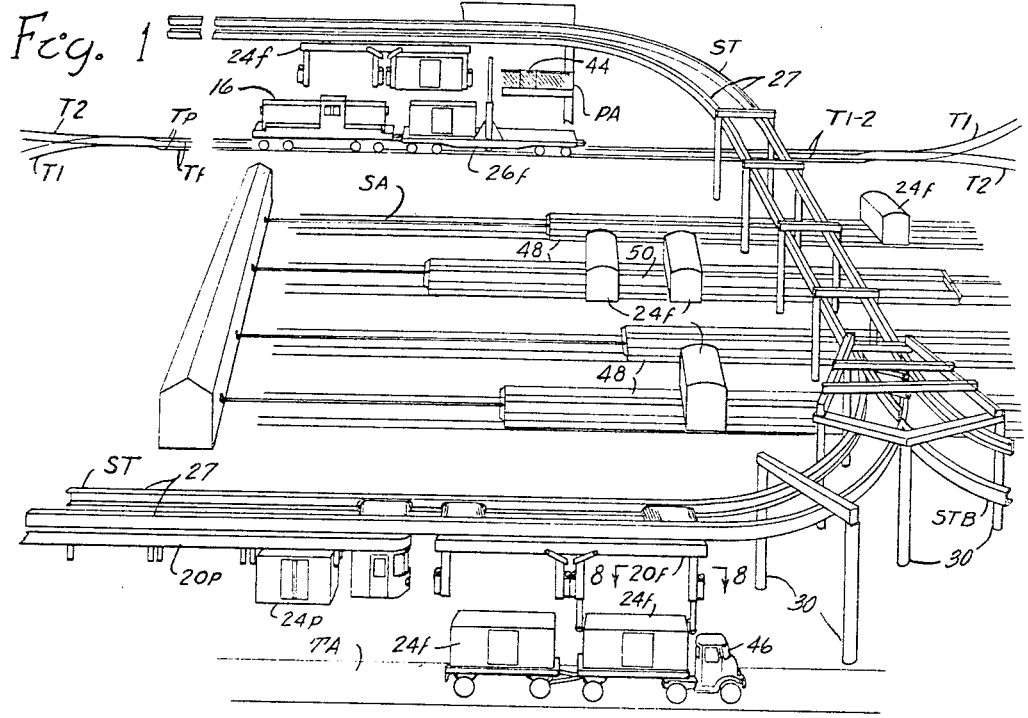
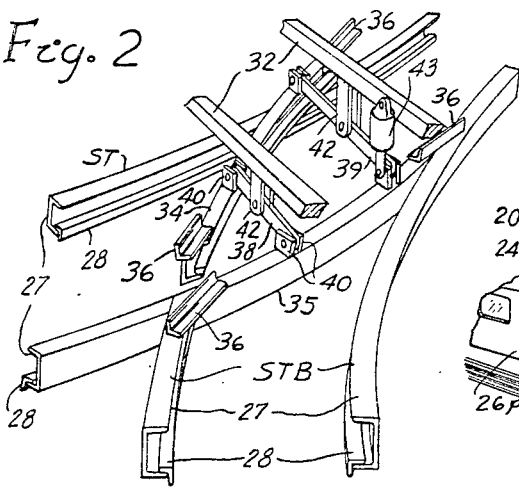
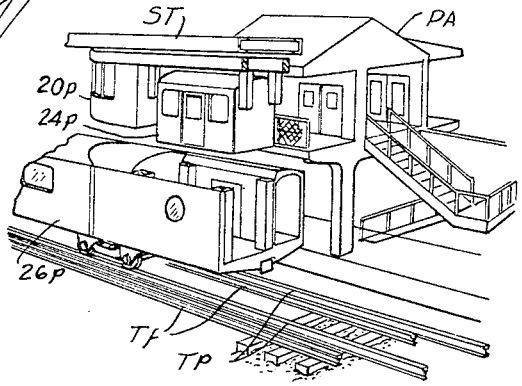
INVENTOR.
Leonard D. Barry Dec. 16, 1969   L. D. BARRY   3,483,829
CONTAINER, ROUTING STORAGE, AND TRANSFER SYSTEM
Filed Oct. 14, 1966   52 Sheets-Sheet 2
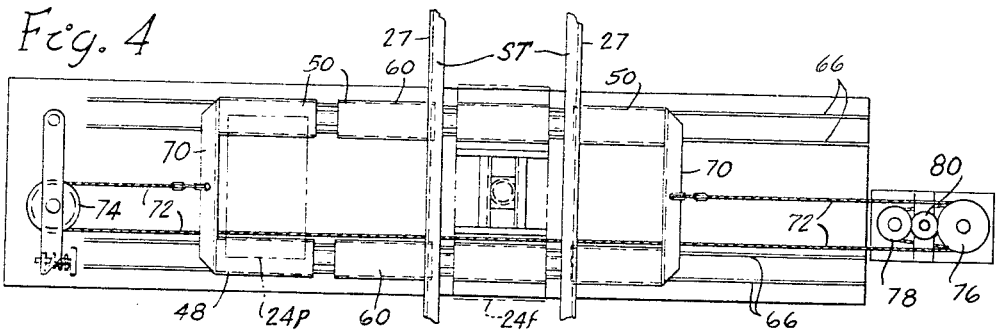
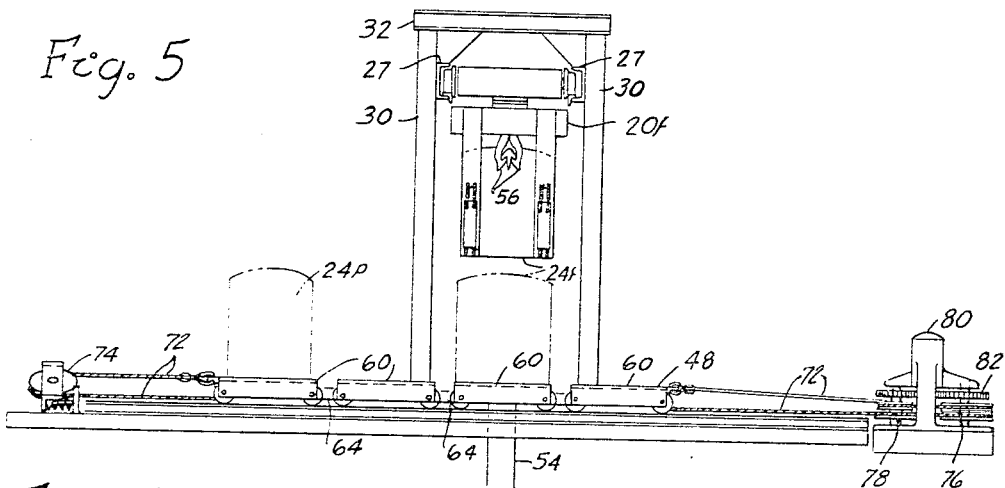
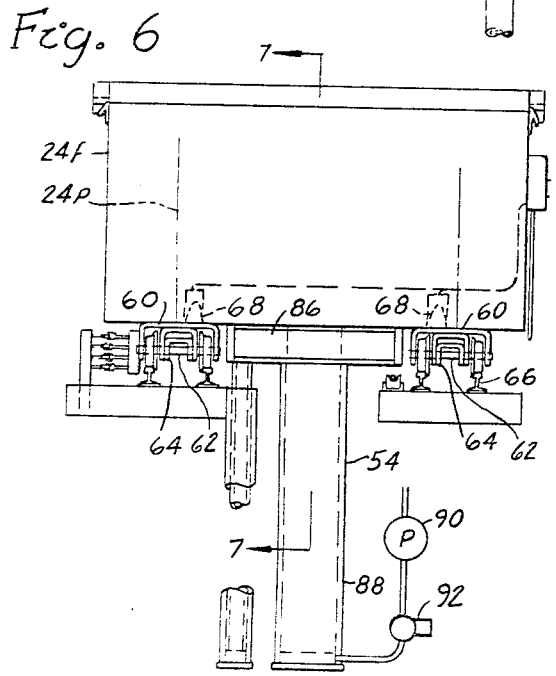
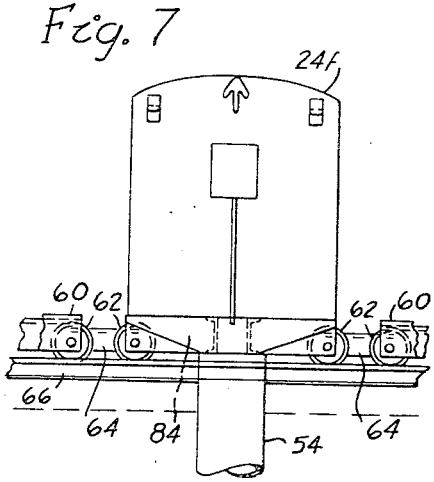
INVENTOR.
Leonard D. Barry

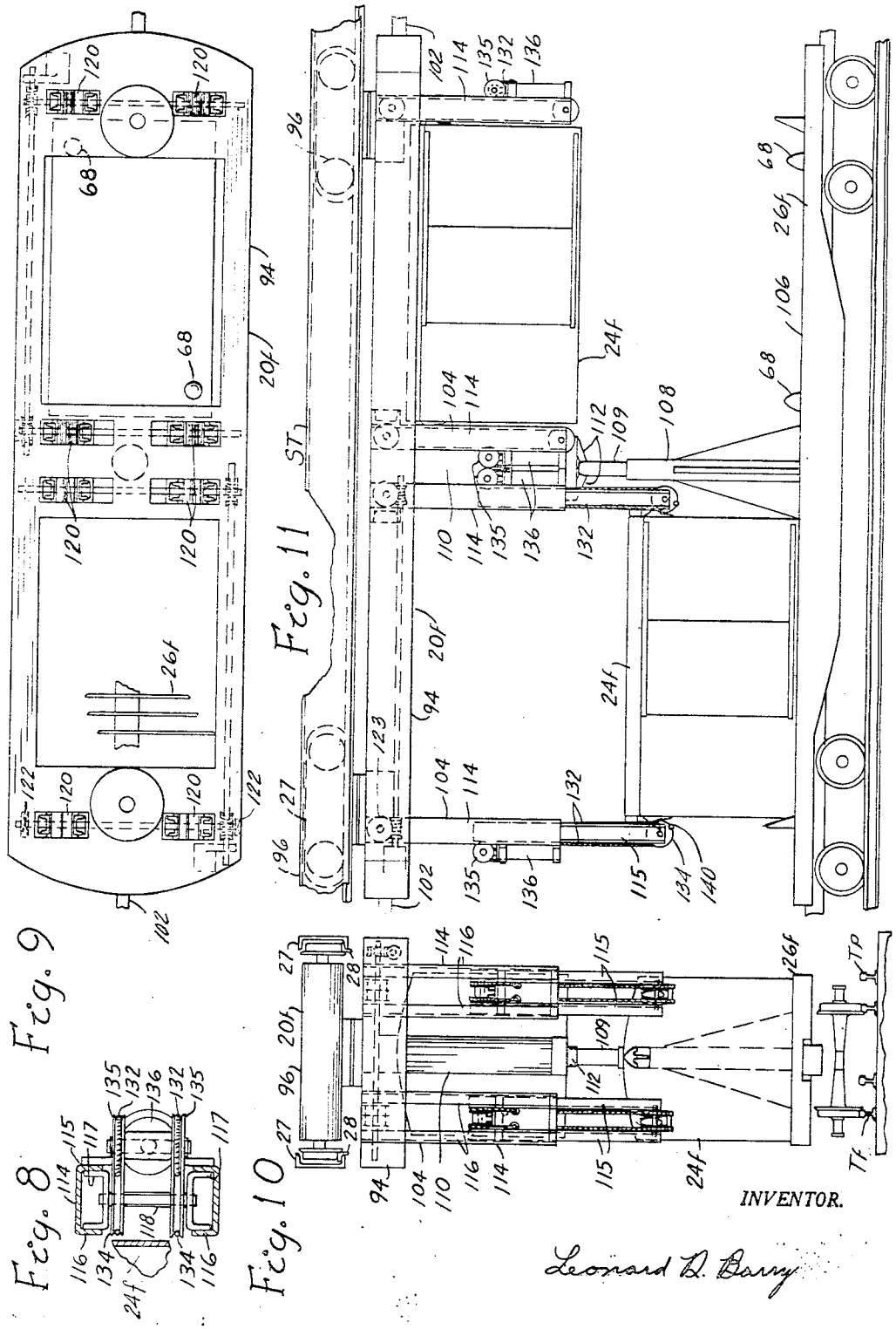

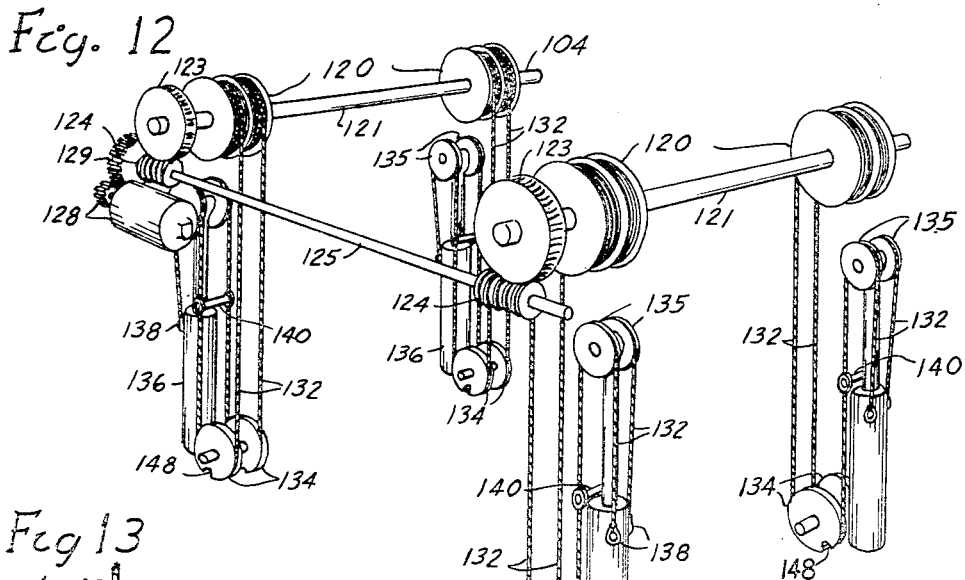
Fig. 12
Fig. 13
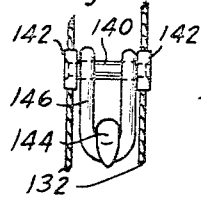
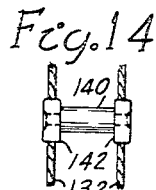
Fig. 14
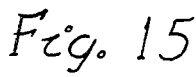
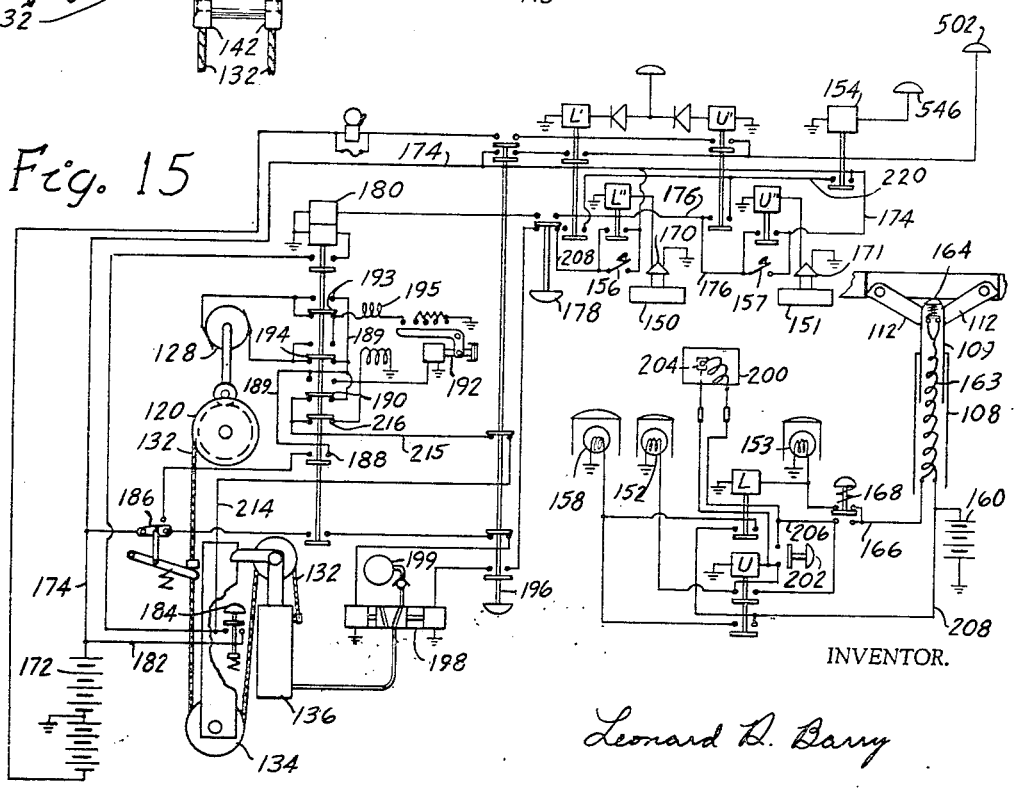
Fig. 15
INVENTOR.
Leonard D. Barry Dec. 16, 1969 L. D. BARRY 3,483,829
CONTAINER, ROUTING STORAGE, AND TRANSFER SYSTEM
Filed Oct. 14, 1966 52 Sheets-Sheet 5
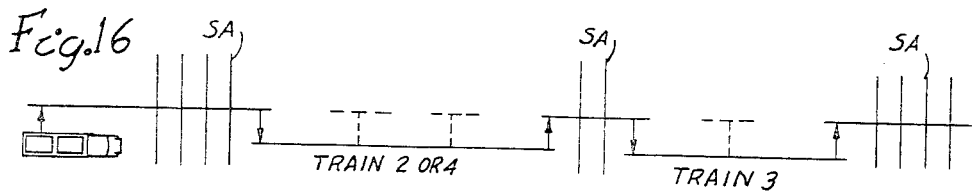
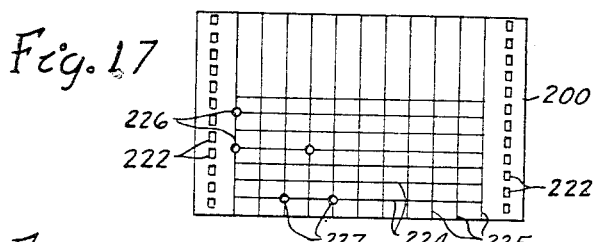
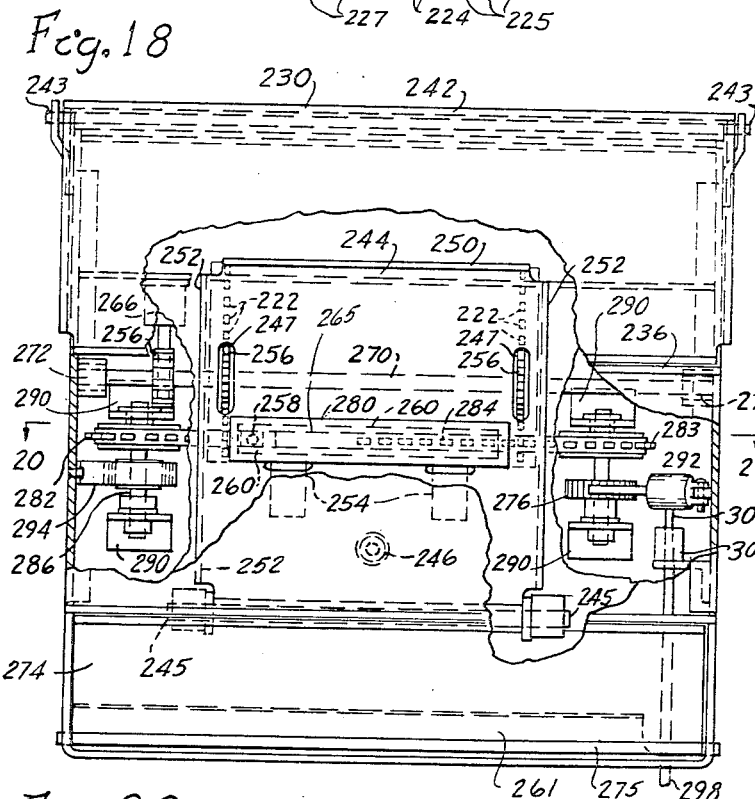
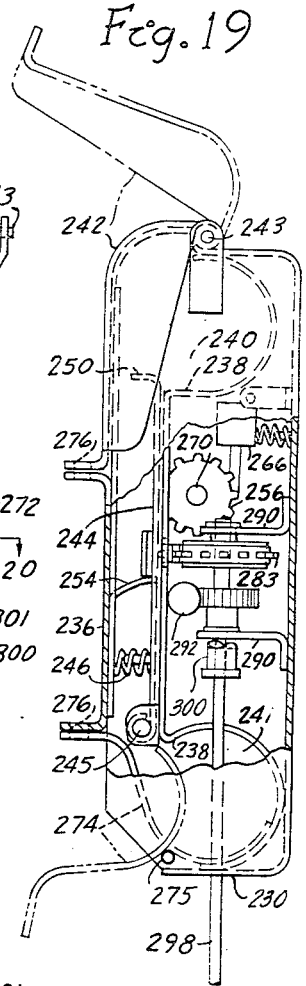
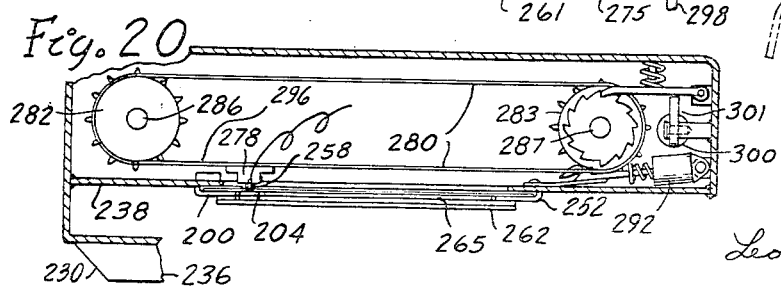
INVENTOR.
Leonard D. Barry

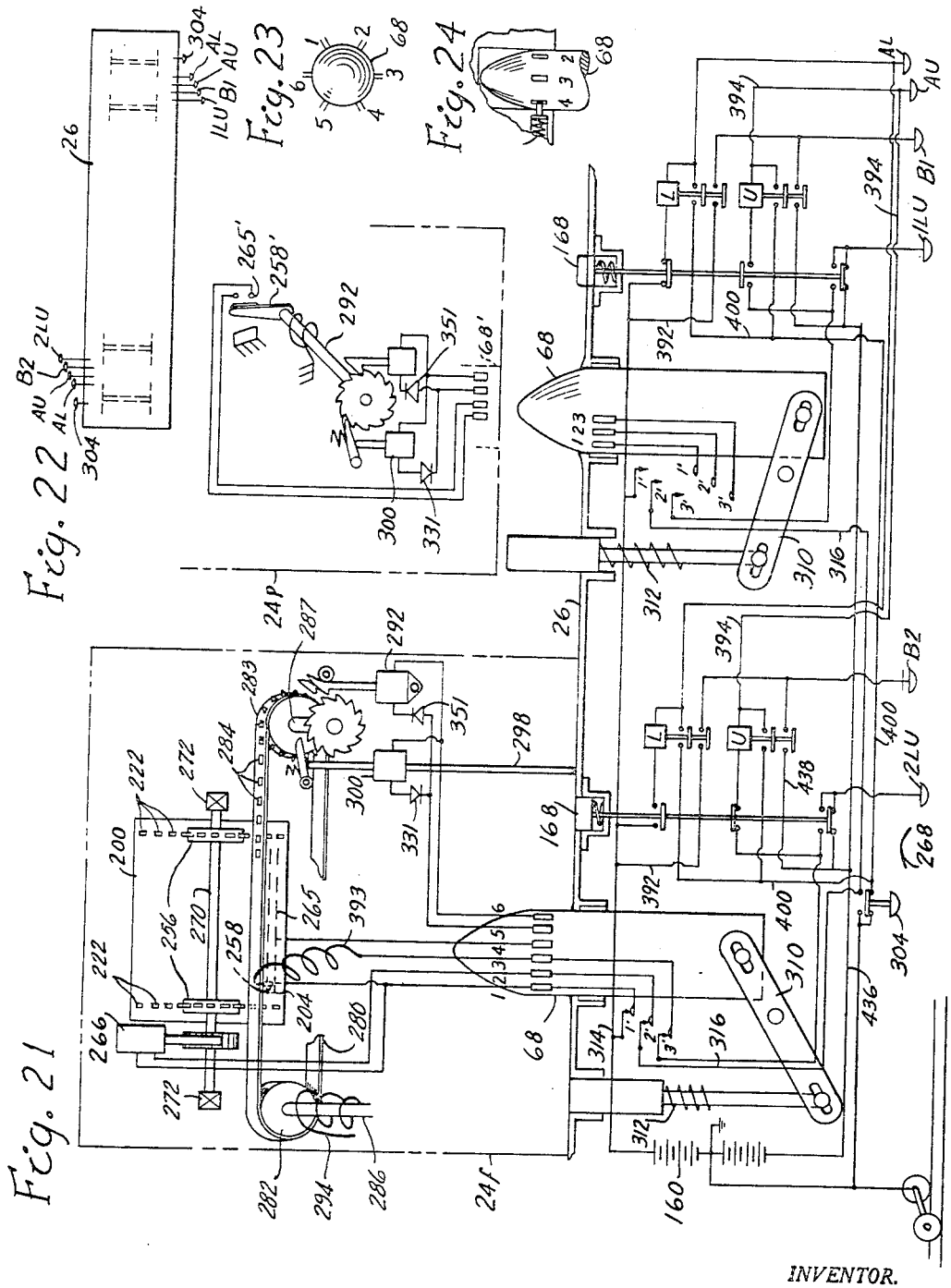

Dec. 16, 1969     L. D. BARRY     3,483,829
CONTAINER, ROUTING STORAGE, AND TRANSFER SYSTEM
Filed Oct. 14, 1966     32 Sheets-Sheet 7

INVENTOR.
Leonard D. Barry

Dec. 16, 1969 L. D. BARRY 3,483,829
CONTAINER, ROUTING STORAGE, AND TRANSFER SYSTEM
Filed Oct. 14, 1966 32 Sheets-Sheet 8

Fig. 27 WAY POINT 5

Fig. 28 WAY POINT 7

INVENTOR.
Leonard D. Barry

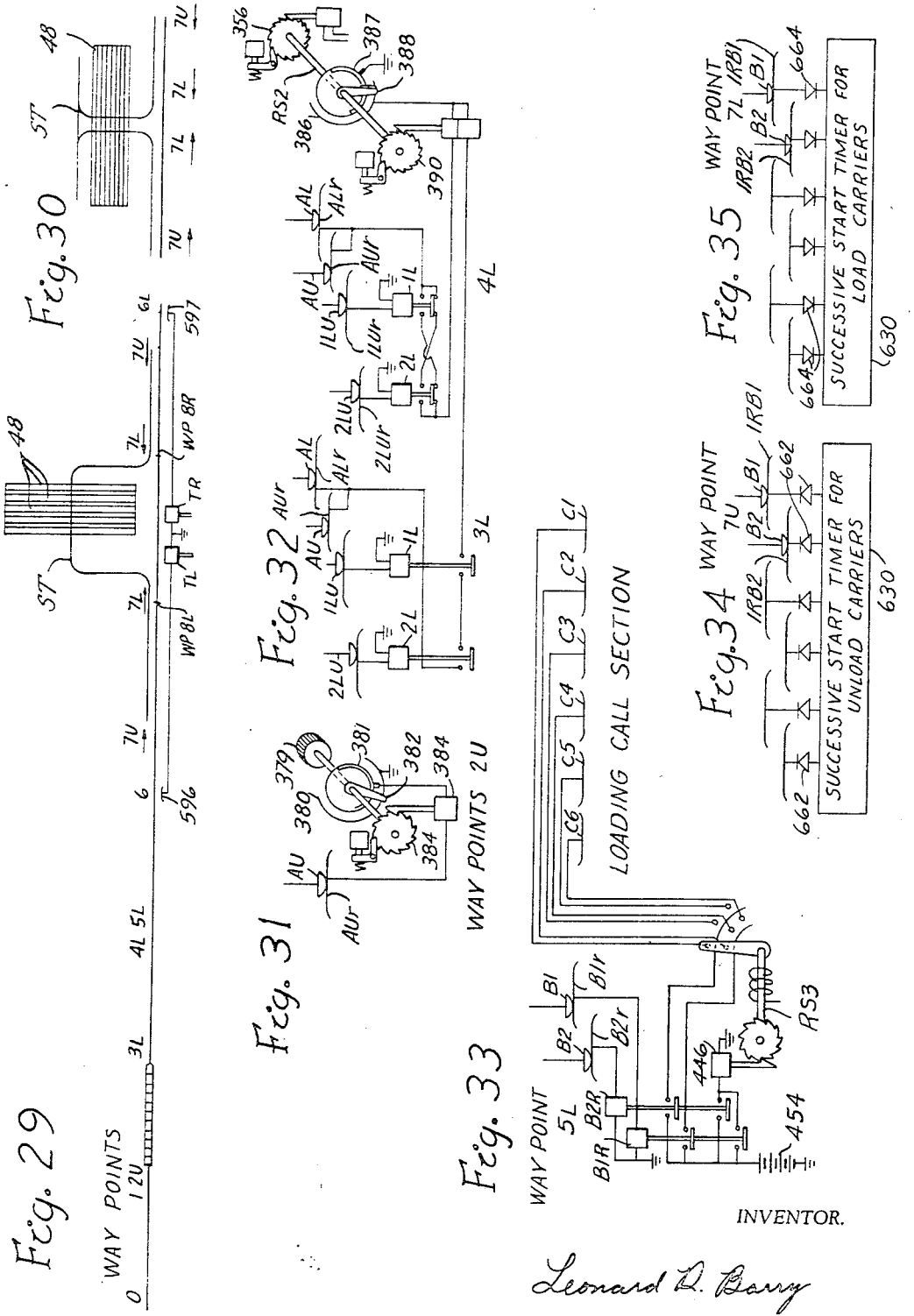

Fig. 36

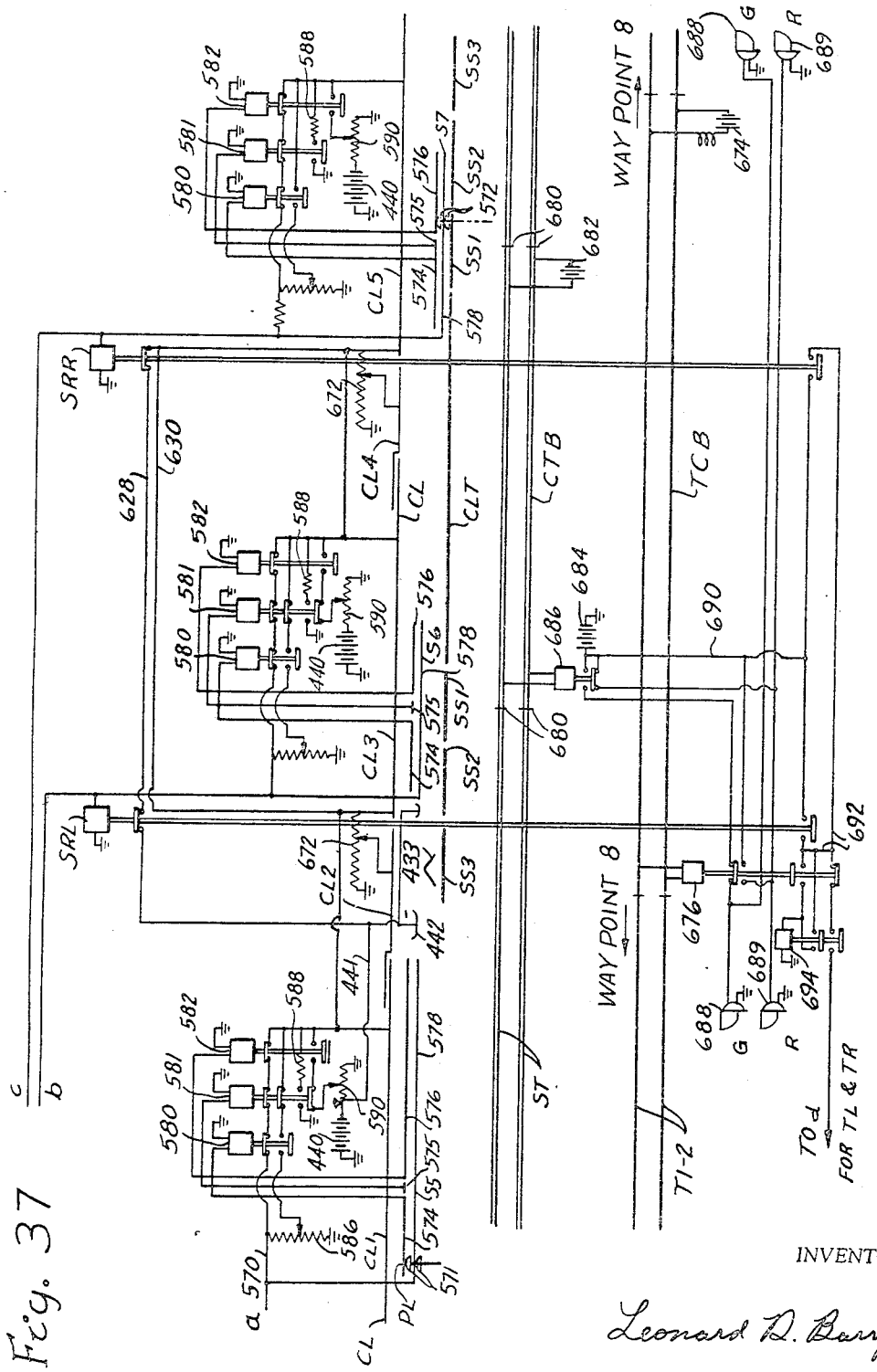

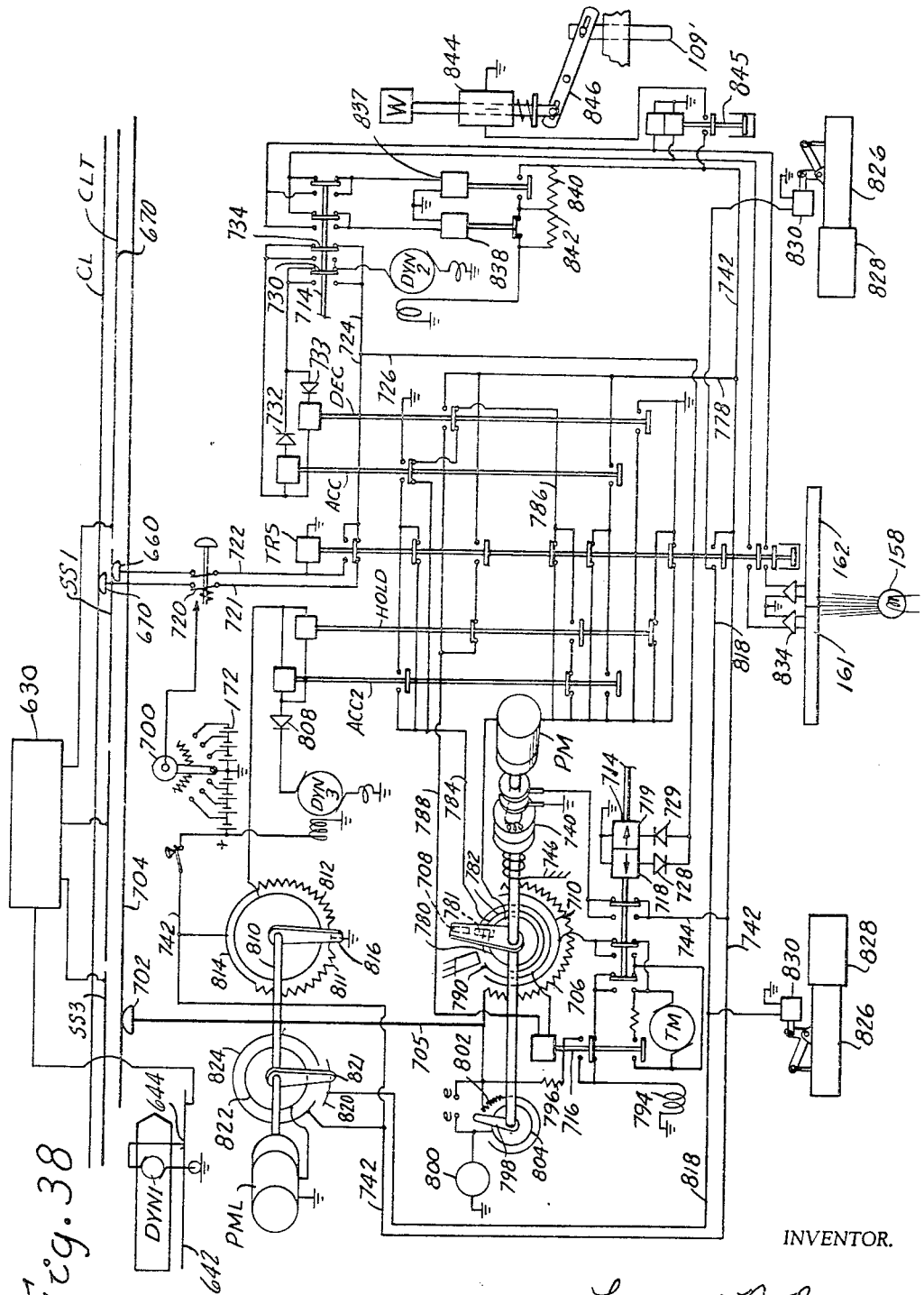

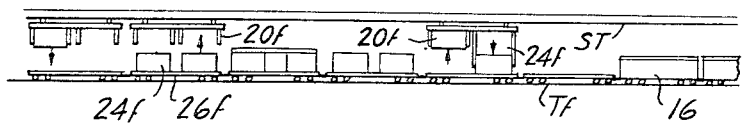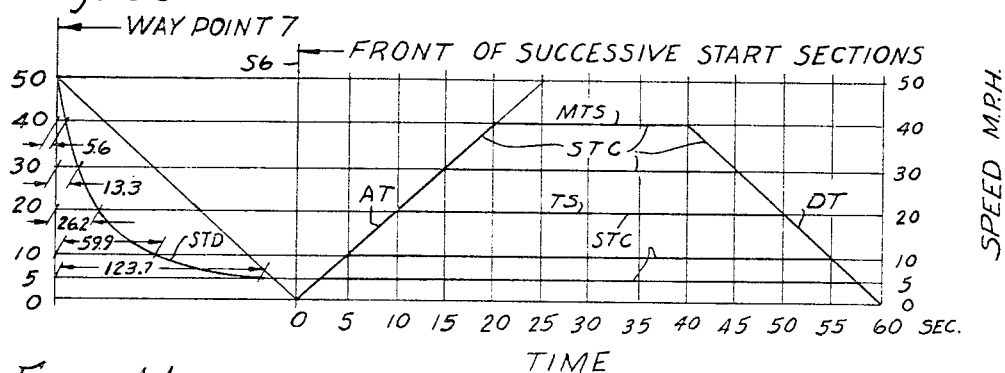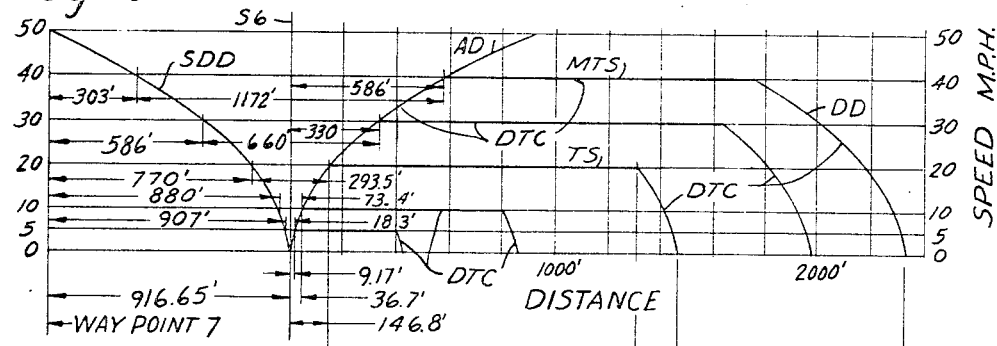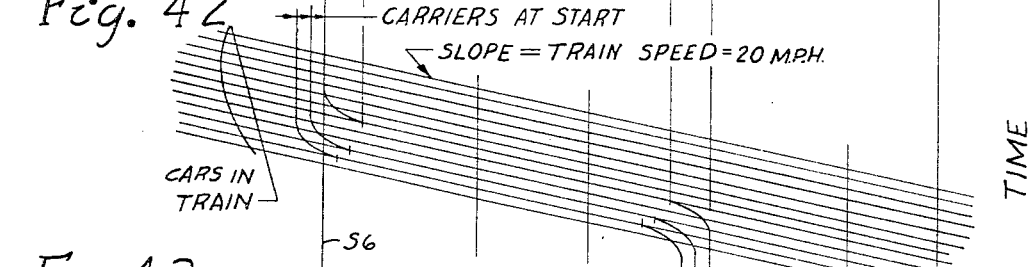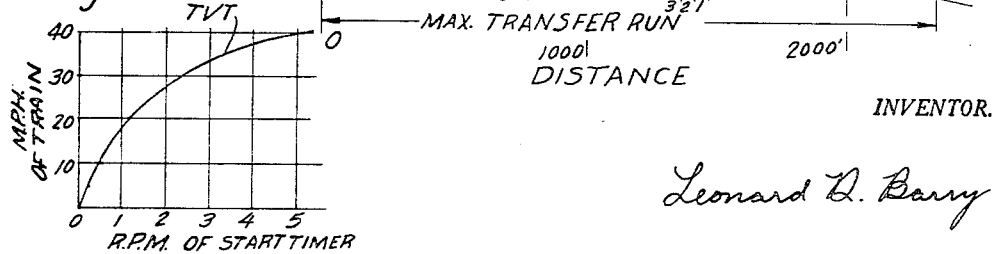

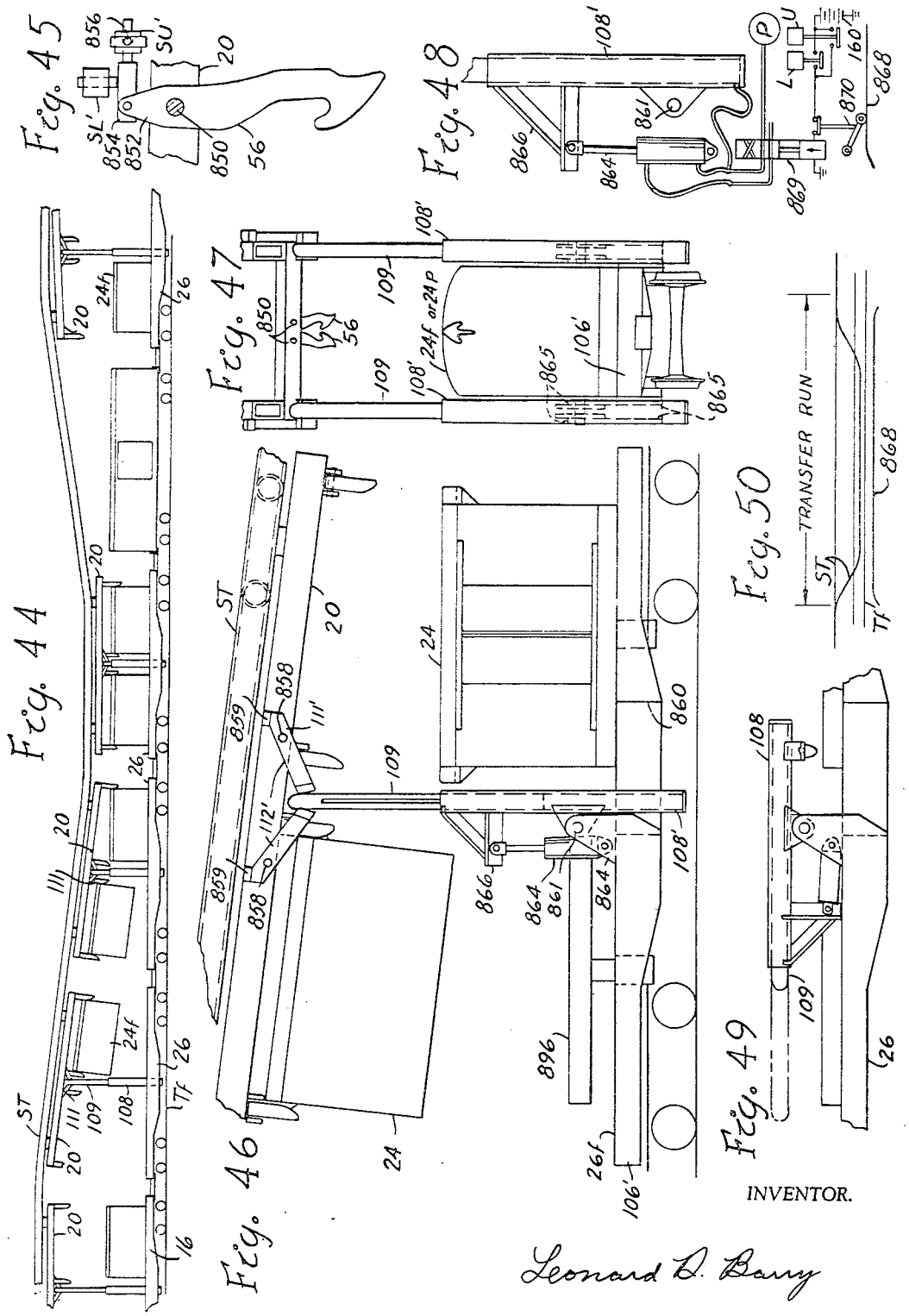

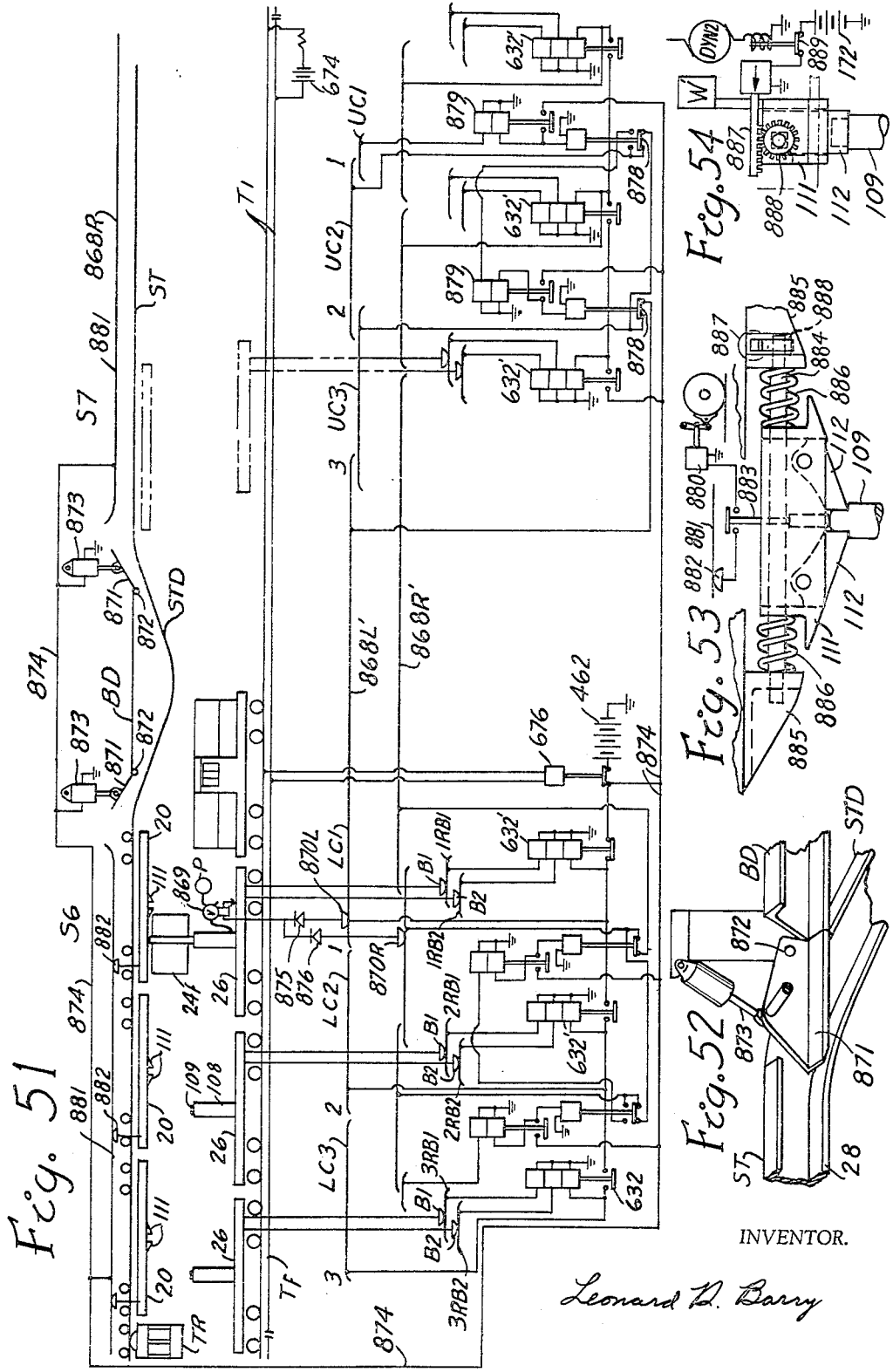

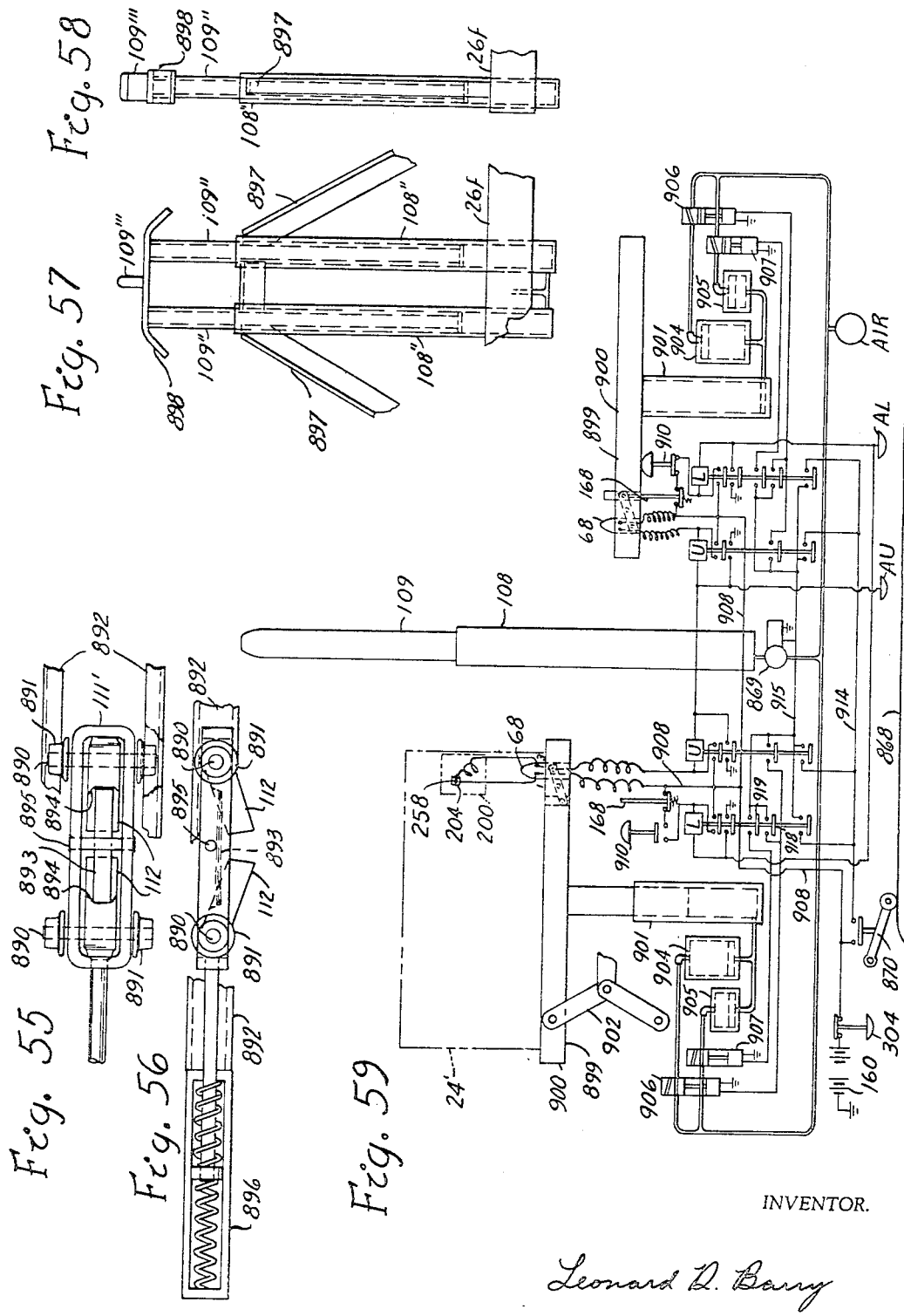

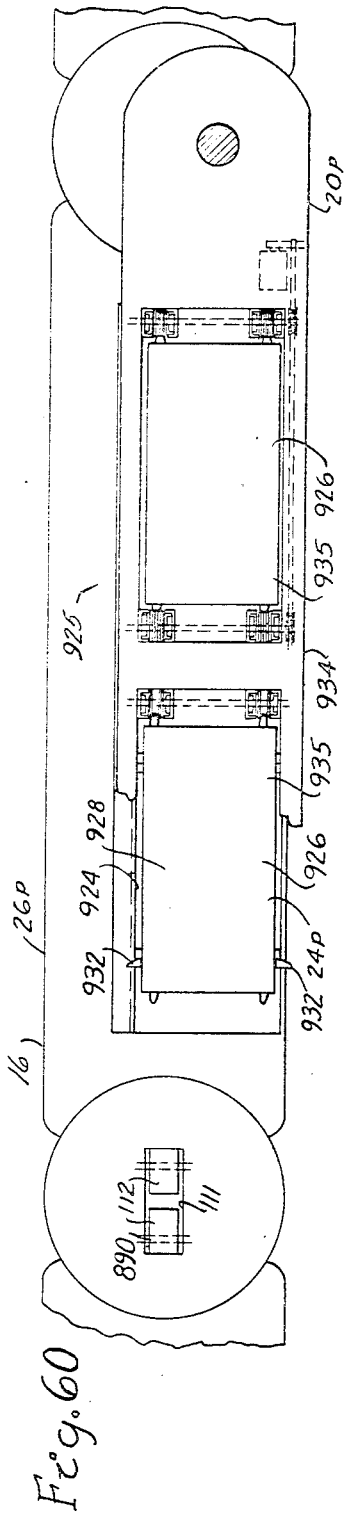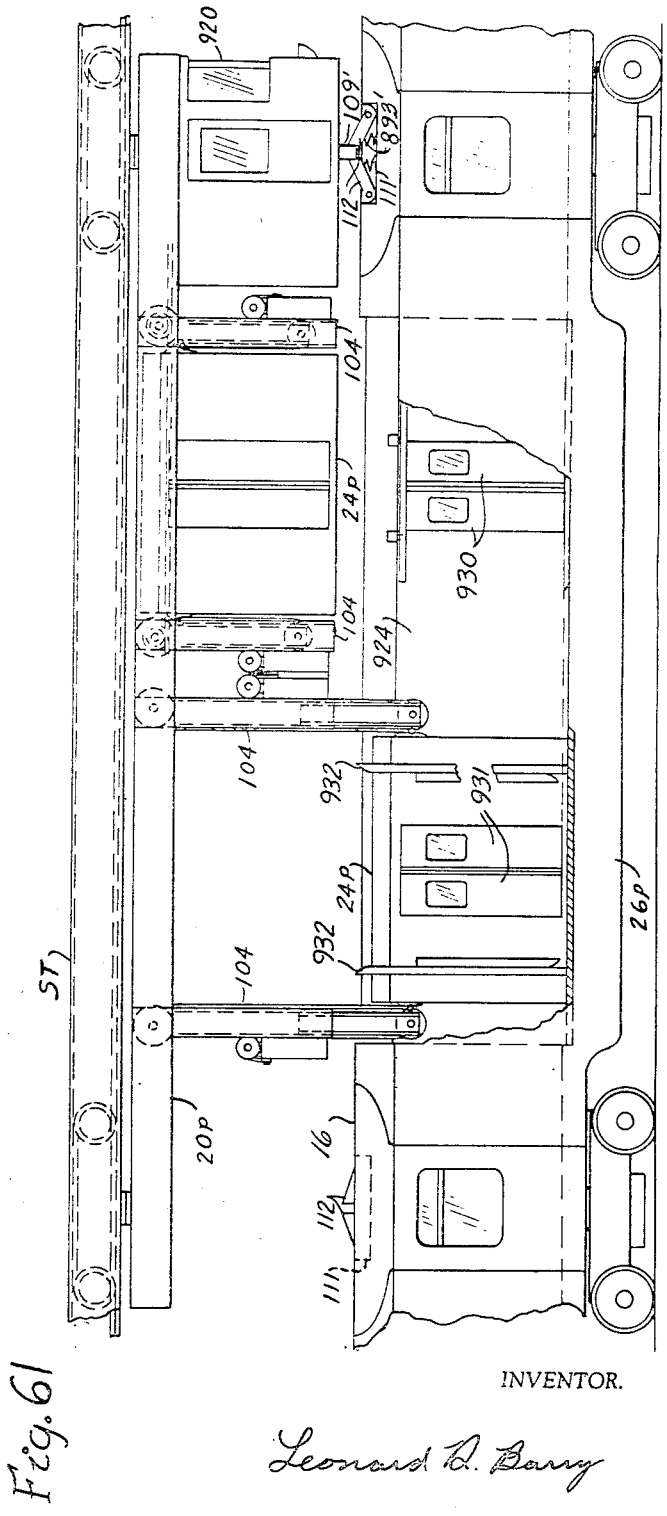

Dec. 16, 1969          L. D. BARRY          3,483,829
CONTAINER, ROUTING STORAGE, AND TRANSFER SYSTEM
Filed Oct. 14, 1966          32 Sheets—Sheet 18
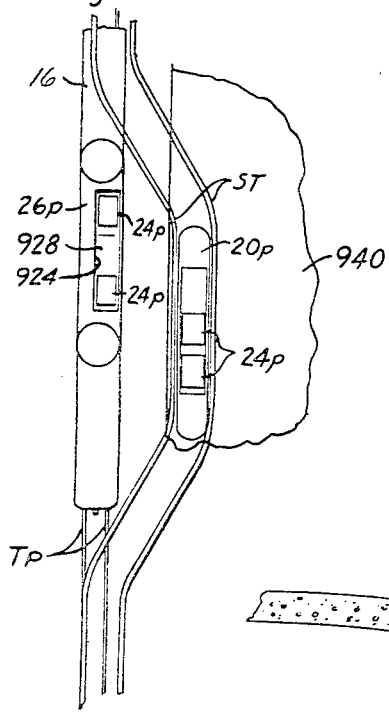
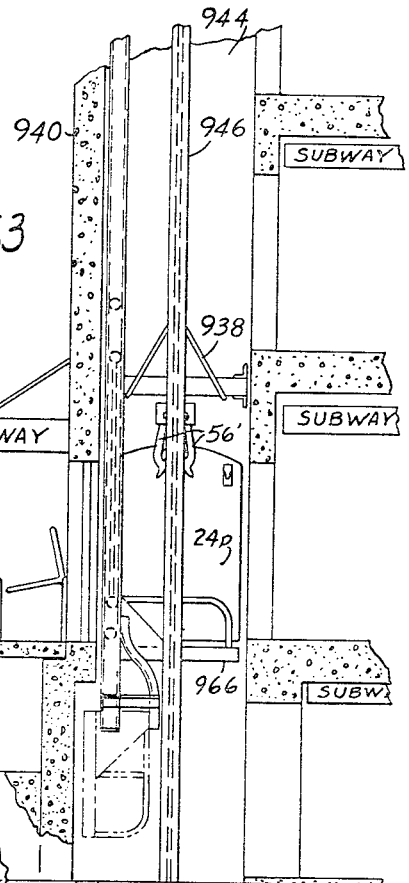
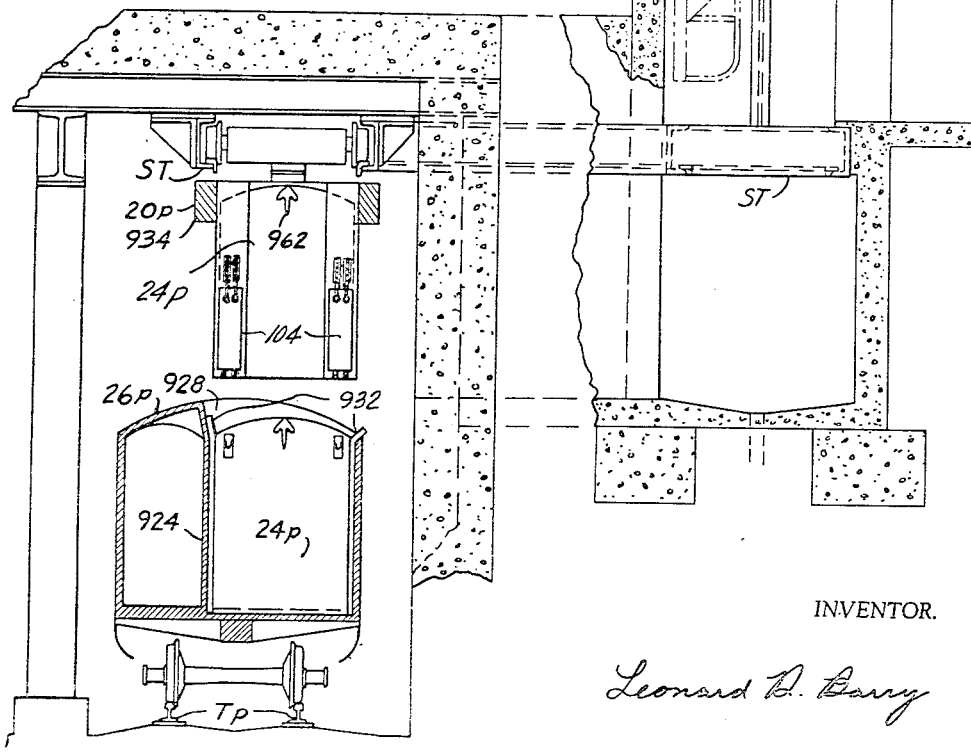
INVENTOR.
Leonard D. Barry Dec. 16, 1969  L. D. BARRY  3,483,829
CONTAINER, ROUTING STORAGE, AND TRANSFER SYSTEM
Filed Oct. 14, 1966  32 Sheets-Sheet 19

INVENTOR.
Leonard D. Barry

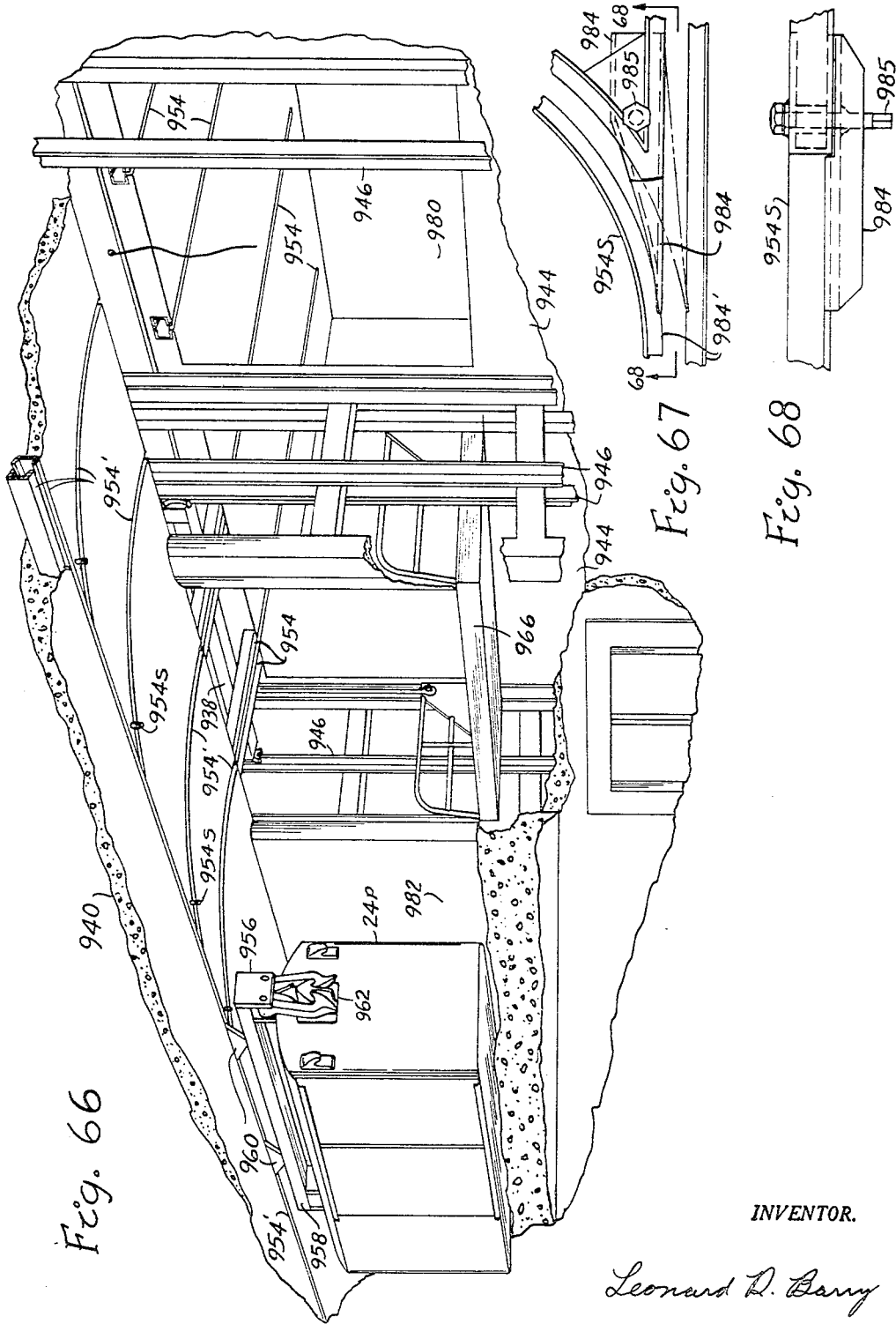

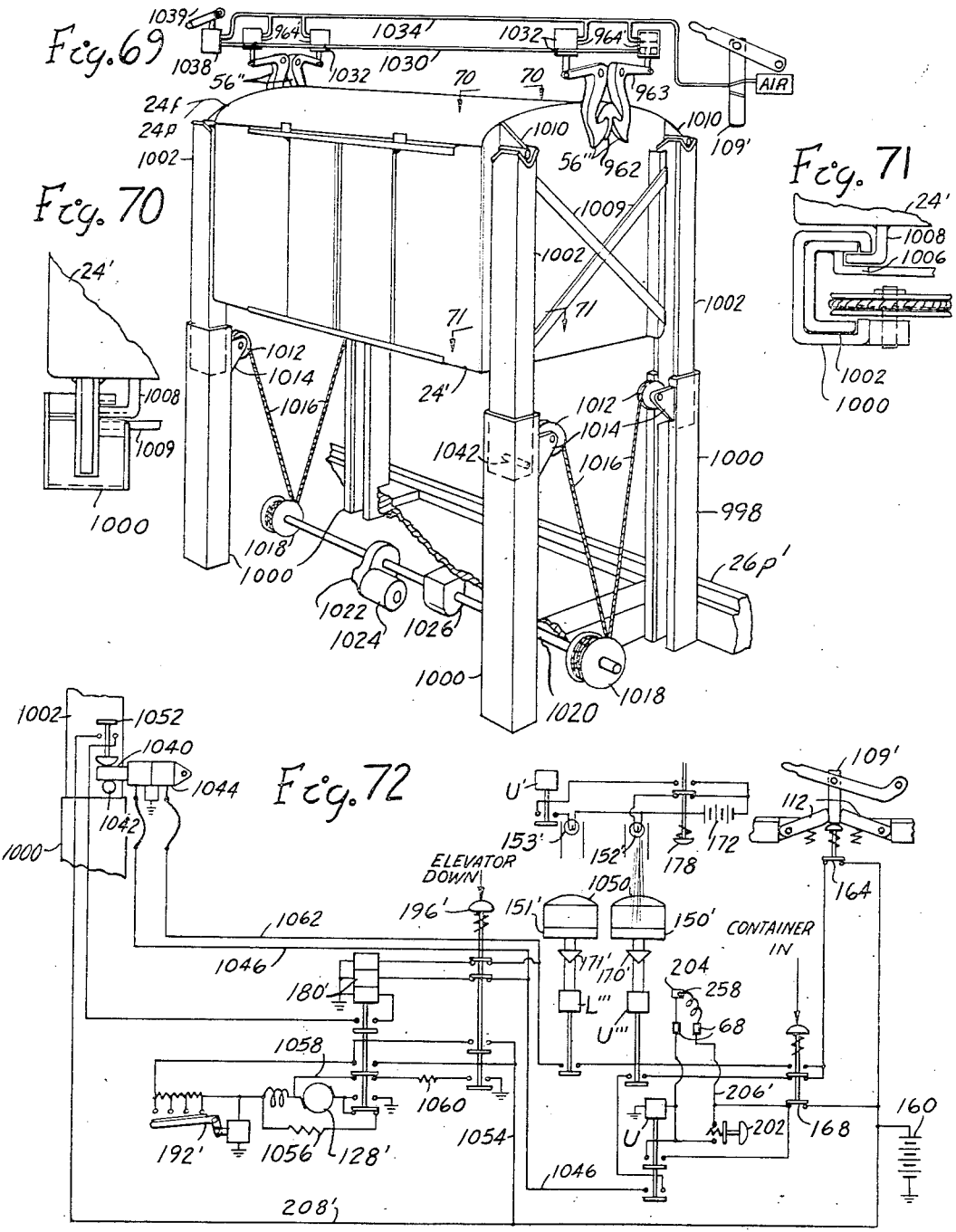

Dec. 16, 1969   L. D. BARRY   3,483,829
CONTAINER, ROUTING STORAGE, AND TRANSFER SYSTEM
Filed Oct. 14, 1966   32 Sheets-Sheet 23
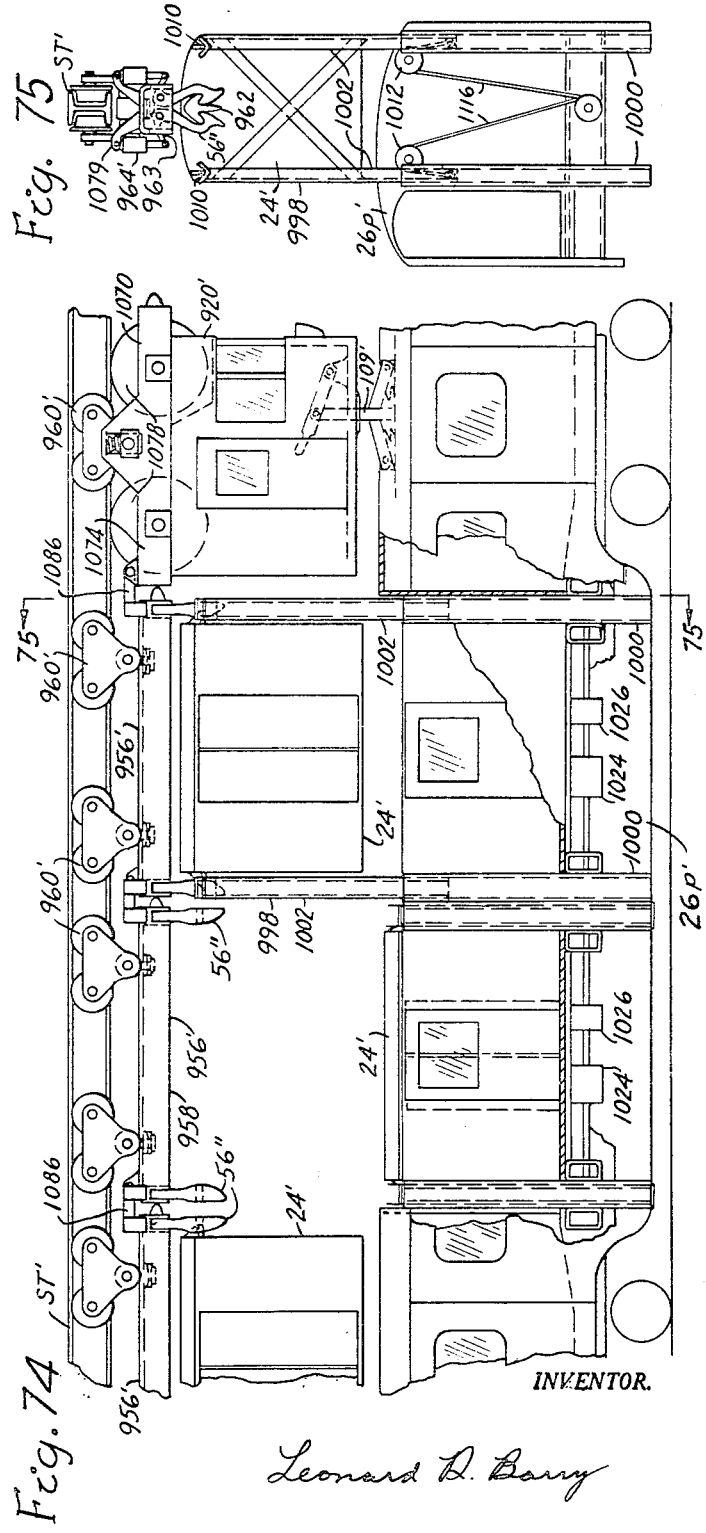
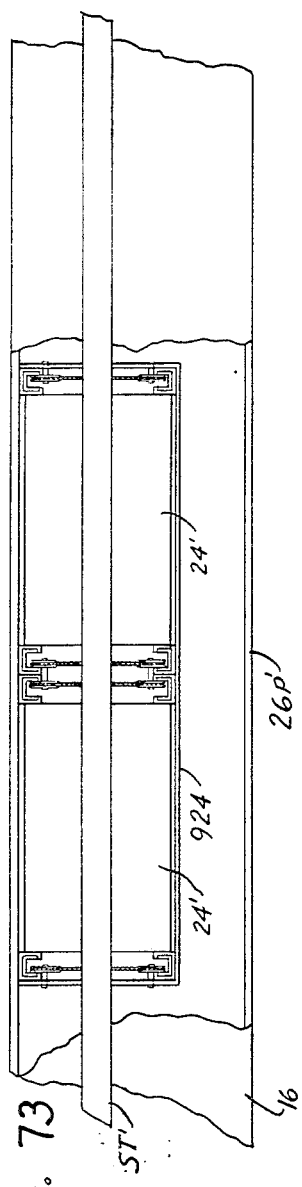
INVENTOR.
Leonard D. Barry

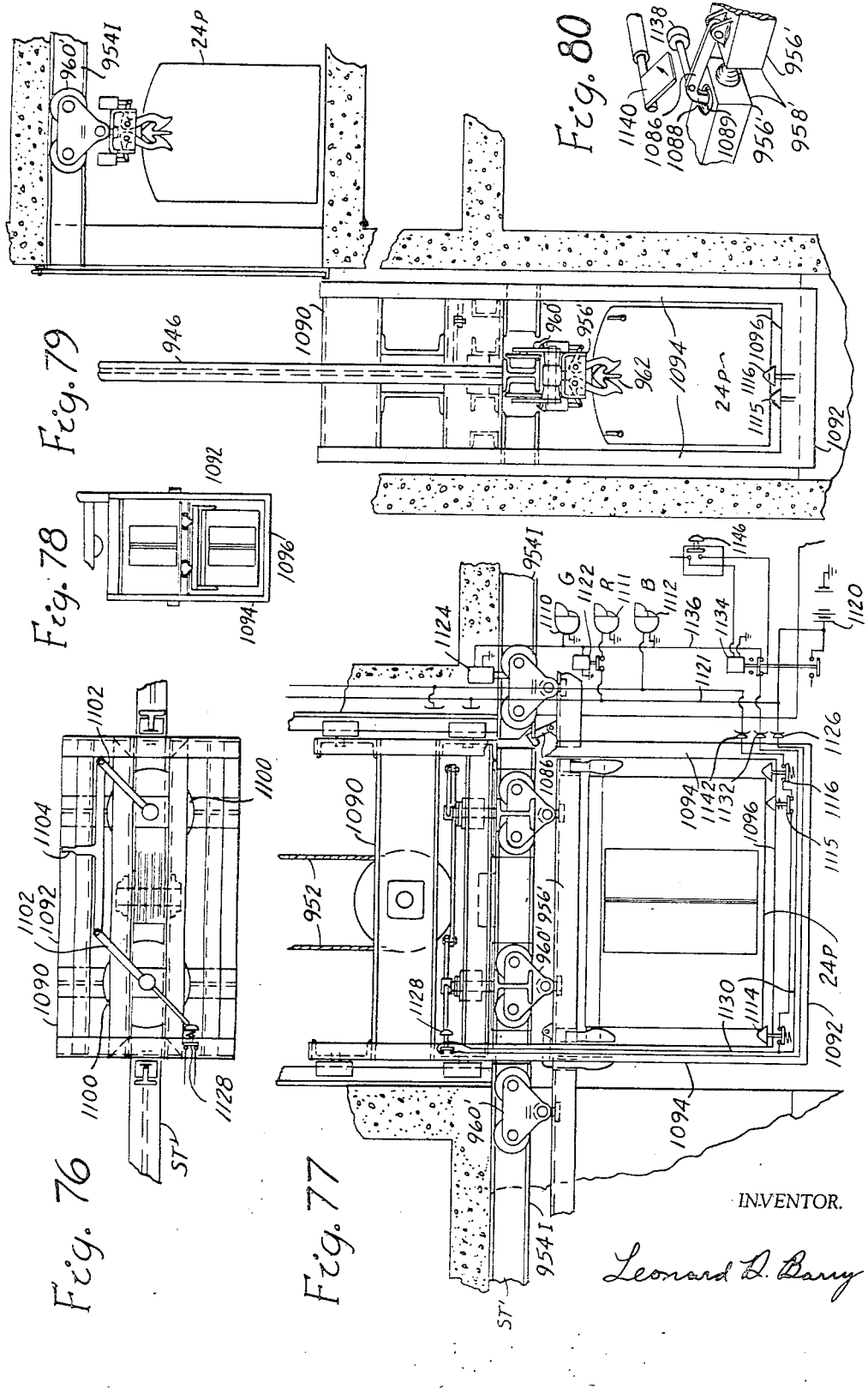

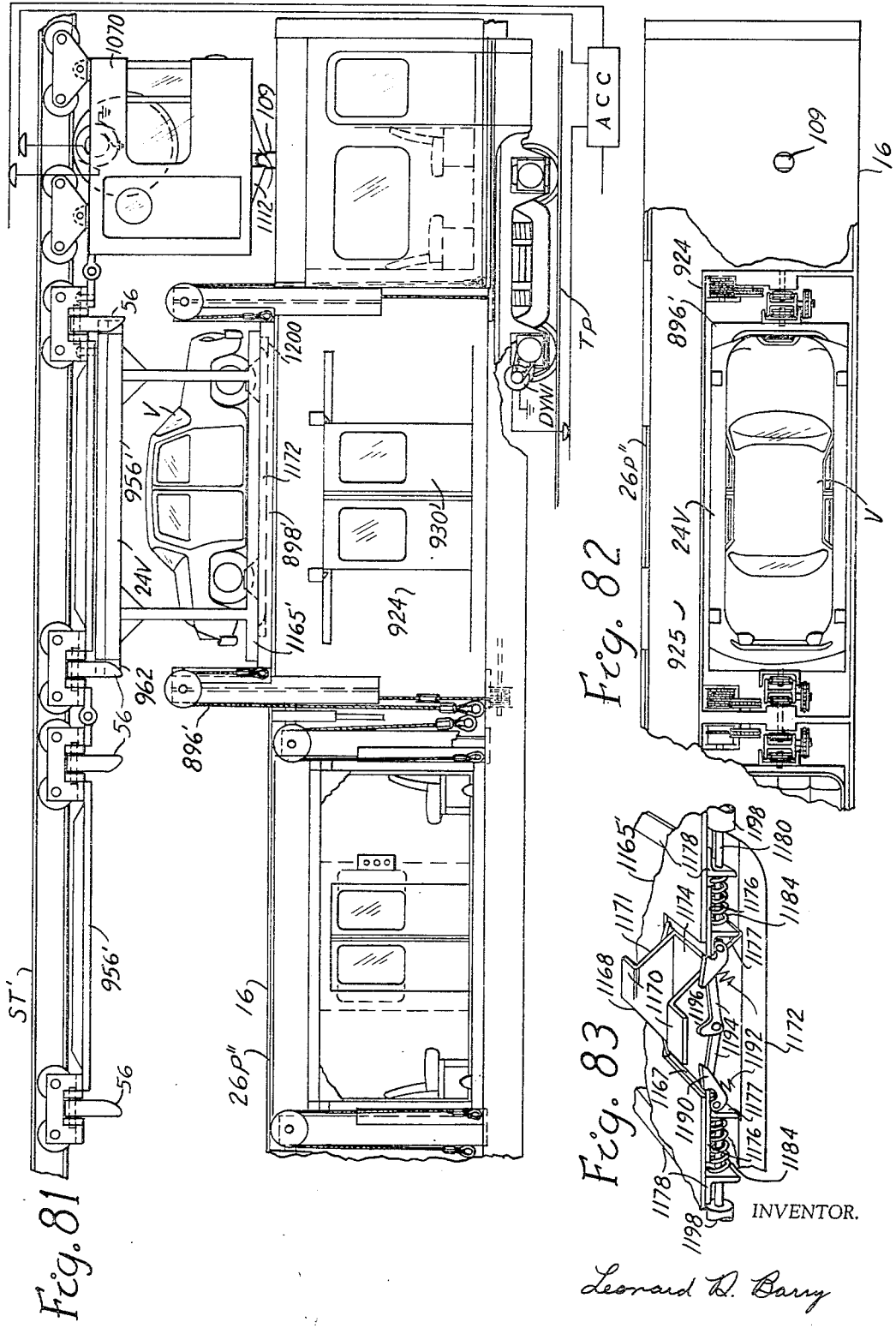

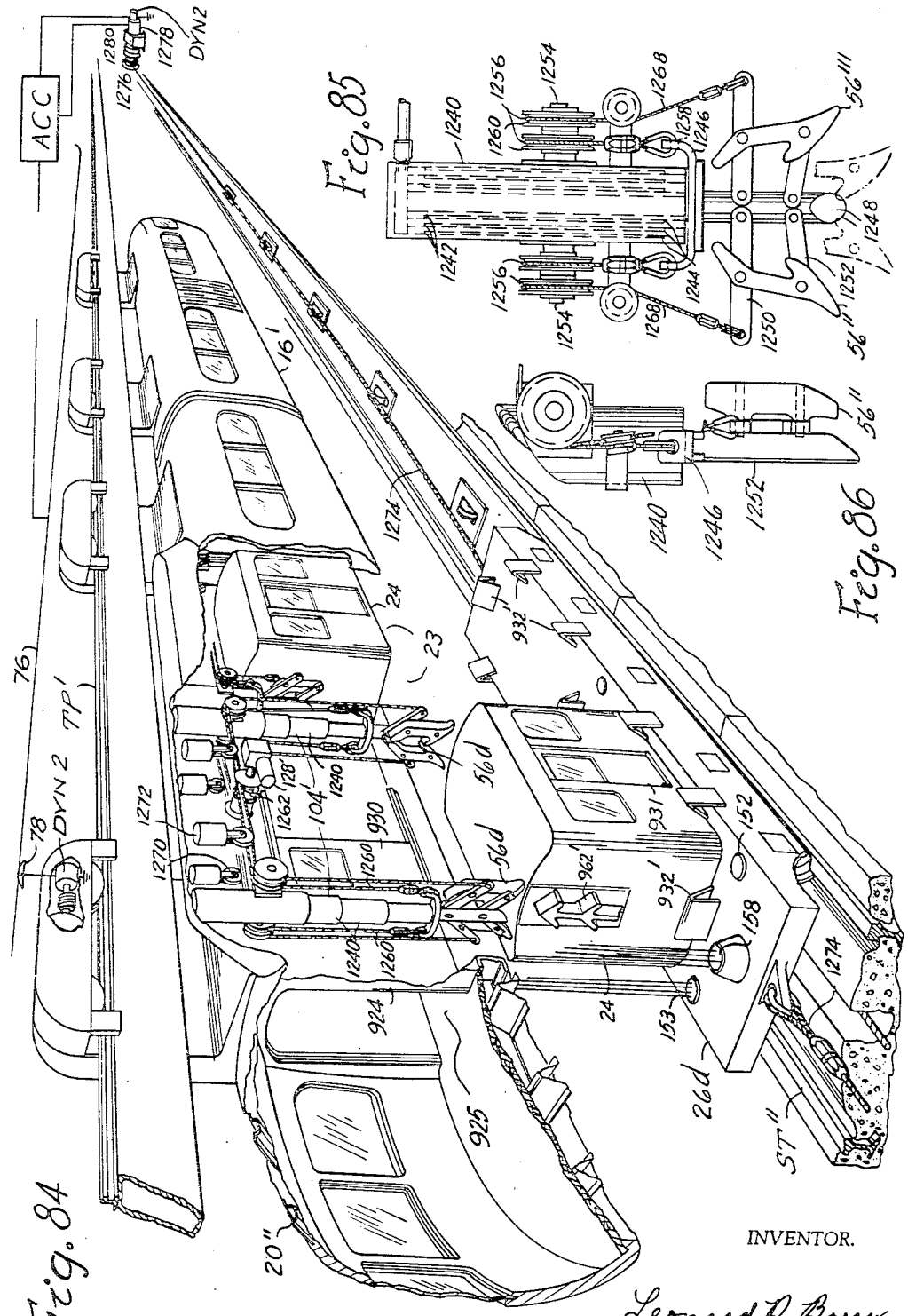

Dec. 16, 1969  L. D. BARRY  3,483,829
CONTAINER, ROUTING STORAGE, AND TRANSFER SYSTEM
Filed Oct. 14, 1966  52 Sheets-Sheet 27

INVENTOR.
Leonard D. Barry

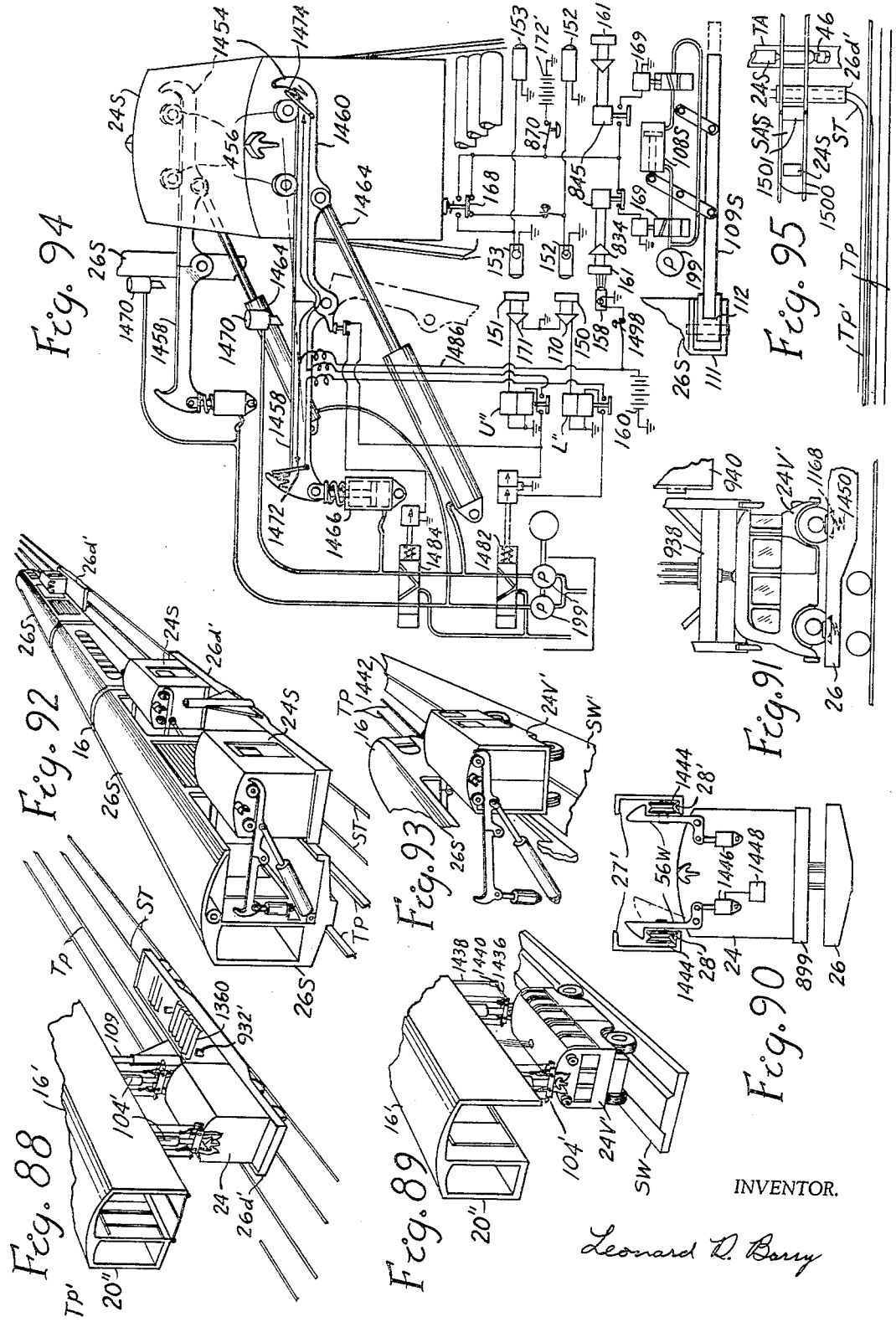

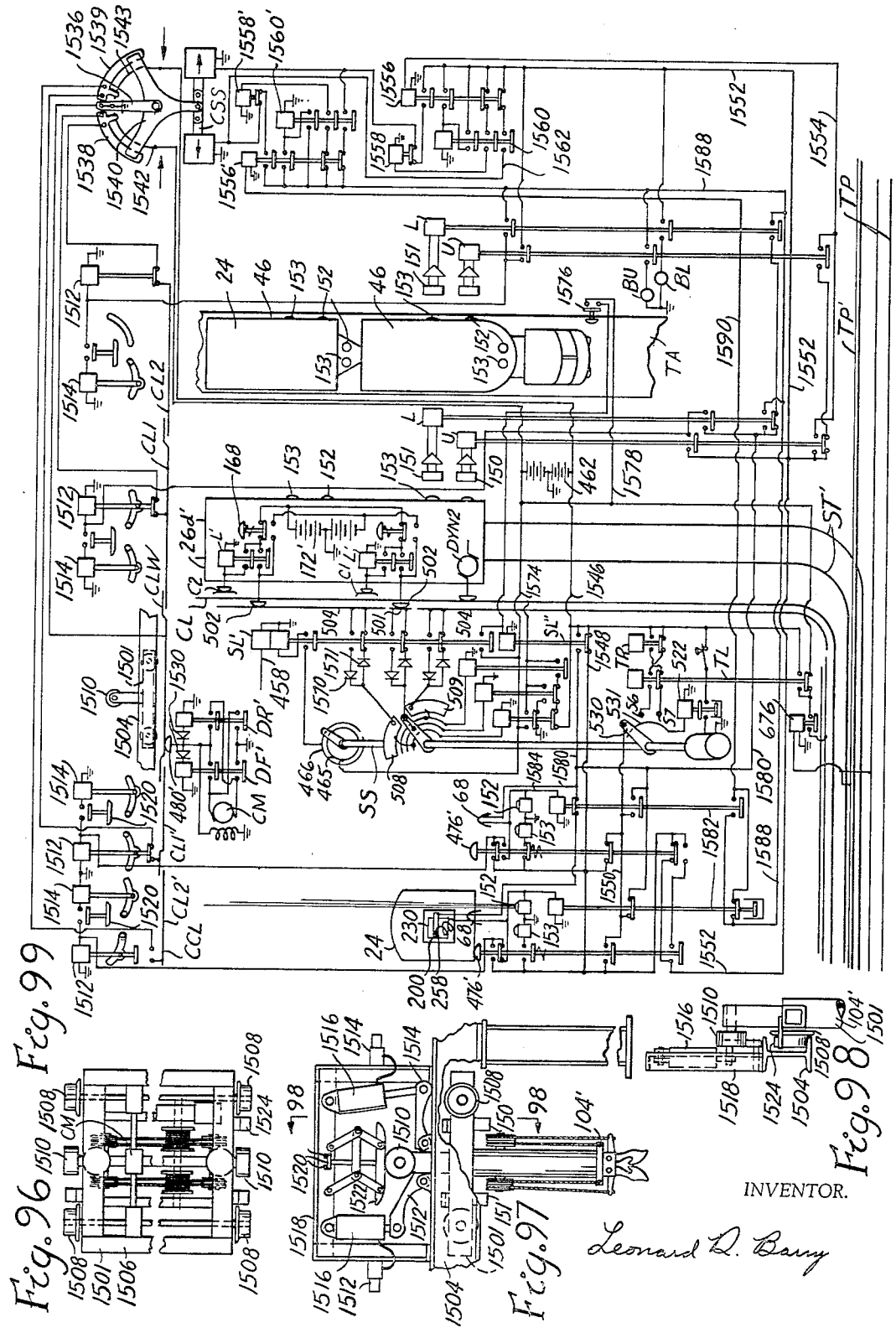

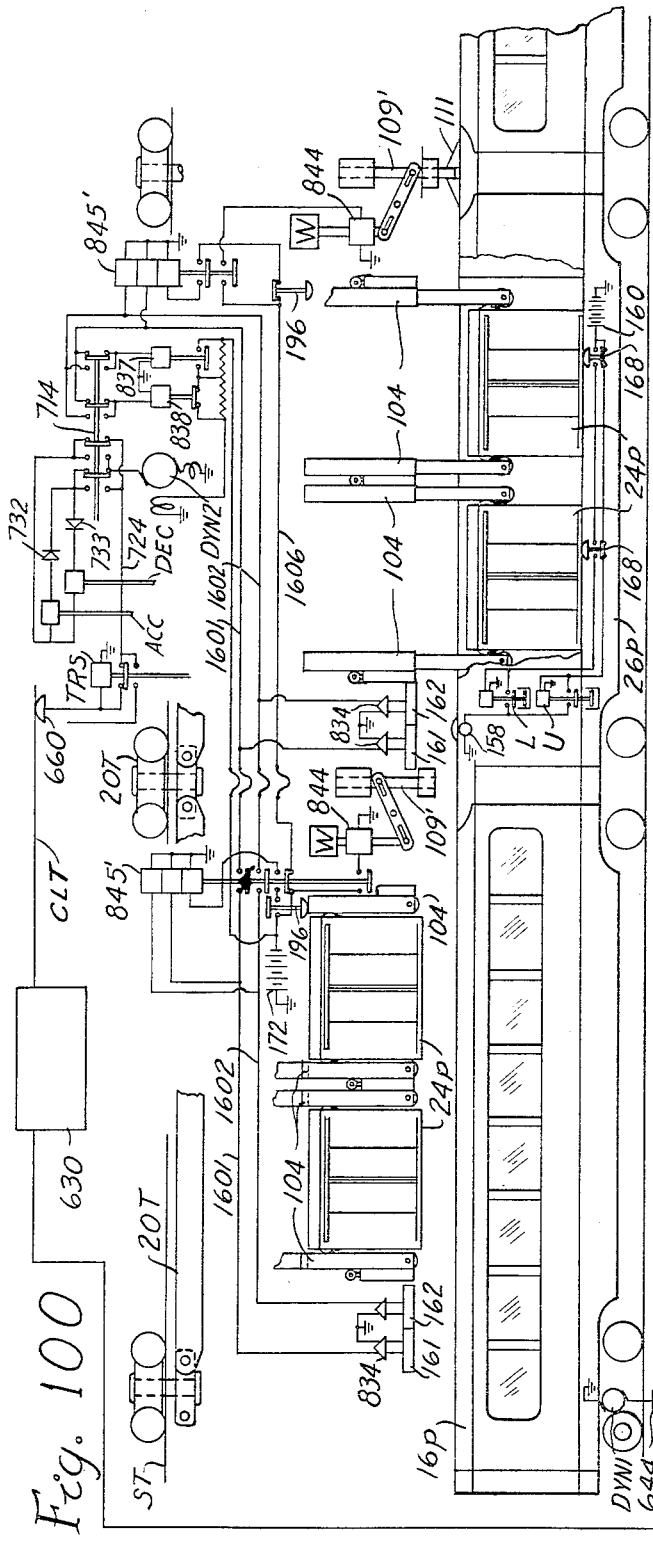

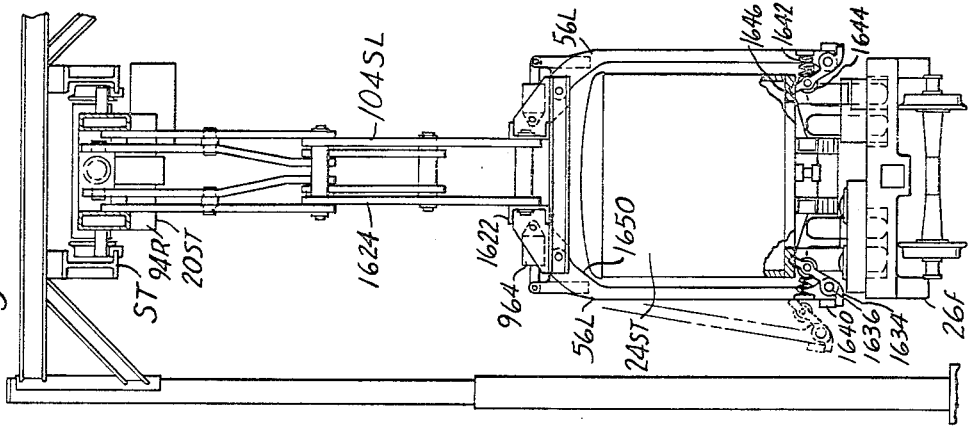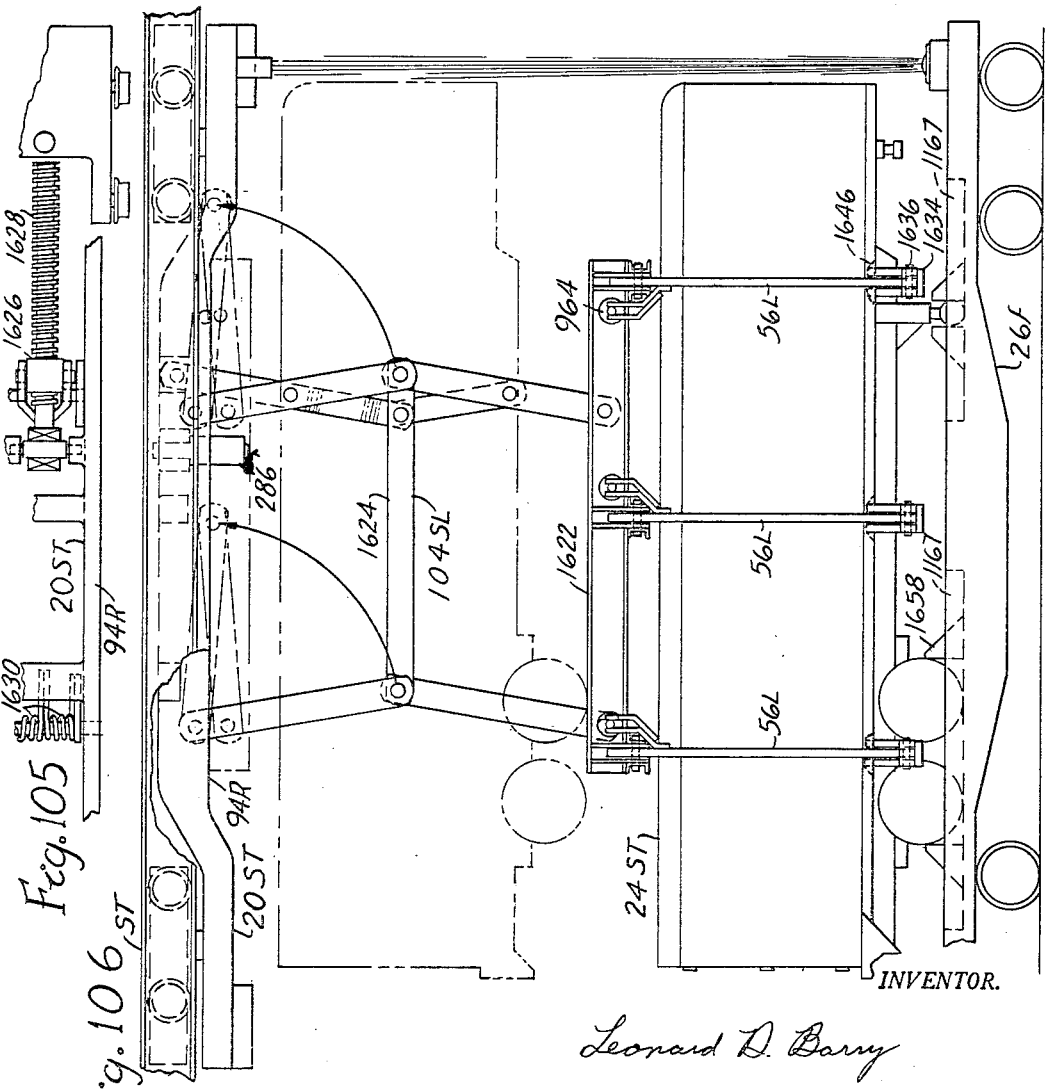

Dec. 16, 1969    L. D. BARRY    3,483,829
CONTAINER, ROUTING STORAGE, AND TRANSFER SYSTEM
Filed Oct. 14, 1966    32 Sheets-Sheet 32
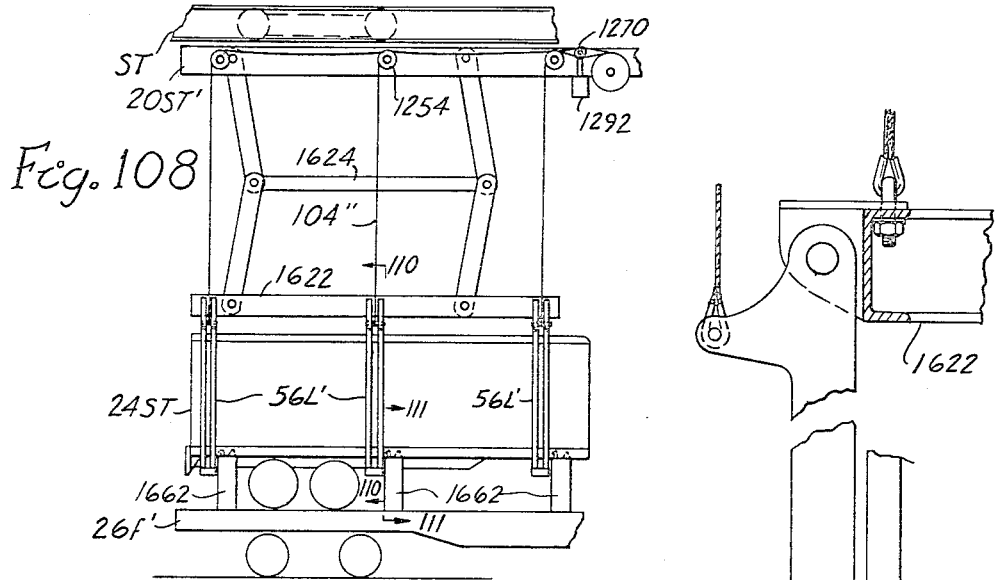
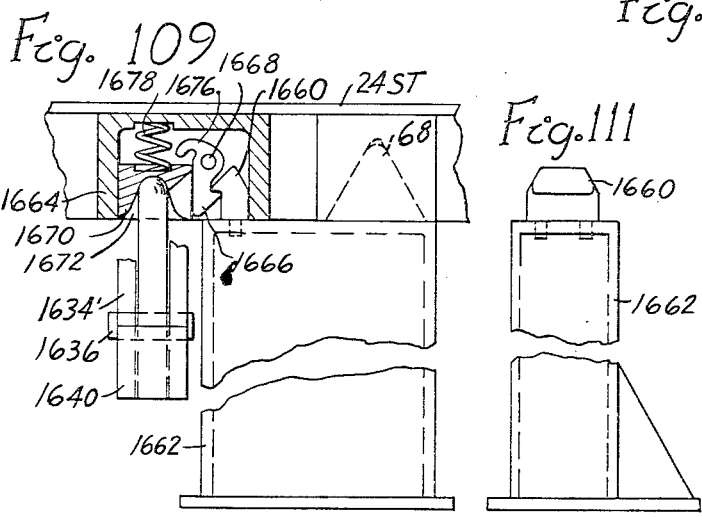
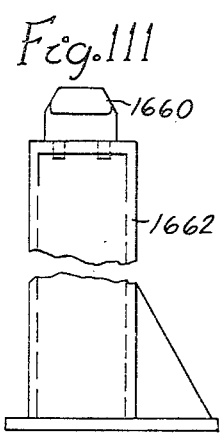
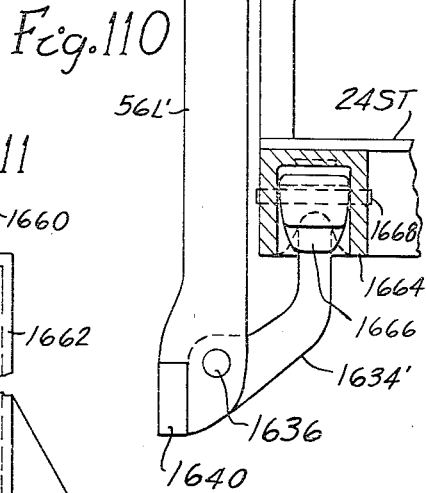
INVENTOR.
Leonard D. Barry

United States Patent Office 3,483,829
Patented Dec. 16, 1969

3,483,829
CONTAINER, ROUTING STORAGE, AND
TRANSFER SYSTEM
Leonard D. Barry, 19300 Pennington Drive,
Detroit, Mich. 48221
Continuation-in-part of applications Ser. No. 533,163,
Mar. 10, 1966, and Ser. No. 557,333, May 16, 1966,
which are continuations-in-part of application Ser. No.
714,453, Jan. 27, 1958. This application Oct. 14, 1966,
Ser. No. 591,369
Int. Cl. B61b *13/00, 15/00;* B61k *1/02*
U.S. Cl. 104—18                              31 Claims

ABSTRACT OF THE DISCLOSURE

This invention adapts railway systems to automatically route containers using nonstop freight or passenger trains. The containers carry information as to which trains can carry them and where they are to be transferred. Control signal means, transfer devices, and a transfer run along the railway track for each station automatically transfers containers to and from the passing trains according to the routing for the train and for each container and according to loading limitations. The containers are stored at intermediate stations enroute and at terminal stations automatically. The containers can be taken up elevator shafts and put off at various floors or put on highway trucks or other vehicles so that shipments can be made from source to destination without breaking load or loose handling.

---

This is a continuation-in-part of my patent applications Ser. No. 533,163, filed Mar. 10, 1966, and Ser. No. 557,333, filed May 16, 1966, which replaced my parent application Ser. No. 714,453, filed Jan. 27, 1958, and now abandoned, as a continuation-in-part thereof.

This invention relates to transportation and in particular to a system and means for routing, storing, and transferring containers for goods and/or persons between vehicles or places.

An object of this invention is to provide fast, practical, safe, high capacity, and novel means to transfer passengers or goods to and from a vehicle especially to and from a train traveling at speed.

A further object is to provide automatic routing for containers over one or more railroads with automatic transfer and storage of containers between trains.

A feature of this invention is the provision of novel passenger transfer containers or cages in cooperation with transfer means to transfer persons and things between vehicles at speed and to load and unload a vehicle while stopped.

According to this invention containers can be transferred quicker than a few passengers can walk between vehicles or leave a train on foot. One or more transfer containers can be automatically transferred between parallel running trains in a few seconds, and require much less distance for transfer than for passengers to walk between parallel running vehicles.

Some other and further objects are: to start the station vehicle, herein also called a carrier, a time after the nonstop vehicle or express train has reached a way point, this starting delay being varied according to the express train's speed to align the carrier for transfer when almost accelerated to train speed, to reduce parallel running in misalignment, to reduce the length of the transfer run to a minimum for a given maximum speed; to enable an express vehicle to pick up and let off passengers or goods without delay to the express, i.e. to transfer without limiting or governing train speed for transfer; to enable transfer at any train speed or range of speeds designed for; to provide a container transfer system where the containers can be carried on a railroad or monorail train with nonstop interchange therebetween; to automatically transfer containers to and/or from a train at speed or while standing; to provide geometric transfers; to provide selective transfer, to permit occupants of a container, an attendant, or coded routing device to select the station for transfer from the train; to provide successive transfer, to align carriers for transfer with preselected cars scattered through a train; to reserve cars for transfer on a priority basis to make the most number of transfers with the least number of carriers; to signal loading of cars reserved for transfer directly to corresponding carriers at the station to load each carrier to register for transfer with the car with which it is reserved for transfer; to provide vertical transfer, to utilize the right-of-way to better advantage, to reduce the width of the right-of-way for local and express service, to prevent shifting the load during transfer; to provide safe coupling between parallel running vehicles, to limit parallel coupling to safe speed difference; to release carrier brakes through parallel coupling; to engage, move, and disengage carriers with parallel coupling to engage, move, and disengage successive carriers with selected cars for successive transfer runs each displaced a car length or more in the direction of vehicle movement; to shorten successive transfer runs to prevent bumping of carriers; to provide a more economically practical solution to the problem of enabling through trains to pick up and let off passengers, freight, etc. at local stations without stop; to eliminate the need to bump and couple or uncouple railway cars while in use; to eliminate the need for classification yards; to provide automatic container storage; to provide small stations with carriers for simultaneous loading and unloading of cars and larger stations for unloading of containers from the train before loading the train to reduce the length of the train when many containers per train are to be transferred; to automatically and efficiently load the carriers to meet trains from either direction for transfer; to provide a container system for a subway, elevated, or monorail for loading and unloading at street level or at one or more levels above or below the car or carrier; to eliminate need for stairs, ramps, or escalators for patrons at stations; to provide train to carrier to elevator container transfer to one or more floors or levels in buildings or subways; to provide means for removing containers from the elevator on upper or lower levels for storage, loading, or unloading; to provide a passage on the transfer car to enable passengers to walk through the car and bypass the container area; to partition the container area from the aisle and passenger area for safety and to enable the passenger transfer car to carry freight, etc out of sight; to combine passenger and freight service; to provide a system in which these various objects can be achieved together in harmony with a variety of types of containers such as: a passenger cage with or without seats; a passenger compartment for day or night travel i.e. a parlor or sleeping compartment; a portable kitchen for serving meals transferred with personnel from train to train; a portable news stand, notions store, snack bar, supply room, or personnel change unit; an auto, bus, truck or trailer, or cage therefor; a bicycle, motorcycle, or scooter cage; a tank, hopper, flat, box, express, mail, baggage, or refrigerator unit, etc. The containers can also supply the train with fuel, water, battery changes, etc.

Other and further objects will be pointed out herein or should be evident upon consideration of this invention as described with reference to the drawings wherein:

FIGURE 1 is a perspective plan of a container transfer and storage station for both passenger and freight containers.

FIGURE 2 is a perspective view of a switch in the suspended carrier track.

FIGURE 3 is a sectional perspective of the passenger loading platforms of the station of FIGURE 1 and shows a passenger carrier with container above a passenger transfer car.

FIGURE 4 is a plan view of a storage conveyor and elevator at the station.

FIGURE 5 is a side elevation of the conveyor and elevator of FIGURE 4 and showing a container on the elevator under the carrier.

FIGURES 6 and 7 are respectively enlarged side and end views of the container on the storage conveyor over the elevator of FIGURE 5.

FIGURE 8 is a sectional view of a telescoping guide on the elevator of a carrier at the station in FIGURE 1 taken on line 8—8.

FIGURES 9–11 are respectively plan, end, and side views of the freight container carrier of FIGURE 1 in process of lifting or lowering a container to a railway car.

FIGURE 12 is a perspective schematic of the elevator drive for the carriers in FIGURES 9–11 and 60–65.

FIGURES 13 and 14 are details of the hook rod and supporting ropes respectively with and without an optional U-hook.

FIGURE 15 is a schematic diagram of the controls for the elevator of FIGURE 12.

FIGURE 16 is a schematic route plan for a container.

FIGURE 17 is a routing card.

FIGURES 18 and 19 are respectively front and side views of an automatic routing card reader with portions cut away to show details.

FIGURE 20 is a section taken on line 20—20 of FIGURE 18.

FIGURE 21 is a schematic of the portion of the circuits on a railway car and container for reading the routing card and an abbreviate substitute control on a second container used without the routing card to call the empty container from storage.

FIGURE 22 is a plan view of the railway car to show contact shoe arrangement.

FIGURES 23 and 24 are respectively plan and side elevations of the electrical coupling between car and container.

FIGURE 25 is a track plan showing the station of FIGURE 1 for simultaneous loading and unloading and signal points called way points in advance of the station.

Figure 64:
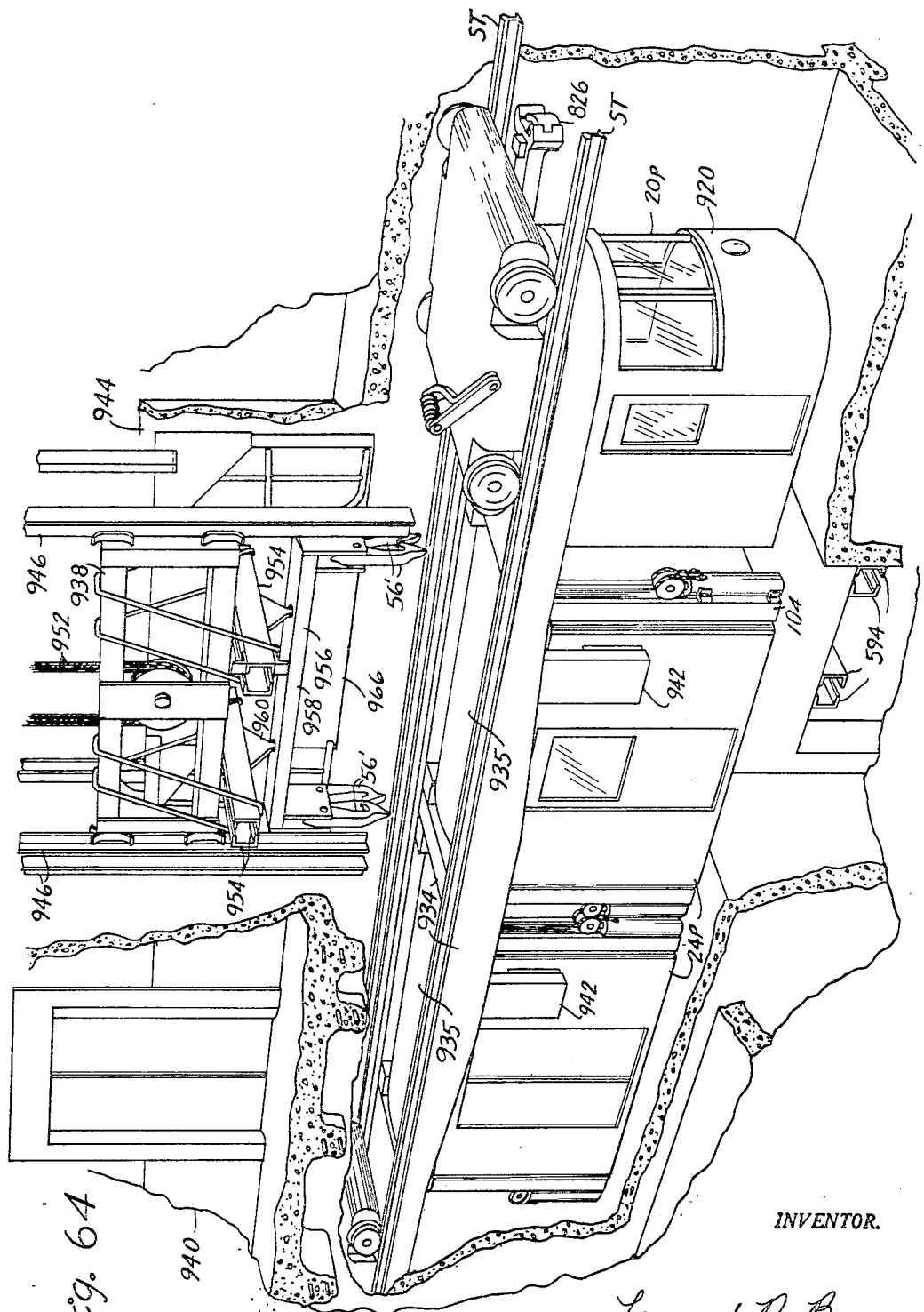

FIGURE 26 is a schematic of circuits on the lead car or locomotive of a container train and trackway connection from way point 1 for signaling the train's number to containers at the station, and circuits to and on containers in storage at the station to read the train's number to select the containers for the train, and circuits on a typical car and at way points 2, 3, and 4 to reserve cars for transfer on a priority basis.

FIGURE 27 is a schematic of circuits between the train and waiting carriers at the station for signaling loading instructions to the carriers.

FIGURE 28 is a schematic of circuits and timer for successively starting the carriers to align the particular car in the train selected for transfer.

FIGURE 29 is a track plan showing a variation of the station whereat containers on cars in the train passing are unloaded first and afterward loaded and the signaling way points ahead of the station.

FIGURE 30 is a variation of the station plan of FIGURE 29.

FIGURE 31 is a schematic of circuits for reserving cars having one or more containers to be transferred, limited by carriers available for unloading.

FIGURE 32 is a schematic of trackway circuits for setting loading instructions on the cars approaching a station for FIGURE 29 or 30.

FIGURE 33 is a schematic of circuits for signaling loading instructions from the cars to the loading carriers at the station of FIGURE 29 or 30.

FIGURES 34 and 35 are schematics of circuits for successively starting respectively the unloading and loading carriers.

Figure 36:
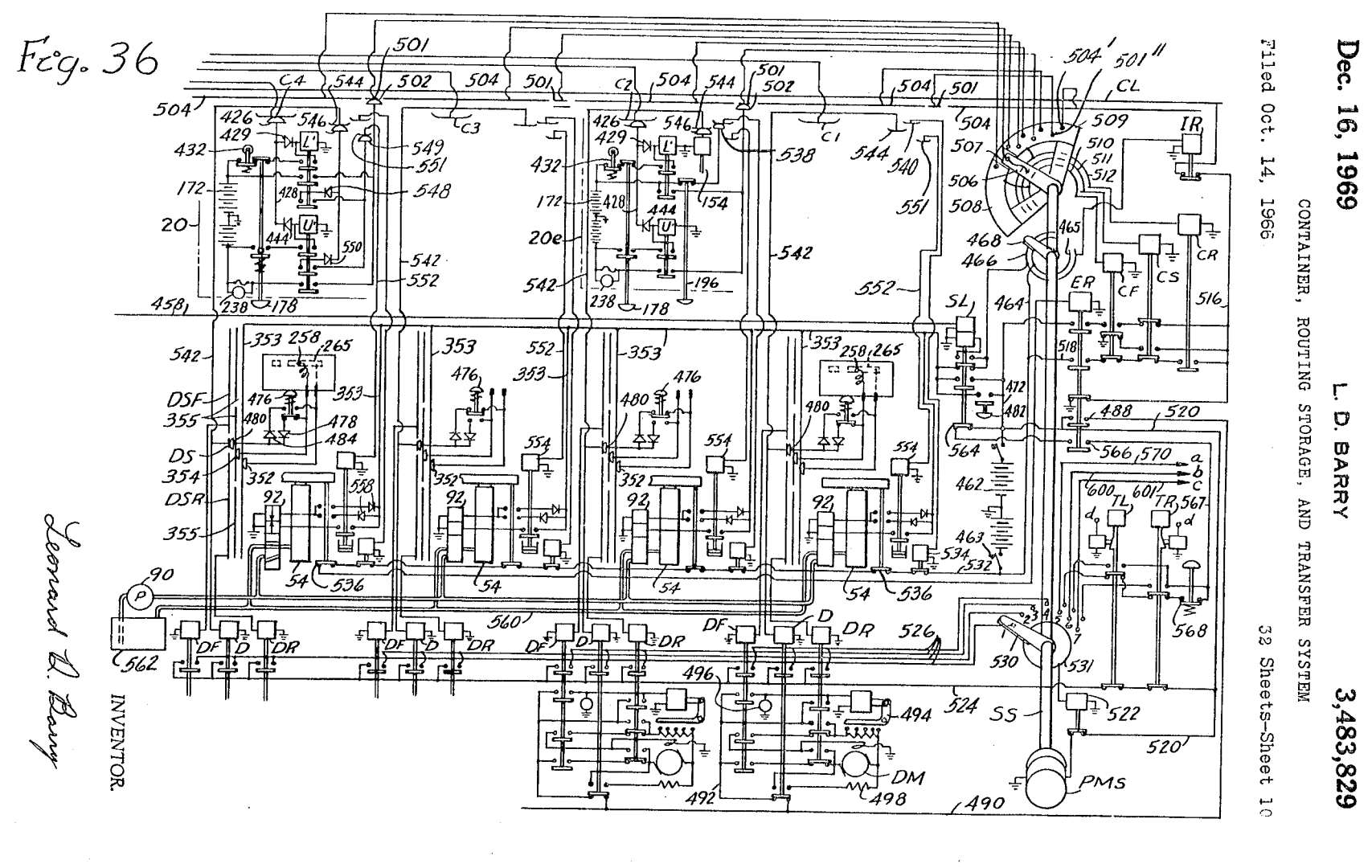

FIGURE 36 is a schematic of loading, unloading, and stop controls at the station, FIGURE 1.

FIGURE 37 is a schematic of trackway controls for the carrier and signals for the train.

FIGURE 38 is a schematic of speed and coupling controls on a carrier.

FIGURE 39 is a side elevation of a train with carriers aligned for transfer.

FIGURE 40 is a graph of Time vs. train and carrier Speed on transfer run.

FIGURE 41 is a graph of Distance vs. train and carrier Speed on the transfer run.

FIGURE 42 is a graph of the transfer run Distance vs. Time as the train passes and the carriers meet particular cars therein.

FIGURE 43 is a graph of timer r.p.m. vs. Train Speed.

FIGURE 44 is a side elevation of a variation of the transfer run with carriers connected for transfer with cars in a train.

FIGURE 45 is a sectional view of a portion of a carrier showing a container hook and controls.

FIGURE 46 is a side elevation of the preferred container car for the train of FIGURE 44 connected to a carrier for container transfer.

FIGURE 47 is an end view of the car and central sectional view of the carrier of FIGURE 46.

FIGURE 48 is a schematic of controls for the vertical coupling of FIGURES 46–47.

FIGURE 49 is a side elevation of the vertical coupling of FIGURE 46 in lowered position on the car.

FIGURE 50 is a plan view of the transfer run of FIGURE 44.

FIGURE 51 is a schematic diagram of the preferred dip transfer run with preferred vertical coupling control for low speed successive transfer.

FIGURE 52 is a perspective view of a vertical switch in FIGURE 51.

FIGURE 53 is a side view of the coupling latch assembly on a carrier engaged by a coupling pin and schematically showing brake controls.

FIGURE 54 is an end view of the latch assembly and pin of FIGURE 53.

FIGURES 55 and 56 are respectively back and side views of a coupling carriage on its track.

FIGURES 57 and 58 are respectively side and end elevations of a variation of the vertical coupling for a container car.

FIGURE 59 is a schematic side view of the elevators and elevator controls for the railway car of FIGURES 46–47 and the vertical coupling and controls represented in simple form.

FIGURES 60 and 61 are respectively a plan and side elevation of a passenger container transfer car with carrier above.

FIGURE 62 is a plan view of a passenger station along a subway.

FIGURE 63 is an end elevation of a subway and station building showing an end sectional view of the car and carrier of FIGURE 61 and an elevator for the container in the building.

FIGURE 64 is a perspective view of the carrier of FIGURE 61 stopped under elevators in the building for transfer of the containers.

Figure 65:
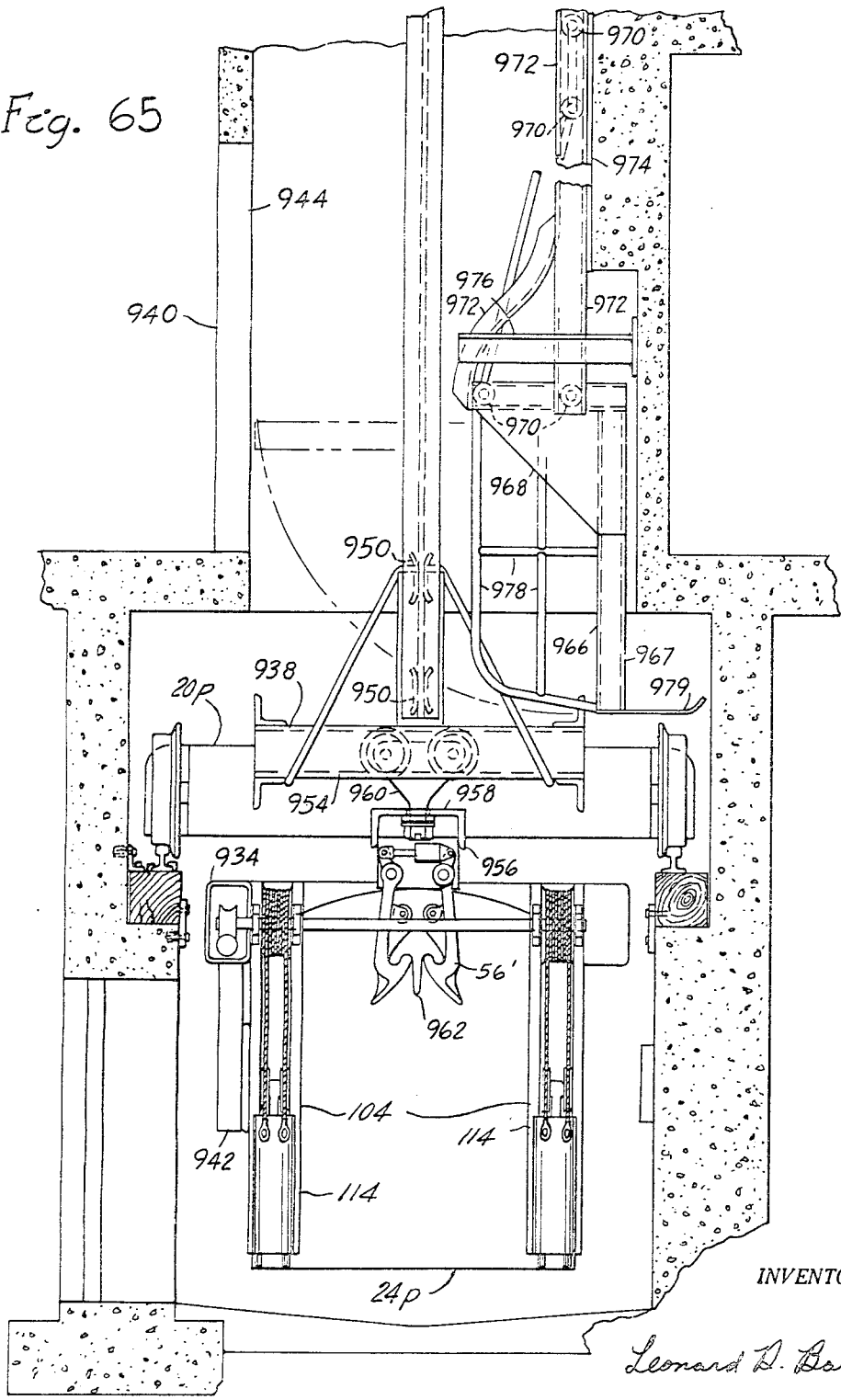

FIGURE 65 is a sectional view through the carrier and building of FIGURE 64 showing an elevator engaging a container on the carrier.

FIGURE 66 is a perspective view of the elevator at an upper floor on the building with a container run off the elevator on a ceiling track.

FIGURE 67 is a plan view of a ceiling switch.

FIGURE 68 is a side section of the ceiling switch on line 68—68.

FIGURE 69 is a perspective view of the preferred container elevator on a railway car and shown extended with a container.

FIGURE 70 is a top corner view taken on line 70—70 of FIGURE 69.

FIGURE 71 is a section taken on a line 71—71 of FIGURE 69.

FIGURE 72 is a schematic of the controls for the elevator of FIGURE 69.

FIGURES 73 and 74 are respectively plan and side elevations of a variation of the passenger carrier and track showing the preferred type of elevator on the passenger car.

FIGURE 75 is a section taken on line 75—75 of FIGURE 74.

FIGURES 76 and 77 are respectively top and side views of an elevator with loading controls shown schematically in a building and holding a container on a carrier of FIGURES 73–75.

FIGURE 78 is a side view of a variation of the elevator of FIGURE 77.

FIGURE 79 is an end view of the elevator shaft and elevator of FIGURE 77 and container on monorail in storage at upper floor.

FIGURE 80 is a perspective detail of the coupling and opening ramp for the carrier on the elevator of FIGURE 77.

FIGURES 81 and 82 are respectively partial cut-away side and plan views of a passenger monorail carrier train and railway train in process of transferring a container with automobile thereon.

FIGURE 83 is a perspective view of a wheel chock on the container of FIGURES 81 and 82.

FIGURE 84 is a cut-a-way perspective view of a monorail train with transfer elevator reaching for a container on a parallel running vehicle below.

FIGURE 85 is an assembly view of a portion of a container elevator shown in FIGURE 84.

FIGURE 86 is a side view of the hook mechanism shown in FIGURE 85.

Figure 87:
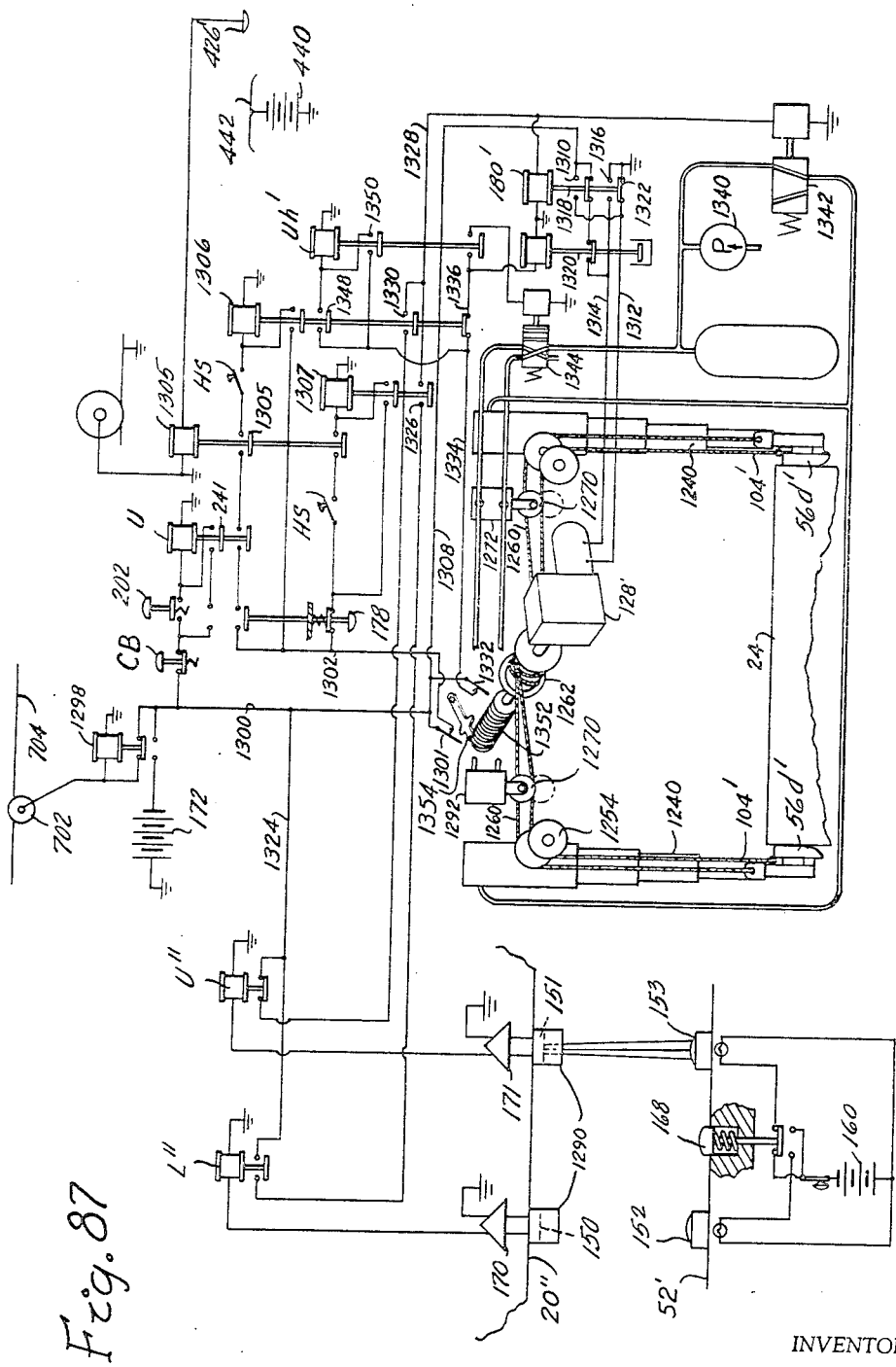

FIGURE 87 is a schematic diagram of controls for elevator in FIGURE 84.

FIGURE 88 is a perspective view of a variation of FIGURE 84 showing a monorail car and station vehicle aligned with container being transferred.

FIGURE 89 is a perspective view of a monorail carrier transferring a vehicle container at speed on a parallel way.

FIGURE 90 is a cross-sectional view through a suspended track showing a container having hooks with wheels thereon.

FIGURE 91 is a side view of a transfer vehicle (bus) on a vehicle under the elevator of FIGURE 64.

FIGURE 92 is a perspective view of the train with side-transfer cars in process of transferring containers to and from parallel running vehicles.

FIGURE 93 is a perspective view of side transfer of a truck between the train and a parallel way.

FIGURE 94 is a partial cross-sectional view of parallel running side transfer cars with lift mechanism transferring a container and circuits shown schematically for operating the transfer mechanism and coupling.

FIGURE 95 is a plan view of a side and vertical loading transfer station.

FIGURE 96 is a top view of a crane for the station of FIGURE 95.

FIGURE 97 is a side view of the crane at a stop on craneway of FIGURE 95.

FIGURE 98 is a vertical section on line 98—98 of FIGURE 97.

FIGURE 99 is a schematic circuit plan for the station of FIGURE 95.

FIGURE 100 is a side schematic of a tandem carrier over the train in process of transferring containers and showing regressive alignment controls.

FIGURE 101 is a side view of another tandem carrier over the train.

FIGURE 102 is an end sectional elevation of a side-by-side carrier over the train.

FIGURE 103 is a track plan for the side-by-side carrier.

FIGURE 104 is a track plan for carriers between stations on a rapid transit railway.

FIGURES 105–107 are respectively partial top, side, and end views of a carrier transferring a semi-trailer to a railway car.

FIGURE 108 is a side elevation of a carrier setting a container on an automatic locking pedestal set on the railway car.

FIGURE 109 is a cut-a-way enlargement of a portion of FIGURE 108.

FIGURES 110 and 111 are sections on respectively lines 110 and 111 of FIGURE 108.

Station

Referring to the drawings and in particular to FIGURE 1 wherein a passenger and freight container station on one or more rail routes as T1 and T2 for container train 16 has a container storage area SA, a container truck loading-unloading area TA, a passenger container load-unload station PA, all connected by a suspended monorail track ST with one or more passenger container carriers 20p and freight container carriers 20f thereon for transferring passenger containers 24p or freight containers 24f between transportation vehicles and the station or other points. Routes T1 and T2 preferably join for a distance T1–2 for transfer with the monorail. In this distance the tracks on routes T1 and T2 join at each end between which the track branches into freight track Tf centered under the monorail to spot container 24f central on the container car 26f and passenger track Tp offset therefrom to spot containers on the monorail along one side of the passenger, express and mail cars 26p, FIGURE 3, to provide room for an aisle on the other side of these cars. As an alternative to track Tp the carriers for the passenger containers could carry containers 24p off center to align with berths on the passenger trains when on track Tf. Various station track configurations may be preferred for particular applications and can include branch runs STB to various points and transfer runs over different tracks.

Carrier track and switch

The preferred monorail has wide gage channel rails or beams 27 along the bottom of which run angle rails 28 turned legs down and secured to the channel by studs and nuts. Channels 27 are supported on steel side poles 30 or on a ledge in subways. Poles 30 are connected by cross members 32. The rails are spaced wide apart to reduce sway and for removal of containers on special passenger and goods carriers up between the rails as will be described with FIGURES 56–64.

The preferred horizontal switch for this track is shown in FIGURE 2 where alternately sections 34 and 35 are lifted out of the way and dropped in place. Angles 36 secured on top of the moveable track sections 34 and 35 provide a stop to support the section when in place for passing a carrier thereon. Sections 34 and 35 are connected by bars 38 and 39 pivoted to tabs 40 secured to the top of each section. The bars are pivoted midway between the tabs to suspending members 42 depending from the supporting structure 32. Alternate sections are inserted by means such as a cylinder 43 which operates the switch by suitable pressure means.

Passenger station

The passenger area, as seen from FIGURE 3, has the usual loading platform at the lower level for trains which stop and an upper platform for loading and unloading containers 24p which run to transfer with nonstop trains. Gates 44 to the containers are closed and locked except at a container preferably by suitable control.

Freight brought to station

Containers can be brought to the station by various means but are preferably carried to the storage area by suspended monorail or cranes to eliminate loading and unloading aisles in the storage area. The container 24f brought to the station on truck 46 is transferred to carrier 20f and carried over station conveyors or dolly trains 48 which run at right angles to monorail ST where the container is set down on an empty dolly set or spot 50 on the station conveyors 48 which shift it out from under the monorail so that other containers can be transferred to the chain of dollies.

Carriers with and without elevators

The containers can be transferred to and from the carriers by elevators on the carriers or by elevators under the monorail at the truck loading area, storage yard, and on the train 16. Both types of carriers have different advantages; the carrier with elevator is most suitable for transferring containers to and from highway trucks, rather than lifting the truck up to the carrier, and enables use of existing flat, gondola, express, and passenger railway cars with least change to adapt them to handle these containers. Having the elevator on the car has the advantage of more available power and gravity to retract the elevator. Selecting which type of carrier gives cost advantage depends on the total number of carriers relative to the number of cars and elevators in the system. If there are more container cars than carriers the cost of equipping the carriers with elevators would be cheaper than equipping the containers, cars, and stations with elevators. If there are many more carriers than container cars as might be on a rapid transit subway system or all passenger systems it would be cheaper to have the elevators on the railway cars. Therefore both types of carriers are herein disclosed with a station for handling either or both types of carriers.

Accordingly an elevator 54 is provided under the monorail at each dolly run. These would be omitted if all the carriers have elevators. Elevator 54 lifts the container from the carrier which has automatic hooks 56 (as in my Patent No. 3,164,406 or No. 3,257,142) which swing open and stay open as the elevator lowers the container to the storage conveyor or dolly 50. The storage yard comprises one or more storage conveyors 48 at right angles under the monorail ST. Four storage conveyors 48 are shown in this embodiment preferably equally spaced to align any four successive container berths 58 on a train of three carriers which has six berths 58 equally spaced to save time loading and unloading the carriers at the station. The dollies remove containers from under the monorail so that other containers can be set down with least movement of the carriers and so that the containers can be selectively spotted under the carriers for loading. Two carriers can be unloaded or loaded simultaneously by this arrangement.

As seen in FIGURES 4–7 the preferred storage conveyor 48 comprises inverted U-shaped platforms 60 each mounted on flanged wheels and axles 62 and connected by links 64 into a chain. Wheels 62 run on rails 66 secured and spaced on concrete slabs or on ties along the ground. To provide room for elevator 54, the conveyor shown has two runs of platforms 60 driven as one and across which the containers are set at any of several discrete spots or berths. Locating and electrical connecting conical pins 68 on the platforms locate and hold the containers in position. Adjacent ends of the platforms on the same conveyor are connected together by a structural member such as channel 70 at each end. The platform thus formed is driven on rails 66 by a cable 72 secured to the channel 70 at the left-hand end of the platform and run to the left around take-up pulley 74 and back under the platform and around drive drum 76 and idler pulleys 78 to the right-hand end of the platform to which it is secured. Drum 76 is driven by the reversible motor 80 through speed reduction drive 82 to spot a container or empty berth in loading position with the carrier over elevator 54.

Elevator 54 has an open platform comprising at least two parallel bars spaced between the chains of platforms on the dolly run. Bars 84 are secured by transverse members 86 horizontally on the end of the rod of lifting cylinder 88, which is pressured by pump 90 connected to the head end through two-selections solenoid valve 92 which can be controlled by any suitable means or as will be described with FIGURE 36. Cylinder 88 lifts the platform from a position below the storage platforms to a height for engaging or disengaging a container on the carrier.

Freight carrier and car

Referring to FIGURES 8–11, carrier 20f has a frame 94 suspended on two swivel trucks 96 which have a distance between the swivel axis equal to that of the railroad container car 26f with which transfer is to be made, so that alignment can be maintained on curves. The wheels of trucks 96 are flanged to ride in channel rails of tracks ST. Trucks 96 are each driven by a traction motor TM through reduction gearing. The carriers have couplers 102 for connecting into carrier trains. Carrier 20f supports two or more containers 24f preferably of semi-trailer size each on an elevator 104.

Container car 26f has a frame or bed 106 with a spot or berth for two containers 24f each having two tapered pins 68 for locating the container and for electrical connections thereto.

Vertical coupling

Car 26f has a central vertical coupling column or cylinder 108 braced to the frame. Cylinder 108 has a plunger 109 which extends up to engage carrier 26f when aligned, and can be extended when within a carrier length from the carrier. Carrier 24f has a central depending column 110 secured to frame 94 and a double latch head having two facing latches 112 secured on the bottom of column 110 and positioned for latching with plunger 109 when lifted and the carrier is aligned with the car for transfer. Further details and variations of the coupling will be described especially with FIGURES 44–59.

Elevator for carrier

The preferred carrier mounted elevator 104, shown in FIGURES 8–15 and 60–65 has four stationary guides 114 secured to depend from the frame of the carrier, a telescoping guide 115 which rides up and down in each stationary guide. As best seen from FIGURE 8, each stationary guide 114 is made up of two channels 116 turned face to face. Each telescoping guide 115 has two channels 117 each facing and inserted within a channel 116 and separated by and secured to a flat 118 lengthwise between them at the middle. A cable drum 120 is located at the top of each stationary guide. Drums 120 at each end of the container berth are secured on a shaft 121 bearing mounted at 122 and turned by worm gear 123, FIGURE 12, through worm 124 mounted on shaft 125 with the worm 124 for the opposite end. Shaft 125 is bearing mounted at 126 and driven by motor 128 through spur gears 129. Two or more wire ropes 132 are wrapped on each drum 120 and run down and each around a sheave 134 on a pin connected between channels 116 on each telescoping guide, and the ropes are run up and each over a sheave 135 on the end of the rod of a cylinder 136 and down to anchor 138 on cylinder 136, which is bracket mounted vertically at the bottom of stationary guide 114 between channels 117 to extend sheaves 135 up to return the elevator up empty.

A hook pin 140 connects ropes 132 on the same guides. The pin is preferably secured to the ropes by opening the strands of wire and inserting the rod between and casting a low melting metal ring 142, FIGURES 13–14, in a groove around each end of the pin. The pin can hook under container hook 144 or can have a U-shackle hook 146 pivotally mounted to swing on pin 140 to engage under hook 144 on the container.

As ropes 132 are reeled on drums 120 the hook pins with container and telescoping guides are raised. The ropes are unreeled to lower the container and telescoping guides. After the container is set down pins 140 are run around the bottom of sheaves 134 and up to disengage and clear the container by pressuring cylinder 136 which thereby also lifts the telescoping guides. Sheaves 134 each have notches 148 for ring 142. This elevator can have the safety feature that cylinders 136 can lift the hook pins 140 and guides 115 clear if motor 128 fails.

Elevator 104 is preferably controlled by photoelectric cells 150 and 151 using signal lamps 152 and 153 on the container car, using a flashlight for truck loading and unloading, and by cells 150 and 151 and lamp held by an operator or by alignment relay 154 and contacts for automatic control over the dolly runs, or by hand switches 156 and 157 if an operator is on the carrier. When alignment lamp 158 connected across battery 160 through front contacts of relay U on the container car shines between cells 161 and 162, FIGURE 38, remove signal lamp 152 and empty berth signal lamp 153 are directed up respectively to photoelectric cells 150 and 151. Lamp 153 is lit by a circuit from the positive of battery 160, flexible leads 163 connecting limit switch 164 closed by vertical coupling pin 109, line 166, normally closed contacts of limit switch 168 closed when the berth is empty, lamp 153, in series to ground battery 160, to shine on cell 151 connected through amplifier 171 to lift relay U" on the carrier, closing a circuit from the positive of battery 172, line 174, front contacts of relay U" in parallel with open hand switch 157, line 176, normally open contacts of limit switch 178 closed by the container up in the carrier, top coil of motor control relay 180, in series to ground, lifting relay 180. Relay 180 is held by a circuit from the positive of battery 172, line 182, limit switch 184 mounted on a stationary guide and closed when cylinders 136 are retracted, front contacts and bottom coil of relay 180, in series to ground. Relay 180 closes a circuit from the positive of battery 172, line 174, upper normally closed contacts on limit switch 186 closed whenever the telescoping members 115 are above bottom, front contacts 188 of relay 180, line 189, front contacts 190 of relay 180, coil of starter 192 to ground. The starter closes a circuit from line 189, front contacts 193 of relay 180, armature of motor 128, front contacts 194 of relay 180, series field 195 of motor 128, contacts and resistance of starter 192, to ground in series, starting motor 128 to lower the container. After the container is set down on the car the elevator continues down until a telescoping slide 115 engages limit switch 186, closing bottom contacts and then opening top contacts, releasing the starter, which returns to "off" under spring pressure, stopping motor 128. A circuit is then closed from the positive of battery 172, line 174, bottom contacts of limit switches 186 and 196, and front contacts of relay 180, left coil of solenoid valve 198, in series to ground, reversing valve 198, connecting pressure from source 199 to heads of cylinders 136, extending them to lift ropes 132, carrying the hook pins around under sheaves 134 and up with the telescoping slides 115 on the back thereof to position shown in FIGURE 12. As cylinder 136 lifts it opens limit switch 184, deenergizing relay 180, which opens the circuit to the left solenoid of valve 198 which remains stationary.

When a container is to be removed from the car a circuit is closed either through a routing card 200 to light lamp 152 or through button 202 preferred for most passenger containers. Pressing button 202 or the connection of routing control through card 200 to segment 204 closes a circuit from the positive of battery 160, flexible leads 163 to limit switch 164 to line 166, normally open bottom contacts of limit switch 168 closed by a container in the berth, line 206, normally open contacts of button 202 or connection through routing contact segment 204 in parallel, coil of relay U to ground, lifting relay U, closing a holding circuit from line 206, top front contacts and coil of relay U, to ground. Alignment lamp 158 is lit by a circuit from the positive of battery 160, line 208, lower front contacts of relay U and L in parallel, alignment lamp 158, to ground. Remove lamp 152 is lit by a circuit from line 166, normally open contacts of limit switch 168, front contacts of relay U, lamp 152, to ground. When the carrier is aligned, light from lamp 152 shines on cell 150 connected through amplifier 170 to lift relay L" on the carrier, closing a circuit from the positive of battery 172, line 174, front contacts of relay L" in parallel with open hand switch 156, line 208, normally closed contacts of limit switch 178 closed when the berth is empty, normally open contacts of limit switch 196 closed when telescoping slides 115 are up, right hand solenoid of valve 198, to ground, throwing valve 198 to exhaust cylinders 136 to lower slides 115 and pins 140 which run under sheaves 134 to close on the container hooks 144. When the slides reach bottom they close limit switch 184, closing circuits from the positive of battery 172, line 182, limit switch 184, line 214, back contacts of switch 196 closed when the elevator is extended, line 215, back contacts 216 of relay 180 dropped when cylinders 136 extended, coil of starter 192 to ground, and from line 215, back contacts 190 and 194 of relay 180, armature of motor 128, back contacts 193 of relay 180, field 195, contacts and resistance of starter 192, in series to ground, driving motor 128 to reel up the cables lifting the container until limit switch 196 opens when slides 115 reach the top.

Relays U' and L' which control automatic loading and unloading of the carrier at the storage yard similarly control elevator 104 by connection from the positive of battery 172, line 174, front contacts of relay 154, line 220, front contacts of relay U' to line 176 to unload, and from line 220, front contacts of relay L' to line 208 to load.

Automatic routing

The route for the container is determined by an attendant or is predetermined as a standard between the shipping and receiving points. The container unloaded from the trunk is to have the route shown in FIGURE 16 wherein transfers of the container to and from stations are indicated by vertical arrows between an upper row of horizontal lines indicating stations and a lower row of horizontal lines and numbers indicating trains which can carry the container on its route between stations. The container at the point of origin is to be placed on a train which passes the third station to the right, intermediate stations being indicated by dashed lines. At the third station it is to be removed from the train and put in storage by the monorail carrier system at that station and put on a train which goes to or by the station at which the container is to be put off, which in this example is the second station from the transfer station and the destination.

Routing card or tape

The route for the container is recorded on a punched card or tape 200, FIGURE 17. The card or tape has sprocket teeth holes 222 punched along the sides for driving the tape and is ruled with horizontal station lines 224 counted from the bottom line as zero up as the number of stations between which the container is to pass along the route, which determines the vertical length of the card or tape, and vertical train number or call out of storage lines 225 numbered from left to right starting with zero the station column, to facilitate punching and reading the card. The train number punched on the card need not be the number used by the railroad in their time tables. Each train making the same run in a given direction should have the same number. Each train has another number for the return run. The horizontal column from the originating station is punched at 2 and 4 the number of any or all trains over a given route which can take the container to the station at which the container is to be removed from the train. The station column is punched at the third and fifth container stations from the originating station, since the route FIGURE 16 shows the container is to be put off train 2 or 4 at the third station and from train 3 at the fifth station. The horizontal column from the third station is punched for train number 3 which is known to make the run to the destination. A train number such as 1 can be reserved for calling the container out of storage at the destination station. Other call out numbers can be reserved for calling out empty containers of a particular type from storage using a card 200 for storage. By this system the route shown in FIGURE 16 is represented by station holes 226 and train and call out holes 227 in tape 200. This tape can also be used for figuring billing.

Routing card reader

The routing card or tape is inserted in a route reader, box 230, on the container as the preferred and simplest method for routing the container. Box 230 is made of one piece steel formed into a square pan with back for mounting to the outside of a container 24f or 24p, and top, bottom, and sides. A formed channel 236 runs across the front and is welded to the sides legs out. A partition 238 runs from top to bottom and side to side within the box and has semicircular pockets 240 and 241 respectively across the top and bottom. A cover 242 is hinged at 243 to swing up giving access to pocket 240. A tape holder plate 244 is pivoted at 245 to partition 238 and held by spring 246 against the partition. The holder is swung forward by pulling lip 250 at the top and has sides 252 for guiding the tape. With the holder forward, the bottom of tape 200 is inserted down between the sides of holder 244 until the bottom of the tape strikes fingers 254 extending in from the front of box 230 nearly to partition 238. As the holder is returned by spring 246 against partition 238 teeth on sprockets 256 engage through slots 247 in partition 238 and into holes 222 along the edges of the tape before the bottom edge of the tape swings free from fingers 254. If the tape is much longer than holder 244 the end of the tape 200 can be coiled and inserted in pocket 240. A contact finger or brush 258 is now in position of zero station, zero train on the tape. Partition 238 has a slot 260 for brush 258 to move in across train number lines 225 on the tape. Plate 244 has an opening or recess in front over slot 260 in which is secured a sheet of insulating material 262 supporting a contact plate 204 and a contact strip or plate 265 to be engaged by brush 258 through respectively holes 226 and 227 in tape 200. Contact 258 reads the record by making contact to backing plate 204 or 265 through holes in tape 200. The tape is moved down one line for each transfer station approached. This is done by driving sprockets 256 with a solenoid ratchet 266, which is energized from a circuit closed along ramp rail 268, FIGURE 21, along the right-of-way ahead of each transfer station. Sprockets 256 and wheel of ratchet 266 are secured on shaft 270 journaled at 272 to box 230. The number of teeth on the wheel of ratchet 266 equals the number of teeth on each sprocket 256, and the front edge of tape 200 is cut with relation to the sprocket holes and the zero station line so that when the card is inserted to stops 254 finger 258 is on the first line and the sprocket teeth align with holes 222. As the tape is read it is coiled up in bottom pocket 241, which has a cover 274 on rod 275 to box 230. Cover 274 extends behind the roll which forms in pocket 241 to eject the roll when the cover is opened at the end of the trip. Holes 276 are for locks, seals or other means to secure the covers in closed position.

Brush 258 is mounted on an insulator 278 to an endless steel tape 280, which is supported on sprockets 282 and 283 having teeth engaging holes 284 in tape 280. Sprockets 282 and 283 are secured on vertical shafts 286 and 287 respectively, bearing mounted in brackets 290 secured to box 230. The contact brush 258 is moved horizontally when the container is at a station and a train signals its number to the station. Sprocket 283 is driven by solenoid ratchet 292 to move contact 258 to the right one column each tooth ratcheted. Solenoid ratchet 292 is energized by a number of pulses from the approaching train equal to the train's number, to turn ratchet 292 that number of teeth, to move contact 258 that number of spaces to the left, to represent the train number. A spring 294 around shaft 286 has one end secured to shaft 286 and the other end secured to box 230 to return contact 258 to the station column against stop 296 when ratchet 292 is released by rod 298 or solenoid 300 lifting the holding pawl of ratchet 292. Reset rod 298 extends along or within the container wall to a point below the container and is mounted to slide up and down. Rod 298 extends up to a bell crank 301, FIGURE 20, to engage against the plunger of solenoid 300, which is lifted either electrically or by rod 298. Rod 298 engages the platform or floor of the railway car to release contact 258 to the station column when the container is put on the train and solenoid 300 is lifted at the storage yard by a reset signal before each container train signals its number.

Referring to FIGURES 21-24, each container berth on the car has one or more recessing electrical plugs 68 for engaging in recepticals 68' in the bottom of the container. The plug is pushed into the receptical by pin and lever linkage 310 when the container is set down on the pin and is withdrawn by spring 312 when the container is lifted, partway withdrawing plug 68 into the platform or floor, where its contacts are protected from fouling. The platform or floor is preferably open for snow and rain to pass through to prevent ice build up. As the container travels enroute, ratchet 266 is operated by a circuit from the positive of battery 160 on the train, line 314, contacts 1 of plug 68 to the container, solenoid of ratchet 266, contacts 2 of plug 68, line 316, front contacts of ramp switch 304, to ground of battery 160, to turn ratchet 266 one tooth, to move the routing tape to the next station line when ramp switch 304 passes over ramp 268.

If transfer of the passenger container is to be controlled the conductor no routing card would be needed and accordingly the controls can be reduced to those shown for the container 24p above the right-hand berth in FIGURE 21. These controls give the container a call out number to which it responds to be called out of storage, especially as when empty to be loaded on a train which signals its number. Corresponding parts are similarly labeled. A finger 258' on the shaft of ratchet 292 completes the circuit when ratcheted to the number position connecting contacts 265', connecting points 1 and 3 of plug 68.

Further details and operation of the routing controls will be made clear following the sequence of operation as a train approaches the station from the left.

Way points

At way point zero located about ten miles ahead of the station the train announces its approach at the station, so that the carriers if in use can be unloaded and run to the call section. The train completes a circuit from the negative of battery 160, shoe 320 preferably on the leading car or locomotive, rail 321 at way point 0, connected by line 322 to bell 323 or other annunciator, to ground of battery 160.

At way point 1 located approximately five miles or more ahead of the station depending on expected train speeds etc., the train first completes circuit from the negative of battery 160, shoe 320 engaging rail 324 at way point 1, line 325 to the station, rectifier 326 to line 327, all in series; and from line 327 the following are connected to ground to battery 160: bell 328 of another pitch, and reset solenoids 329 on reservation counters RS1 and RS2. Line 325 continues along each dolly run where circuits are completed on each container in storage from line 325, shoe 330 on the dolly set for each container, contact 5 of plug 68, rectifier 351, dent release solenoid 300, contact 6 of plug 68, to ground of battery 160.

After shoe 320 leaves rail 324 shoe 332 engages rail 324 to signal the train's number to the containers in storage on dollies at the station. A train number selector switch 333 has knob 334 with arrow to set to a number representing the route of the train before the train makes the run. Knob 334 turns plate 336 which electrically connects segment 337 to a number of contacts 338 corresponding to the number set by knob 334. The selector switch has the usual dents and ball to hold it at the number selected. Contacts 338 are each connected to a contact 339 on a rotary switch 340. Switch 340 makes one revolution to signal the train number. Switch 340 is driven by motor 342 by a circuit from the positive of battery 160, normally open contacts of limit switch 304 closed by engaging ramp 268 at way point 1, segment 346, wiper finger 347, slip ring 348, motor 342 to ground of battery 160, starting motor 342, which turns finger 347 off segment 346 and stops. When limit switch 304 leaves ramp 268 a circuit is completed from the positive of battery 160, normally closed contacts of limit switch 304, segment 349, finger 347, ring 348, motor 342, to ground. Switch 340 is turned one revolution until finger 347 engages segment 346 and leaves segment 349. As switch 340 rotates finger 347' thereon makes and breaks all contacts 339, but only the contacts 338 connected to plate 336 connect a pulse from the positive of battery 160, segment 350, wiper 347, contacts 339 to contacts 338, plate 336 connecting contacts 338 in number equal to the train number set, shoe 332, rail 324, line 325 extending along the dolly runs, shoe 330 on each dolly, contacts 5 of plug 68, rectifier 351, solenoid of ratchet 292, contacts 6 of plug 68, to ground of battery 160. Each time this circuit is completed ratchets 292 on the containers in storage turn one tooth to count the train number. After the ratchets have counted to the train number, routing cards having a hole at the count connect on that dolly shoe 352 on rail 353 to shoe 354 on dolly spot rail 355 through brush 258 engaging plate 265.

The containers to be put on the train are now ready to be counted by a ratchet 356 controlled by rotary switch 357, which connects a line 358 from a rail 355 for each container spot in the storage yard in succession to line 360 through rectifier 362 to the solenoid of ratchet 356 to step one step for each container waiting to be put on that train. Switch 357 is rotated by motor 364 once to read the count to the ratchet. Motor 364 is started by a circuit from the negative of battery 160, shoe 320 on the train, rail 366 after the train number is pulsed to the containers, line 368 from rail 366 to the station, segment 370, wiper 371, ring 372, rectifier 373 which passes current of negative polarity, motor 364, all in series to ground of battery 160. This circuit turns motor 364 until wiper 371 leaves segment 370. After shoe 320 leaves rail 366 it engages rail 374 connected by line 376 to segment 378, wiper 371, ring 372, rectifier 373, motor 364 to ground, to turn switch 357 one revolution and stop it with wiper 371 on segment 370.

Way point 2 is reached after the number of containers to be put on the train is counted and preferably is at the same location as way point 1.

Way points 2–4 are each maximum train length or more apart and are for selecting which cars the carriers are to align for transfer and for setting reservation memory relays in these cars for signaling the loading requirements of the cars reserved for transfer from way point 5 to the carriers at the station and for starting timing at way point 7 to control the start of each carrier to align with the particular car in the train for which it is reserved.

The cars are reserved for transfer on a priority basis to best utilize the available carriers. First priority is at way point 2 where they are reserved to unload the containers for the station and take containers on the empty berths on these cars. Second priority is at way point 3 where cars having two empty berths are reserved to take containers for the train which have not yet been reserved a berth. Third priority is at way point 4 where cars having one empty berth are reserved to take any remaining containers for the train. The reservations for transfer are stopped when available carriers are taken or when all empty berths on the train are reserved or when all containers to be loaded are reserved a berth. Way points 2, 3, and 4 are maximum train length or more apart to reserve transfers with this priority. More or fewer way points can provide more or fewer conditions of priority.

The circuits for reserving the cars for transfer are shown on the car in FIGURE 21 and at way points 2, 3, and 4, and in abridged form on the car shown at way point 2 in FIGURE 26. On each container car for each berth there is a load relay L and an unload relay U which when any is energized reserves the car for transfer. Relays L and U are stick relays. Relays U are lifted only at way point 2, and relays L may be lifted only at way points 2, 3, or 4. They are lifted each by a circuit completed through contacts of way point relays 1L and 1U for the first berth and 2L and 2U for the second berth, which read the loading conditions of the car and through ratchet switches RS1 and RS2 which limit the number of reservations respectively to the number of carriers and number of containers for transfer at the station. The carriers available are set on a ratchet counting switch RS1 which is similar to switch RS2 except switch RS1 is set by knob 379, since the number of carriers available at the station remains fixed except for repairs etc.

Ratchet switch RS1 has a stationary segment 380 and a revolvable segment 381 connected by a revolving finger 382 driven by ratchet 384. The revolving segment 382 is set in a position relative to fixed segment 380 to represent the number of carriers available for the transfer at the station. Ratchet 384 indexes one tooth for each car having one or more containers to be transferred. Ratchet switch RS2 has a stationary segment 386, a revolvable segment 387 driven by solenoid ratchet 356, a finger 388 connecting annular segments 386 and 387, and a ratchet 390 for driving finger 388 in the same direction as ratchet 356 which counts the containers to be put on the train.

The circuit for relay U is from the positive of battery 160, FIGURE 21, line 314, pin contacts 1 of plug 68, contact 204 engaged by brush 258 on a container having a hole 226 in its routing card for the station, flexible lead 393, contacts 3 on plug 68, bottom contacts of load switch 168 closed by the weight of the container, coil of relay U, line 394, shoe AU, rail AUr, FIGURE 26, line 397, all in series, front contacts of relays 1U and 2U in parallel, line 398, top coil of ratchet 384, brush and adjustable segment 381, finger 382, segment 380, in series to ground to energize relay U when a container is to be put off at the station and a carrier is available therefore. Relay U is held by connecting line 394 to ground through front contacts of relay U, line 400, FIGURE 21, normally closed contacts of reset switch 304 to ground of battery 160, to reserve the car for the transfer. If the other berth in the car is empty its relay L is lifted by a circuit from the positive of battery 160, top contacts of load switch 168 closed when the berth is empty, coil of relay L, shoe AL, rail ALr to line 397 all in series; from line 397, front contacts of relays 1U and 2U in parallel, front contacts of relays 1L and 2L in parallel to line 404, and from line 404 in series, lower coil, brush, segment, finger, segment of ratchet switch RS2, line 406, bottom coil of ratchet 384, brush, moveable segment, finger, and fixed segment of ratchet switch RS1, to ground of battery 160. Ratchet 390 thus is energized to subtract one container from these waiting to load, but ratchet 384 already is energized through relay U and rail AU and is energized thereby for a longer period of time inclusive of the time shoe AL engages rail AL, so that ratchet 384 only ratchets one tooth when a car has a container for the station and an empty berth for a container to be loaded. There is only one shoe AU and AL for all berths on each car.

Rails 1LUr, 2LUr, and ALr are provided at way points 2, 3, and 4. Rail AUr is also provided at way point 2. Shoes 1LU and 2LU engage respectively rails 1LUr and 2LUr at each way point 2, 3, and 4 for an interval during which shoe AU engages rail AUr for a shorter interval therewithin, during which at way point 2 shoe AL engages rail ALr for a yet shorter interval therewithin. At way points 2, 3, and 4 to each rail 1LUr and 2LUr is connected respectively the coil of relay 1L and 2L in series with rectifier 410 to pass current of positive polarity to ground. At way points 2 and 4 to each rail 1LUr and 2LUr is connected respectively the coil of a relay 1U and 2U in series with rectifier 412 to pass current of negative polarity to ground.

After the train passes way point 2 if there are more containers and carriers at the station available and unreserved for transfer, i.e. when respectively fingers 388 and 382 of counters RS2 and RS1 still make contacts, a circuit is completed from way point 3 from the positive of battery 160 on each container car having all or both berths empty; line 392, FIGURE 21, top contacts of each limit switch 168 in series with the coil of relay L for that berth; shoe AL; rail ALr, FIGURE 26; front contacts of relays 1L and 2L in series; top coil of ratchet 390, which coil turns the ratchet two teeth; brush, moveable segment, finger, and stationary segment of ratchet switch RS2; line 406; coil of ratchet 384; brush, moveable segment, finger, fixed segment of ratchet switch RS1 to ground of battery 160; to subtract two containers from those counted at the station and one carrier and to reserve the car for transfer.

At way point 4 the cars having no container to be removed and one empty berth are reserved and counted to the limit of the number of containers to be loaded or to the number of carriers available for loading or to the limit of empty berths in the train, whichever comes first. When one berth on a car is empty and the other has a container for a different station a circuit is completed from the positive of battery 160, line 392, FIGURE 21, top contacts of the limit switch 168 closed at the empty berth, coil of relay L for that berth, shoe AL, rail ALr, front contacts of relay 1L, back contacts of relay 2U and 2L in series to line 404; in parallel therewith from rail ALr, back contacts of relay 1U and 1L and front contacts of relay 2L in series to line 404; from line 404 the circuit is the same as completed by way point 2 through bottom coil of ratchet 390; brush, subtracting segment, finger, and fixed segment of ratchet switch RS2; line 406; coil of ratchet 384; brush, subtracting segment, finger, and fixed segment of ratchet switch RS1; all in series to ground.

From way point 5, FIGURE 27, the loading record on each car reserved is transferred to the carrier which will align it. The carriers are waiting on a call stop S5. The call stop aligns the train of carriers so that a shoe 426 for each berth on the carrier, and equally spaced along the length of the carrier train, aligns a call segment C1, C2, C3, etc. The number of call segments is preferably equal to the number of carrier berths, so that only one call stop S5 is required to receive signals from trains in either direction. If more or fewer carriers are used with traffic in two directions, two call stops are provided, one for each front of the carrier train according to the direction of the railroad train with which transfer is to be made. With a call stop for each end of the train of carriers the number of carriers used could be varied to the maximum number of call segments without change of wiring.

At way point 5, rail conductors RB1 and RB2 are provided, one for each berth on car 26f or 26p, to be engaged respectively by shoes B1 and B2 on the car. Rails RB1 and RB2 are each connected by ratchet stepping switch RS3 to a successive odd and even numbered call segments C1, C2, C3, etc. and to the next successive call lines after each car reserved for transfer passes way point 5. When shoes B1 and B2 on the first car reserved for transfer simultaneously engage rails RB1 and RB2 respectively switch RS3 is in starting position shown, and a circuit is completed for each berth to be loaded on that car to the corresponding berth on the first carrier at the station according to the direction of the train.

The car shown in FIGURE 21 has its first berth empty and a container in its second berth to be put off at the station. If the car is reserved for transfer relay L for berth 1 may be up and relay U for berth 2 will be up. The circuit for the empty berth is from the positive of battery 160, line 314, line 392, front contacts of relay L for that berth, shoe B1, rail RB1, FIGURE 27, rectifier 422, segment 424, brush 425, contact and line to call segment C1, shoe 426 for the first berth of the corresponding carrier, FIGURE 36, line 428, rectifier 429, coil of relay L', to ground of battery 160. This circuit energizes relay L', closing a holding circuit from the positive of battery 172 on the carrier, front contacts of reset switch 432 opened by ramp 433 after the carrier leaves the storage yard, normally closed back contacts of load switch 178 opened by a container in the berth, front contacts and coil of relay L', to ground of battery 172.

Carriers 20 and 20e each make connections from the positive of battery 172 through front contacts of relay L' to shoe 502 and from the negative of battery 172, fuse in parallel with warning signal light and bell 238, front contacts of relay U' to shoe 502.

Relays U' are energized as the carrier enters or leaves the storage yard to unload by a circuit from the negative of battery 440, FIGURE 37, line 441, rail 442, shoe 426 on each carrier, FIGURE 34, line 428, rectifier 444, coil of relay U', to ground of battery 440. Relay U' is held by a circuit from the negative of battery 172 on the carrier, normally open contacts of limit switch 178 closed by a container on the berth, front contacts and coil of relay U' to ground.

The ratchet of switch RS3 has an upper coil connected between rail RB1 and ground and a lower coil connected between rail RB2 and ground to extend pawl 448 of the ratchet one tooth when either or both closing circuits for relay L' or U' are completed. Pawl 448 does not turn switch RS3 when energized, since stop pawl 450 holds it; but when shoes B1 and B2 leave rails RB1 and RB2, opening the circuit, ratchet 448 returns under force of spring 452 to step switch RS3 one tooth to connect rails B1 and B2 respectively to the next carrier call lines C3 and C4. Thus it should be observed that only cars reserved for transefer (i.e. have one or more relays L or U lifted) step switch RS3 and each car reserved steps switch RS3 only once and that is after passing way point 5, after signaling to the corresponding carrier on call from way point 5.

Where the number of containers to be transferred is large it is preferred to unload the train before loading, so that the berths unloaded can be reloaded to reduce the length of the train.

Stations S2 and S3 in FIGURES 29 and 30 have the monorail tracks ST extending along track T1–2 in both directions from the station. Empty carriers 20f are spotted at the far ends of each monorail run. When the train approaches station S2 or S3 it resets ratchet switches RS1–3, signals its approach and number, and turns ratchets 266 one tooth on all its containers 24fp to set tape 200 for the next station as in FIGURES 21 and 26.

At way point 2U, FIGURE 31, a circuit is closed from the positive of battery 160 to shoe AU, as described with FIGURE 21, on each car having one or more containers for the station; rail AUr at way point 2; coil of ratchet 384; brush, moveable segment set to number of carriers available for unloading, finger, and stationary segment of ratchet switch RS1 for the station; in series to ground of battery 160, to reserve the car for transfer and to subtract a carrier from those available until all cars having containers for the station are reserved or until all available carriers are reserved when finger 382 leaves adjustable contact 381, opening the circuit.

At way point 3L, FIGURE 32, nearer the station (a few feet is enough) cars having two empty berths or berths to be empty are counted to the number of containers to be put on the train. Coils of relays 1L and 2L are connected from rail 1LUr and 2LUr respectively to ground to be energized when the shoe 1LU or 2LU of an empty berth or one to be emptied passes. Rails AUr and ALr are connected together and then through contacts of relays 2L and 1L; double count coil of relay 390; brush, moveable segment, finger, and stationary segment of count switch RS2 for the station; all in series to ground, to lift relay L in each berth available for loading, reserve the car for transfer, and to subtract two containers from switch RS2 set by ratchet 356 to the number of containers waiting to be loaded as in FIGURE 26.

Way point 4L, FIGURE 32, is met after the train passes way point 3L. Way point 4L counts cars with one berth empty or to be empty if there are more containers waiting than can be placed on empty cars and more carriers available. Coils of relays 1L tnd 2L are connected respectively from rails 1LUr and 2LUr at way point 4L to ground. Rails ALr and AUr at way point 4L are connected together and to front contacts of relay 1L in series with back contacts of relay 2L both in parallel with back contacts on relay 1L in series with front contacts on relay 2L; single count coil of ratchet 390; moveable segment, finger, fixed segment of reservation switch RS2 for the way point; to ground, to close relays L and U not already closed where the berth will be empty and needed for loading.

Way point 5L, FIGURE 33, is reached after the train passes way point 4L. Way point 5L signals the train loading to the station for loading the carriers to align containers with empty berths on the train. Way point 5L is the same as way point 5, FIGURE 27, except that shoes B1 and B2 connected to either the positive or negative of battery 160 on the cars both signal from way point 5L for the carrier to load. A positive signal on a call line means load and a negative signal means unload, therefore when shoe B1 or B2 is negative at way point 5L a positive signal is to be put on the call section connected. Accordingly the positive of battery 454 is connected through front contacts of relays B1R and B2R to first and second ring segments of switch RS3, and coils of these relays are connected between ground and rails B1r and B2r respectively. The coil of ratchet 446 is connected to the positive of battery 454 through front contacts of relays B1R and B2R and work similarly as at way point 5.

Carrier loading station

After the train passes way point 5 or 5L and all carriers to participate in the transfer are coded for loading, shoe 320 on the train engages rail 456, FIGURE 27, along the trackway to reset stepping switches and to start loading. Connection is made from the negative of battery 160, FIGURE 26, shoe 320, rail 456, FIGURE 27, rectifier 457 (optional), line 458, solenoid of stop pawl 450 on switch RS3 to ground of battery 160 to reset switch RS3 under force of springs 460. The top coil of relay SL, FIGURE 36, is also connected to line 458 to start loading at the station.

Relay SL closes a hold circuit from the negative of battery 462, switch 463, line 464, annular segments 465 and 466 connected by finger 468 on selector switch SS in loading and unloading positions, front contacts and lower coil of relay SL, all in series to ground of battery 462. Relay SL connects power to each dolly run for positioning the dollies for loading or unloading the carriers. Along each dolly run is run a control power line 353 connected through front or back contacts of relay SL respectively to the positive or negative of battery 462 for positioning dollies for loading or unloading the carriers respectively. Connection is made from the positive of battery 462, line 472, front contacts of relay SL, to lines 353 along each dolly run, shoe 352 on each dolly on each run, contact 4 of plug 68, plate 265, brush 258 making contact on each container to be put on the train, contact 3 of plug 68, normally open contacts of limit switch 476 closed by the container on the dolly, rectifier 478, shoe 480, to alignment segments DSF, DS, or DSR which run in a line along each dolly run, and from these segments, coils of dolly control relays DF, D, and DR, to ground. Normally open contacts of operator's switch 482 is connected across the front contacts of relay SL to manually complete this circuit to load one or more carriers. For positioning the dollies for unloading, connection is from the negative of battery 462, line 464, back contacts of relay SL to lines 353, shoe 352 on each dolly on each run, normally closed contacts on container switch 476 closed when the dolly is empty, rectifier 484 which passes the negative current to shoe 480 on each empty dolly to segment DSF, DS, or DSR, to the coil of respectively relay DF, D, or DR, to ground. Relays DF and DR drive the dolly train forward or backward to place a dolly in alignment on stop DS for transfer, and relay D then stops the dolly train for transfer.

Each dolly motor DM is connected from battery 462 or other supply through front contacts 488 of relay ER which checks that the elevators are retracted, line 490, back contacts of relay D for that dolly run, line 492, top front conacts of relay DF or DR to coil of starter 494, to ground, and from line 492, front contacts of relay DR, starting resistance and armature of dolly motor DM, lower front contacts of relay DR, series field of motor DM, to ground, or from line 492 through lower front contacts of relay DF, back contacts of relay DR, armature of DM, resistance of the starter, back contacts of relay DR, front contacts of relay DF, field of DM, to ground, to drive the dolly train in the opposite direction. Brake release coil 496 is in parallel with the starter coil. Also a braking resistor 498 is connected through front contacts of relay D across the armature of DM to stop the dolly train when relay D is lifted by a live shoe 480 engaging segment DS.

If relay DR lifts, the dolly train is driven to the left (up in FIGURE 36). If relay DF lifts with relay DR dropped the dolly train is driven to the right (down in FIGURE 36). If relay D lifts, the dolly train can be stopped within a few inches on segment DS with a strong brake and low dolly speed. If the dollies move too fast to stop when relay D lifts they will ride to the left until relay DR drops. Then relay DF comes in control and the dolly train moves to the right. Then if it over runs a stop relay DR lifts to bring it back to the stop. Additional segments can be contacted and relays picked up by a live shoe 480 to slow the dolly train before stop DS.

The voltage on control line CL determines the speed and direction of the carrier movement. The carriers are controlled therefrom as the train in my patents, Nos. 3,037,461 and 3,037,462 and as will be described later with FIGURE 38.

The positioning of the carriers for automatic loading and unloading at the storage yard is controlled by selector switch SS, FIGURE 36, which sets a stop at the dolly run with which transfer can be made. The switch selects the farthest dolly run to the left having a container to be loaded on the carrier or an empty dolly for unloading the carrier according to the polarity of lines 353, positive for loading, negative for unloading the carriers.

Along the monorail above the dolly runs is run a signal line comprising stop segments 501 each located to be engaged by a shoe 502 for each berth on the carriers when aligned for transfer with that dolly run and a line segment 504 at each end of each segment 501 to be engaged by shoes 502 when the carrier train is not aligned for transfer. Segments 501 and 504 in sequence from left to right are connected by lines to stationary contacts 501' and 504' respectively arranged preferably alternately in two concentric arcs. Switch SS has a contact arm 506 with brush 507 for engaging contacts 501'. Arm 506 is flanked by concentric conducting annular segments, 508 on the left and 509 on the right, each together with arm 506 connected by insulating material to the shaft of switch SS turned by motor PMS. Three concentric stationary rings 510, 511, and 512 are each engaged by a brush connected respectively to segment 508, brush on arm 506, and segment 509. The coils of carrier control relays CR, CS, and CF are connected across respectively rings 510, 511, and 512 to ground. Relays CR, CS, and CF connect station control line CL to positive, ground, or negative of battery 462 respectively to move the carrier train to the right, stop it, or to the left respectively to locate the carrier train in alignment for transfer with one or more dolly runs, so that the first carrier berth from the left which has a relay L' or U' lifted aligns the first dolly run from the left having respectively a container to be put on the train or an empty berth. Connection is made from the positive of battery 462, line 472, top front contacts of relays ER and CF and back contacts of relay CS, line 516, front contacts of isolation relay IR to control line CL to drive the carriers to the right. Connection is made from the negative of battery 462, line 518, front contacts of relays ER and CR and back contacts of relay CF and CS, line 516, front contacts of relay IR to control line CL to drive the carriers to the left. The control line is grounded to stop the carriers through front contacts of relays IR, CS, and back contacts of relay CF and separately from line 516 through back contacts of relay ER.

The coils of relays CF, CS, and CR are energized from shoes 502 on the carriers through contacts on selector switch SS according as a live shoe 502 is to the left, on, or to the right of the stop set on the selector switch SS. Each shoe 502 receives positive voltage from battery 172 through front contacts of relay L' and U' for that berth on the carrier 20 or 20e to pick up relay CF, CS, or CR.

Selector switch SS is driven by a circuit from the positive of battery 462, line 520, back contacts of switch control relay 522, motor PMS, to ground. Relays DF, D, and DR for each dolly run have front contacts which control relay 522 through a stop contact for each dolly run for loading and unloading at the storage yard. The circuit for relay 522 is from the positive of battery 462, line 520, back contacts of relays TR, TL, line 524, front contacts of relays DF, D, and DR in parallel for each dolly run, to a line 526 to a switch stop contact S1-7, wiper finger 530, ring 531, coil of relay 522 to ground. Contacts S1-4 of S1-7 are arranged in order clockwise for the dolly runs from left to right to each be connected by finger 530 when finger 506 is on the corresponding carrier stop over that dolly run.

Wiper 530 was on call stop S5 when relay SL lifted to start loading. If one or more containers are to be put on the train one or more relays DF, D, or DR are lifted, connecting power from battery 462 to a corresponding contact on switch SS. The carriers lift relay CF, CS, and/or CR according to where the containers are to be loaded on the carriers relative to the position of the carriers over the dollies. Program switch SS is stopped at the carrier stop over the dolly run farthest to the left having a container to be put on the train (for loading) or an empty dolly (for unloading the carriers). The carrier berth farthest to the left fulfilling the requirements (relay L' lifted for loading or relay U' lifted for unloading) makes this stop.

Whenever elevators at the station and on carriers over the dolly runs are extended the dollies and carriers at the station are held stopped. When the elevators at the station or on the carriers are retracted relay ER permits the carriers and dollies to operate. The coil of relay ER is connected in a circuit from battery 462 negative, line 532, back contacts of all relays 534, all bottom contacts of elevator limit switches 536 closed when the station elevators are down, coil of relay ER to ground all in series. When a carrier 20e on a load-unload stop has an elevator extended relay 534 for that stop opens its contacts by a circuit from the positive of battery 172, contacts of elevator-up switch 196 closed whenever the elevator is not fully up, shoe 538, contact rail 540 above that dolly run for engaging only a shoe 538, coil of the relay 534 for that dolly run, to ground.

A line 542 connects the locator stop D on each dolly run to a locator rail 544 along the monorail. Rail 544 is positioned to be engaged by shoe 546 for any berth on the carrier 20 or 20e when that berth is positioned for loading or unloading with respect to the dolly engaging contact 480 connected.

On the carrier without elevators, shown at the left of FIGURE 36, front contacts of relay L' for each carrier berth are connected in series with rectifier 548 across shoes 549 and 546 in parallel with front contacts of relay U' and rectifier 550. Rectifiers 548 and 550 pass current respectively to and from shoe 549. Shoes 549 and 546 are spaced equally with berths and align on rails 551 and 544 respectively over each transfer station (dolly run) on whichever berth stops over the dolly for transfer.

If the berth stopped over the dolly has relay L' lifted, indicating that it is to be loaded and the dolly at the elevator is aligned and has a container to be loaded, a circuit is completed from shoe 549 to shoe 546, rail 551, line 552, coil of station elevator control relay 554, to ground. Relay 554 has time delay to insure that the dollies and carrier are stopped before it closes a circuit from line 353, front contacts of relay 554, lower coil of two-way solenoid valve 92, to ground. Valve 92 reverses connecting the outlet of pump 90 to the bottom of hydraulic elevator 54, which raises, lifting the container off the dolly and up to engage hooks 556 on the carrier. Hooks 556 are preferably as described in my Patent No. 3,164,406 requiring an elevator which extends further for unloading than for loading. Hooks 556 latch under hooks 144 on the container and have side stops 557 to keep from slipping off sidewise. When the elevator is extended just beyond where the hooks latch, the container engages limit switch 178 opening contacts which drop relay L'. When the elevator extends to full open position of the hooks the elevator closes upper contacts of limit switch 536, which closes a circuit from line 552, rectifier 558 which passes current from line 553 when positive for loading, loading top limit contacts of switch 538, upper coil of valve 92, to ground. Valve 92 thereupon reverses to connect the head end of the elevator cylinder to line 560 to tank 562 to exhaust and lower the elevator at a speed limited by a restriction at the valve. Each elevator 54 under a container to be loaded and over which a carrier is stopped aligning a berth to be loaded transfers at about the same time. Each elevator closes bottom contacts of switch 536 when returned to bottom.

If the carrier has elevators as does the carrier 20e at the right in FIGURE 36, the same station loading circuits are used, but the carrier 20e has no shoe 549 and so does not cause the station elevator underneath to operate. The carrier's elevators are each controlled by a relay 154 connected across shoe 546 for that berth and ground by circuits described with FIGURE 15.

When all the elevators that transferred have retracted they close a circuit from the negative of battery 462, line 532 through back contacts of all relays 534 and elevator bottoming contacts of switches 536 in series to coil of relay ER to ground, to lift relay ER, to permit movement of the dollies and carriers. If the dolly run farthest to the left which loaded has another container to be loaded its contact on switch SS remains energized holding relay 522 up holding motor PMS on the same carrier stop. The next carrier from the left with a relay L' lifted completes the circuit from the positive of its battery 172, front contacts of relay L', shoe 502, stop 501, line to corresponding contact on switch SS, segment 509, ring 512, coil of relay CR, to ground, lifting relay CR, connecting the negative of battery 462 through front contacts of relays ER, CR, and IR and back contacts of relay CS to line CL, which controls the carriers to move to the left as will be described. The live shoe 502 engages successive stop rails as the carriers move to the left until the shoe engages the stop set, lifting relay CS, grounding line CL, stopping the carriers. If the carriers override the stop they are reversed when a live shoe 502 is connected to segment 508, lifting relay CF, placing a positive charge on rail CL. In the meantime each dolly run which has one or more containers for loading on the approaching train has either aligned one or is aligning one as described. As soon as a container to be transferred is aligned with a carrier berth to be loaded on a carried 20 relay 554 for that dolly run is energized and closes after a delay insuring that the carriers and dolly run have stopped before starting up elevator 54 repeating the loading cycle described. After which again the farthest dolly run to the left which still has a relay DF, D, or DR lifted holds or stops motor PMS thereon. The carriers can run backward or forward to align berths to complete loading or unloading.

Loading proceeds until the containers are all loaded or until the carriers are all loaded, or until the train reaches way point 6. When the containers are all loaded all shoes 480 are dead, dropping all relays DF, D, and DR, dropping relay 522 to start PMS to turn clockwise from the dolly run stops to set a waiting stop. If the number of containers for the train exceeds the number of carrier berths which can be loaded then when the carriers have all loaded relays CF, CS, and CR have all dropped, holding the carriers stopped.

Carrier waiting stops

When the last container for the train is loaded on a carrier all relays DF, D, and DR have dropped, opening the circuit of relay 522 which drops. Then when all the elevators at the station have retracted relay ER lifts to drive switch SS clockwise. When wiper 530 moves from the last dolly run stop 4 wiper 468 runs off segments 465 and 466, dropping relays SL and IR and disconnecting power from line 353 to hold the dollies from taking unloading positions.

Wiper 530 then engages waiting stops in successive positions 5, 6, and 7, respectively call stop S5, waiting stop S6 for a train from the left, and waiting stop S7 for a train from the right. Additional stops would be provided for additional transfer runs controlled by switch SS, and the setting of the stops would include the setting of switches for the carriers to get to the stop and return from transfer.

Switch SS stops on a stop which has a live contact met by wiper 530. Switch SS is stopped in position 5 by a circuit from the positive of battery 462, back contacts 564 of relay SL now closed, front contacts 566 of relay ER, line 567, normally closed contacts of manual switch 568 for releasing the carriers from the call stop, back contacts of relays TR, TL, and any others representing train direction and track, etc. outer fifth position contact of switch SS connected by wiper 530 to ring 531, coil of relay 522, in series to ground, lifting relay 522, stopping motor PMS, and from wiper 530 to line 570 to set the call stop S5 in FIGURE 37. Switch SS is stopped in position 6 or 7 by connection from line 567 to outer 6th or 7th position contacts through front contacts of relay TL or TR respectively.

The station control line CL extends from the station along the carrier track, FIGURE 37, to control the carriers to go to the stop set and controls the carriers which uncouple to be recoupled and to return to the station after transfer. The carrier track with paralleling conductors might extend a half mile or more according to maximum train speed, number of carriers, etc. (see FIGURE 41). The call stop is preferably at the station. Stops S6 and S7 are at carrier starting positions at the left and right hand ends of the transfer run to meet a train from the left or right respectively. Shoe 571 on the first carrier is set to engage call stop S5 and the left hand successive start stop S6 from which the carriers are started in groups of one or more at a time successively to align with individual cars on a train from the left at speed. Shoe 572 on the last carrier is set to miss these stops and engage the right hand successive stop S7 to place the last carrier first in line for starting carriers to meet a train from the right. If there were only one carrier both shoes 571 and 572 would be on that carrier or one shoe could engage stops S5, S6, and S7. If a call stop is also provided for a train from the right (so that the number of carriers used can vary) shoe 572 would engage it, and shoe 571 would miss it.

Each waiting stop when set controls the carriers to come to it and then stops the carriers when the shoe 571 or 572 arrives at the stop. Each waiting stop has a position line PL segmented into a forward segment 574, a stop segment 575, and a reverse segment 576; a position control power line 578 coextending with and parallel the position line and positioned so lines PL and 578 can be connected by shoe 571 or 572 on the carrier train; three relays 580, 581, and 582 the coils of which are connected from ground to respectively forward segment 574, stop 575, and reverse segment 576 to control the voltage on the control line CL according to which segment 574, 575, or 576 is contacted by shoe 571 or 572 to stop the carrier train with a shoe 571 or 572 on a stop 575. Line 570 is connected through back contacts of relays 580, 581, and 582 to control the line CL. Connection is made from line CL through back contacts of relay 581 and front contacts of relay 580 to an intermediate voltage tap on potentiometer 586 connected from line 570 to ground. Connection is made from line CL through resistance 588 and front contacts of relay 581 to ground and from line CL through front contacts of relay 582 and back contacts of relay 581 to adjustable tap of potentiometer 590 connected across battery 440.

To set call stop S5 a circuit is completed from positive of battery 462, FIGURE 36, back contacts 564 of relay SL, front contacts 566 of relay ER, line 567, normally closed contacts of call release switch 568, back contacts of relays TR and TL; outer contact connected by wiper 530 to inner contact at position 5 on switch SS, line 570 broken at a to FIGURE 37, from line 570 to line 578 at S5 and also from line 570 through back contacts of relays 580, 581, and 582 to control line CL, to draw the carriers from the left to the stop. Then when shoe 571 connects line 578 to line 574 the circuit is completed through relay 580 which lifts and puts a lower positive voltage on control line CL to slow the carriers. Next shoe 571 connects line 578 to 575, lifting relay 581, connecting the control line to ground to stop the carriers. If the carriers over run the stop, shoe 571 connects lines 578 and 576, lifting relay 582, and drops relay 581, connecting from the negative of battery 440 through part of potentiometer 590, back contacts of relay 581 and front contacts of relay 582 to line CL to put a negative polarity on the control line to drive the carriers slowly back to the stop. Lines 576 and 578 extend to the right a considerable distance to return the carriers to the stop when the carriers complete loading or unloading with shoe 571 to the right of the stop and the stop is set.

When the train reaches way point 6, FIGURE 29, loading should be completed, if not, it is terminated as soon as the elevators are retracted. Train shoe 320 contacts rail 596 at way point 6, connecting battery 160 on the train across the lifting coil of latching relay TL at the station. Likewise a train from the right engages shoe 320 with a contact rail 597 to connect power across the latching coil of relay TR. When relay TL or TR lifts it opens the circuit to relay 522, FIGURE 36, which drops to turn switch SS clockwise, and closes front contacts to set the stop where the carriers are to wait for the train. This stop is at the head of the successive start section S6 or S7 respectively for trains from the left and right. To set stop S6 or S7 a circuit is completed from the positive of battery 462, back contacts 564 of relay SL, front contacts of relays ER and TL or TR, contacts and wiper 530 on switch SS to line 600 or 601, to stop S6 or S7 respectively. The stops are set through wiper 530 so that only one can be set at a time. The carriers wait on stop S6 for the train from the left to approach or on S7 if the train is from the other direction. The carriers should be stopped on successive start lines well before the train reaches way point 7.

Way point 7 and successive start timer

As the train passes way point 7, FIGURE 28, the cars which are reserved for transfer have a voltage on shoes B1 and B2 and engage a series of sensing devices to signal to a successive start timer 630 which delays the starting of each carrier for a time inversely proportional to train speed or as required to meet the car with which transfer is to be made. Three sensing devices are shown: S1, S2, and S3, one for each carrier; each has rails RB1 and RB2 spaced to be engaged simultaneously and respectively by shoes B1 and B2 on each car reserved or on any car 26f or 26p, and a three-coil relay 632 with top coil connected between rail RB1 and ground, middle coil connected between rail RB2 and ground, and bottom holding coil connected through front contacts of that relay and any next preceding relay 632. The number of these devices equals or exceeds the maximum number of carriers available for meeting a train on the transfer run. The pairs of rails of the devices are spaced car length apart along the right of way in sequence from right to left for trains from the left (oppositely for trains from the right) so that shoes B1 and B2 on successive cars align successive rails RB1 and RB2 respectively.

The timer preferably has a magnetic drum 638 driven at a speed approximately proportional to train speed by means such as gearmotor 640 connected by contact line 642 and shoe 644 to axle driven dynamo DYNL on the locomotive or on the cars while passing way point 7. The recorder has recording heads 648 and corresponding reading heads 649 each in a separate row parallel the axis of the drum 638 spaced circumferentially thereon to provide the required delay between recording and reading. An erasing head 650 is placed after each reading head on the drum.

Each relay 632 closes when one or more of its coils are energized and completes a recording and a holding circuit if all preceding relays 632 are closed if any. This circuit is from alternating current source 652, normally closed contacts of reset relay 654, front contacts of any next preceding relay 632 and of this relay 632 to the recording head 648 in parallel with the holding coil for this relay 632, to ground of source 652. Thus relays 632 hold and record in groups of one or more in sequence to start the carriers in groups of one or more in sequence even if container cars are scattered through a train with other cars.

Each reading head 649 picks up the signal from the corresponding recording head after the delay varying inversely with train speed to start the carriers individually so as to align with the preselected car when they reach train speed. Each reading head is connected to an amplifier 656 with output across the coil of a relay 658 which closes contacts while the reading head is picking up a signal to connect power to start the carrier reserved to meet the car whose signal is being read.

A transfer control line TCL extends the length of the transfer run and has at each end successive start sections SS1, SS2, and SS3, one for each carrier. Each section is of approximately carrier length. The carriers stopped with the first carrier on stop S6 (preferably only a few inches long) align in order from right to left sections SS1, SS2, and SS3. Each carrier has a shoe 660, engaging the section on which it is stopped. Power is connected to each section to start the carrier in that section through contacts of the corresponding relay 658 which the reading head picks up with the recorded signal which continues until relay 654 is lifted after the train has passed way point 7.

Way points 7U and 7L, FIGURES 34 and 35, are for starting carriers to meet cars in a train for respectively unloading and loading at stations where unloading and loading are on successive transfer runs. Way point 7U is located ahead of the unload run way point 7L ahead of the loading run similarly as way point 7 is located ahead of both in one. Way points 7U and 7L each have rails 1RB1 and 1RB2 etc. and the same components as for way point 7 in box 630, FIGURES 28, 34 and 35. Way point 7U is the same as 7 except rectifiers 662 are added for passing only the unload signals from rails 1RB1 etc. to the timer. Way point 7L is located after the unloading transfer run and has rectifiers 664 for passing only the empty signal from rails 1RB1 etc. to the timer.

Control line sections

As shown in FIGURE 37 control line CL is divided into sections CL1, CL2, CL3, CL4, etc. along each transfer run of carrier track ST for controlling the carriers to recouple after transfer.

Section CL1 runs along the station to or beyond the ends of the call and carrier loading positions.

Section CL2 runs from the right end of section CL1 for about the length of the carrier train or more to reduce speed of carriers entering from the right to cause following carriers to bump and couple those slowed after the transfer run for a train from the right. The left end of this section overlaps a carrier's length or more to the right, so sections CL1 and CL2 are connected by shoes 670 on the overlap as the carrier train passes.

Section CL3 extends from the right of section CL2 to near the end of the transfer run and is connected to ground through a high resistance 672 with intermediate tap to the preceding section. Section CL3 can extend to the end of the carrier track if sections CL4 and CL5 are omitted if the transfer run is short or for one direction only.

Section CL4 has the same parts and overlap as section CL2 and sets a reduced speed for the carriers to couple while returning from the right after a transfer run from left to right.

Section CL5 extends from the right of section CL4 throughout the successive start section at the right and is similar to section CL3.

Return and recoupling of carriers

After transfer, which will be described in detail after the carrier speed controls are explained, the carriers stop at the other end of the transfer run and wait for the train to reach way point 8 from which the last car in the train unlatches relay TL to drop. Way points 8 (shown with direction arrows) are preferably ends of a track circuit block TCB having current supply 674 connected across one end and track circuit relay 676 across the other end of the rails in the block. Block TCB extends beyond the ends of the transfer run and can be an existing block in a signal system on the railroad. The carrier track has a block CTB coextensive with the transfer run excluding the starting sections. Block CTB has rail insulators 680, power supply 682 connected at one end and relay 686 connected across the other end. A circuit is closed from the positive of battery 684, front contacts of relays 686 and 676 in series, go signal lights 688 for train traffic in each direction, to ground. A stop signal circuit is completed from the positive of battery 684, back contacts of relays 686 and 676 in parallel, stop signal lights 689, to ground of battery 684. A circuit is closed from the positive of battery 684, line 690, front contacts of relays SRL and SRR in parallel to line 692, through back contacts of relay 676, coil of relay 694, to ground, and from line 692 through front contacts and coil of relay 694 to ground, to hold relay 694 lifted after the train leaves block TCB, and from line 692 in series, front contacts of relays 676 and 694, coils of release solenoids for relays TL and TR, FIGURE 36, and to coil of relay 654, FIGURE 28, all connected at d to drop relay TL and TR and lift reset relay 654 momentarily after the train passes the transfer run.

The dropping of relay TL or TR whichever was lifted drops relay 522, which then connects power to motor PMS to turn switch SS always clockwise to the stop for the farthest dolly run to the left having an empty berth. The negative of battery 462 is connected through wiper 468 and back contacts of relay SL to lines 353 and so to relays DF, D, or DR according to where the empty dollies are, to drive the dolly runs to place empty dollies under the monorail.

The dropping of relays TL and TR drop respectively relays SRL and SRR which connect a circuit from the negative of battery 440, line 628, back contacts of relays SRL and SRR to control line section CL3 and CL5 connected together by line 630. The carriers which stop on section CL5 after transfer with a train from the left run to the left at a speed set by the voltage of CL5 into section CL4, which has a lower voltage, slowing the first carriers so that following ones couple thereto if not already coupled. When the first carriers reach section CL3 they connect in turn the higher voltage of that section back to section CL4, so that the recoupled carrier train accelerates together to return to the station. It is slowed at section CL2 for recoupling carriers which made the transfer run from right to left. Shoes 426 engage rail 442 to lift relays U' on all the carriers before reaching section CL1 so they will unload when returned to the station through control of switch SS.

Carrier speed control circuits

The preferred speed control for the carriers is basically as in my patents Nos. 3,037,461 and 3,037,462 and as modified and shown in FIGURE 38. The carrier is controlled by the voltage on the transfer control line CLT or if absent or too low or if the carrier is not on the transfer run it is controlled by the station control line CL, or if these signals are absent or switched off it can be controlled manually by any suitable controls such as spring returned battery tap selector switch 700 for connecting taps on battery 172 to control the speed.

Control line CLT receives power from dynamo DYN1 on the locomotive or on one or more cars in the train. Dynamo DYN1 is axially driven and connected to provide a voltage representing the train speed and direction and is connected across ground and contact rail line 642 which is connected to control line CLT and through relays 658 to the successive start sections SS1, SS2, SS3, etc.

Each carrier is driven by one or more traction motors 100 connected in a circuit from shoe 702 engaging power line 704 along track ST, line 705, resistance of rheostat 706 and wiper 708, annular segment 710 of the rheostat, armature of motor 100 connected through forward contacts of reverse switch 714, back contacts of dynamic braking relay 716, field of motor 100 to return rail ground. Reverse relay 714 is thrown according to which of its two coils 718 and 719 is operated last. The reverse switch is controlled by the polarity of the control line CL or CLT connected to be forward when positive and in reverse when negative whenever over a minimum voltage below acceleration control.

On each carrier shoes 670 and 660 engage respectively control lines CL and CLT. Shoes 670 and 660 are separately connected through normally closed automatic to operator transfer switch 720 to lines 721 and 722 to respectively back and front contacts of relay TRS to line 724, line 776, rectifier 728 and coil 718 of reverse switch 714 in parallel with rectifier 729 and coil 719 of reverse switch 714, to ground. Rectifiers 728 and 729 pass current when the control line connected is respectively negative and positive. The coil of relay TRS is connected from shoe 660 to ground to be energized during the transfer run. Relays TRS and 714 are held by movement of the carrier which prevents the reversal of the traction motors or interference with the automatic control during the transfer run as long as the carrier has substantial movement. The holding circuit for relay TRS is from the output of dynamo DYN2, control reverse relay 714 contacts 730, coil of relay ACC and rectifier 732 in series both across both the coil of relay DEC and rectifier 733 in series, reverse switch contacts 734, line 724, front contacts and coil of relay TRS to the ground side of DYN2.

Dynamos DYN1 and DYN2 are in a speed control circuit from DYN1, line 642, line CLT, shoe 660, contacts of switch 720, line 722, front contacts of relay TRS, line 724, coils of relay ACC and rectifier 732 to pass a positive current in parallel with the coil of relay DEC and rectifier 733 to pass a negative current connected through reversing contacts of relay 714 armature and current limiting field of DYN2 to ground return. A positive voltage on line CLT represents the speed of a train from the left to throw reverse switch 714 to the right as shown and lift relay ACC. A negative voltage on line CLT represents the speed of a train from the right to throw reverse switch 714 to the left and lift relay ACC.

Rheostat 706 is driven through an electric clutch 704 by pilot gearmotor PM which turns the rheostat clockwise from off position shown to start the traction motor and reduce resistance to accelerate the motor. The circuit for clutch 740 is from the positive of battery 172, line 742, line 744, forward and reverse contacts of reverse switch 714 in parallel, clutch 740 to ground, so that if the reverse switch is thrown the clutch releases the rheostat to return to off position under force of spring 746.

The voltage on the control line connected, CL or CLT, represents the maximum speed and its polarity the direction for the carriers connected. Each carrier completes a circuit from its shoe 670 on line CL, switch 720, back contacts of relay TRS, line 724, forward contacts of reverse switch 714, rectifier 732 and coil of relay ACC in series across rectifier 733 and coil of relay DEC in series, forward contacts of reverse switch 714, armature and current limiting series field of dynamo DYN2 to ground. Dynamo DYN2 is driven from an axle of the carrier and excited to develop a voltage representing carrier speed. Rectifiers 732 and 733 are arranged so that when reverse relay 714 is forward (to the right as shown) and line CL is positive relay ACC lifts to accelerate the carrier forward. If line CL were changed to negative while the carrier was moving relay ACC would drop and relay DEC lift to decelerate the carrier, since the direction of the control current would change. Relay DEC would drop when the carrier slowed to almost a stop. Then if line CL remained negative reverse relay 714 would be thrown to the left and thereafter relay ACC lifted to accelerate the carrier in reverse. Relay ACC is for accelerating the carrier in both forward and reverse, and relay DEC is for decelerating the carrier from both forward and reverse motion. This control is limited by a timer control for the transfer run.

Pilot motor PM is run clockwise to accelerate when relay TRS is down and relay ACC lifts closing a circuit from the positive of battery 172, line 742, line 788, front contacts of relay ACC, back contacts of relay TRS, armature of motor PM, ring 780, wiper 781, annular segment 782 for accelerating, line 784, back contacts of relay TRS, front contacts of relay ACC, to ground. Motor PM is stopped when relay ACC drops by an armature short including line 786 and back contacts of relays ACC, DEC, and TRS. Motor PM is reversed to decelerate upon the lifting of relay DEC by a circuit from the positive of battery 172, line 742, line 778, front contacts of relay DEC, line 788, coil of relay 716, annular decelerating segment 790, wiper 781, ring 780, armature of pilot motor PM, front contacts of relay DEC, to ground. Wiper 781 connects segments 782 and 790 with ring 780 except in off position shown where it runs off decelerating segment 790 to stop and in full speed position where it runs off accelerating segment 782 to stop the pilot motor.

When the carrier is at speed and a stopping current is received relay 716 is lifted, disconnecting the armature of TM from power, shorting the armature through resistor 706, and connecting series field 794 in series with current limiting resistor 796 from shoe 702 to ground for a strong field. Rheostat 706 returns faster than carrier to stop but slow enough to give time for speed correction to be made without applying brakes or throwing rheostat 706 to off. When decelerating relay 716 drops, motor TM should be connected through proper resistance to maintain speed.

Rheostat 706 has a wiper 798 secured on its shaft to control brake release coil 800 to set brakes gradually as the controller turns to off position. As wiper 798 turns from off position it completes a circuit from power shoe 702, line 705, resistance 802, wiper 798, ring 804, brake release coil 800, to ground. As it continues to turn it cuts out resistance 802 gradually before starting position a quarter turn clockwise from off and holds the coil energized in running positions of the controller.

Successive transfer control

The acceleration, run, and deceleration for successive transfer is precisely controlled to be the same on every carrier which participates in a transfer run independent of loading, grades, etc. to prevent collisions between separate carriers running one or more car lengths apart or even closer if cars vary in length. This control together with the successive start timer enables precision alignment even at moderate speeds and works over a wide bend of train speeds. FIGURES 40-42 show required results of these controls graphically.

For successive transfer or for closer control on single alignment, transfer motor PM is subject to relays ACC2 and HOLD by the lifting of relay TRS. When relay TRS is down the controls for the pilot motor are as described. When relay TRS is lifted the pilot motor control becomes; for acceleration, from the positive of battery 172, line 742, line 778, front contacts of relays ACC and ACC2, armature of pilot motor PM, ring 780, wiper 781, segment 782, line 784, front contacts of relays ACC2 and ACC, all in series to ground; for hold, from the upper armature terminal of motor PM, ring 780, wiper 781, segment 782, line 784, back contacts of relays ACC and DEC, line 786, front contacts of relay HOLD and back contacts of relay ACC2 to the other terminal of motor PM; for deceleration from the positive battery 172, line 742, line 778, front contacts of relay TRS, back contacts of relay HOLD, line 788, coil of relay 716, segment 790, wiper 781, ring 782, armature of motor PM, back contacts of TRS, to ground.

Relays ACC2 and HOLD are controlled by a potentiometer which compares a voltage representing carrier speed with a voltage varied by a timer representing the required speed during acceleration to and deceleration from train speed to provide a net voltage across ACC2 and HOLD, which are polarized by rectifier 808, to lift when the voltage representing the required speed exceeds the voltage representing the carrier's speed by a particular amount for each relay. Relay HOLD operates and drops at slightly lower voltage then relay ACC2. The voltage difference between the pull in value of ACC2 and the drop value of HOLD represents approximately the speed tolerance for the carrier.

The potentiometer includes rheostat 810, direct current dynamo DYN3 axially driven and separately excited to develop a voltage representing carrier speed and connected in series with rectifier 808 and coils of relays ACC2 and HOLD between the wiper of rheostat 810 and ground. Rheostat 810 has two slide contact resistors 811 and 812 and conductor 814 connected in a loop around which its wiper 816 contacts a full revolution. Conductor 814 is connected to the positive of battery 172, and resistors 811 and 812 are connected to ground opposite conductor 814 to provide a voltage on wiper 816 which varies the same on all carriers as the wiper turns to limit speed during acceleration and deceleration and to time deceleration with reference to acceleration the same on all carriers and below the capability of the carriers. The resistors 811 and 812 vary to follow the acceleration and deceleration curves for the carriers.

Rheostat 810 is turned slowly clockwise by gearmotor PML one revolution in the time allowed for the transfer run. Motor PM1 is started with relay TRS lifts, by a circuit from positive of battery 172, line 742, front contacts of relay TRS, line 818, segment 820, wiper 821 on shaft of rheostat 810, ring 822, motor PML, to ground. As motor PML turns, wiper 821 contacts segment 824 connected to line 742 to positive of battery 172 until it completes one revolution. In the meantime relay TRS dropped, stopping motor PML when wiper 812 leaves segment 824.

Coupling between carriers

The carrier has a railroad car type coupling 828 secured in a cushioned draft gear 828 at each end and a solenoid 830 connected to pull the coupling pin up when energized. Solenoids 830 are energized from battery 172, line 742, front contacts on relay TRS lifted during the transfer run or at least lifted when the carriers start the run so that carriers can run singly to align their car.

Setting up starting delay

The time delays set by the starting timer for various train speeds are determined by calculations which are based on selected values which are in no way a limitation of this system. Carrier acceleration is selected to be two miles per hour per second to insure good traction and dependability and gives the speed-time curve AT, FIGURE 40, where time in seconds from start of carrier line S6 is the abscissa and speed in miles per hour the ordinate. This acceleration also gives distance-time curve AD, FIGURE 41, where distance is in feet from line S6. Train speed lines intersect curves AT and AD to give respectively time and distance from start of carrier to align for transfer. Since the carrier acceleration is held constant (it need not be), the train will have traveled twice the distance that the carrier travels while accelerating. This distance is subtracted from curve AD for various train speeds to give start distance curve SDD. The minimum time delay of the start timer should be at or above maximum train speed for transfer. Trying a train speed of fifty miles per hour to require zero delay establishes way point 7 at 916.7 feet ahead of the same point lengthwise on the lead carrier at start S6. Time delayed to start the carrier to meet the car after signaling at way point 7 for various train speeds is ploted as curve STD with with time in seconds as abscissa. With the recording and reading heads 180 degrees apart the r.p.m. of the timer drum for various train speeds is found by the formula:

$$\text{r.p.m.} = \frac{60 \text{ sec./min.}}{2 \times \text{delay time in seconds at train speed}}$$

By this formula timer r.p.m. vs. train speed, curve TVT, FIGURE 43 is drawn.

If the timer does not follow curve TVT over sufficient range way point 7 can be set to greater distance from the carrier start line to give less percentage variation of timer speed for a given range of train speeds or for higher train speeds. The timer can be adjusted to follow at least a portion of curve TVT by field controls on DYN1 or the gear ratio of the timer motor can be changed, or the distance between the recording and reading heads around the drum can be adjusted, or the resistance of rheostats 810 or 706 can be nonlinear as required to give the calculated starting delay at various train speeds.

Speed adjustment for high speed transfer

Again referring to FIGURE 38, when the carrier reaches a speed just below train speed at which relay ACC drops the carrier is slightly ahead of alignment and for fine control is brought to train speed and aligned for transfer by any of various means such as a light 158 on the car directed up on successive abutting photoelectric cells 161 and 162 lengthwise on the carrier each connected through an amplifier 834, front contacts of relay TRS, contacts on reverse switch 714 reversingly to coils of relays 837 and 838 depending on the position of relay 714, in series to ground of amplifiers. As the train from the left gains on the slower moving carrier, cell 161 receives light 158, lifts relay 837 to short resistance 840 in the field circuit of DYN2, increasing the voltage of DYN2, lifting relay DEC if near train speed, slowing the carrier. As the train gains on the carrier light reaches forward cell 162, lifting relay 838, adding resistance 842 in the field of DYN2, decreasing its voltage, dropping relay DEC and lifting relay ACC to accelerate the carrier. If the carrier is not aligned with its car for transfer it is not yet up to required speed relative to the train, and light 158 passes cells 161 and 162. When the carrier is up to the small speed less than train speed at which relay ACC drops, light 158 dwells on cell 162, lifting relay ACC long enough for the carrier to exceed train speed to bring light 158 to divide between cells 161 and 162 to lift both relays 837 and 838, to which condition these relays regulate the speed to equal train speed in alignment for transfer.

Even with alignment held electronically physical coupling between carrier and car is preferred before transfer and can be provided by means as described with FIGURES 10 and 11 or by any of various arrangements including having the pin on the carrier and the latches on the car in which case the pin can be controlled as shown in FIGURE 38 where pin 109' is actuated by lever 846 pivoted to the carrier and lifted by solenoid 844 to lower the pin by a circuit from the positive of battery 172, line 742 front contacts of time delay relay 845, solenoid 844, in series to ground. Preferably the weight of the armature of the solenoid plus weight W is sufficient to lift the pin which is vertically guided in one or more holes in the frame of the carrier. Relay 845 has a coil connected acros each amplifier 834 and 835 and a dashpot for about two seconds closing delay to insure a safe speed difference before coupling and about ten seconds opening delay to permit the elevators to return before pin 109' is pulled out.

On carriers which have one or more elevators it is preferred to pull pin 109 as soon as all the elevators are returned from transfer. For this control, stick relay 345', FIGURE 38A, replaces relay 345, and connection is made from power line 742 through normally closed contacts of each elevator return switch 196, lower front contacts and hold coil of relay 345' to ground, and from line 742 through upper front contacts of relay 345' solenoid 844 to ground, to energize solenoid 844 when light 158 is on cell 161 or 162 for time indicating a safe speed difference for coupling and after elevators start down until they return.

If the elevators are not returned or pins pulled out in the required distance brakes on the train can be applied by a circuit closed from the positive of battery 160, FIGURE 15, limit switch 164 closed when the vertical coupling is in, ramp switch RS closed when the train passes ramp RSR at the end of the transfer run, solenoid BS to set brakes and return elevator etc., in series to ground of battery 160.

When the carrier is aligned on the car and coupled transfer takes place by any of several means such as by elevator on the carrier and/or train or by relative positions of tracks ST and T1–2 along the transfer run.

Carrier dip transfer

With self-latching carrier hooks with closing delay as described in my Patent 3,164,406 the carriers can set containers down on the railroad car or pick them up by dipping the carrier track down as shown in FIGURE 44 over the railroad track to the required height and back up. The monorail to release the containers would dip the carriers lower than the monorail to pick them up.

A selective way to control whether the container is released or picked up is by control of the hooks as shown in FIGURE 45, where cam hook 56, pivoted at 850 to the frame of the carrier 20 has a lever arm 852 extending up from the top pivotally connected to a ratch bar 854 which is an extension of the armature of solenoid SU', which is pivotally secured to the frame of the carrier at 856 to open the hook when empty. A solenoid latch SL', engaging rack 854 to hold the hook open when opened is lifted to release the hook to reset for hooking. Solenoid SL' is connected in parallel with relay L' of which it can be a part. Solenoid SU' is connected in parallel with relay U'. Thus the berths coded to load lift solenoids SL' releasing the hook to latching position for engaging a container, and the berths coded to unload, i.e. have relay U' lifted also have solenoids SU' energized to open the hooks when the container is set down or lifted therefrom.

The ends of the dip are high enough for containers on the monorail to clear the train. The container cars selected for transfer each raise a vertical coupling pin 109 at the proper spot or time to engage a double latch coupling 111 on the carrier when aligned for transfer, FIGURES 46–47. Pin 109 carries the carrier along with the car in alignment for transfer and telescopes and extends as the carrier dips and raises above the car and remains engaged until retracted after the transfer run or until the carrier track moves the carrier away from the car after the transfer run as shown in FIGURE 50. Only one pin need be raised for transfer, which if the carrier track enters and leaves from one side over track T1–2, as in FIGURE 50, to engage and disengage carriers for transfer, that pin is on that side. Cylinder 108 of which pin 109 is the plunger extends to about the height of the train and preferably is lowered when not in use in case the pin does not retract of its own weight. The carriers can be accelerating or standing when coupled as long as they are coupled at a safe speed difference.

Vertical coupling

Referring to FIGURES 46–49, the carrier 20 has opposite latches 112' for engaging coupling pin 109 on the car from either end when the carrier or car are passing each other. Latches 112' can be pivotally secured at 858 to the frame of the carrier and supported by stops 859 in the position shown.

Car 26f' has a frame 106', a recess 860 in each side down which cylinder 103' extends when in vertical position. Cylinder 108' is pivoted at 861 between two brackets 862 part of frame 106' above the bed. A cylinder 864 is pivotally connected at the head end between brackets 865 and rod end to bracket 866 secured to the rod end of cylinder 108' so that when cylinder 864 is retracted cylinder 108' is parallel the car and when cylinder 864 is extended cylinder 108' is raised vertical. Pin 109 is extended by air pressure in cylinder 108' to vertically couple a carrier. It is extended only when the car is reserved for transfer and engages ramp rail 868, FIGURES 48 and 59, or contact rails 868'L or 868'R FIGURE 51.

Referring to FIGURE 48 for one arrangement for controlling the vertical coupling to lift and retract, two-position four-way solenoid valve 869 controls pressure to the head ends of cylinders 864 and 108' when energized and to the rod end of cylinder 864 when deenergized. The solenoid of valve 869 is energized from battery 160 through front contacts of limit switch 870 lifted by ramp rail 868 to raise the vertical coupling throughout the transfer run.

Vertical coupling control and transfer run for low speed

Referring to FIGURE 51 for the preferred coupling control and transfer run for transfer at low train speeds, three carriers 20 are shown in position on track ST at stop S6 waiting to be successively coupled by reserved cars in the train from the left. The transfer can be by any means described. The track has a dip STD and a bypass BD therefore. The bypass preferably runs straight over the dip with track gage wider than the carriers' frames and is connected by vertical switches which have two straight points 871, FIGURE 52, pivoted at 872 to swing vertically up off each rail 28 at the crest of the dip to let the carriers enter or leave the dip or lower to connect the dip bypass used when moving the carriers to waiting spot S7 beyond the dip or when returning to the station from beyond the dip or for use with a carrier or railway car having elevators for transfering containes while bypassing the dip. Switch points 871 are lifted by solenoids 873 energized by a circuit from the positive of battery 462, back contacts of track circuit relay 676 in the block along the transfer run, line 874, coils of solenoids 873, to ground of battery 462.

Contact rails 868L and 868R are run along tracks T1–2 along the transfer run for controlling the vertical couplings on trains from the left and right respectively. Each transfer car has a shoe 660L for engaging rail 868L and a shoe 660R for engaging rail 870R. Shoes 660L and 660R are connected respectively through rectifiers 875 and 876 to solenoid of valve 869 to ground to raise the coupling when a shoe 660L or 660R engages a live rail. Each rail 868L and 868R is divided into coupling segments LC1, LC2, LC3, etc. and uncoupling segments UC1, UC2, UC3, etc., one for each carrier to the maximum number of carriers to be available to make the run. Shoes 870R and 870L connect from segment to segment in passing.

Power is connected to segments LC1, LC2, LC3, etc. to couple the carriers in succession by the same circuitry as the successive start timer FIGURE 28 except the timing delay is omitted. Cars reserved for transfer have voltage on shoes B1 and B2 and engage a series of sensing devices to connect power to segments LC1, LC2, LC3. etc. successively each to raise the vertical coupling of the car when within a car length before aligning to couple the carrier with which transfer is reserved. Each sensing device has rails RB1 and RB2 spaced to be engaged simultaneously and respectively by shoes B1 and B2 on each car reserved, car 26f, or 26p, and a three-coil relay 632' with top coil connected between rail RB1 and ground, middle coil between rail RB2 and ground, and bottom holding coil connected across battery 462 in series through front contacts of that relay and any next preceding relay 632' and back contacts of track circuit relay 676. Each coupling raising segment is connected to the line side (positive) of the holding coil of the corresponding relay 632' to raise the coupling on the car when it lifts a relay 632 with any and all preceding relays 632' energized to couple the carriers in succession from the front of the line up, each as the reserved car approaches its carrier from the rear.

Each vertical coupling is retracted after the carrier has made the transfer run, which is the same length for each carrier displaced one carrier length in the direction from which the train approached. Uncoupling segments UC1, UC2, UC3, etc. drop coupling to successive carriers in succession each at a car length less distance so that the first carrier is coupled between LC1 and UC1, the second carrier between LC2 and UC2, etc. to just meet the preceding carrier when coasting or braking to a stop. Each coupling is released when shoe 870L or 870R controlling that coupling comes to the end of power on rail 868'L or 868'R the uncoupling ends of which are divided into sections UC1, UC2, UC3, etc. in succession from the end of the run, one section for each carrier. Power is connected from rail 870L or 870R to the adjacent section here shown at UC3, and from UC3 to UC2 each through front contacts of a relay 878. The coils of relays 878 are each connected in a circuit from the positive of battery 462, back contacts of relay 676, line 874, front contacts of relay 879, coil of relay 878, to ground. The end relay 879 has a closing coil connected to segment UC1, and each ahead of the last is connected through front contacts of the following relay 878. Each relay 879 closes front contacts to energize a relay 878 to open the closing circuit after a holding circuit is established. Each relay 879 has a holding coil connected from line 874 through its front contacts to ground to hold relay 878 lifted to isolate the next section from the forward section successively from the end of the run to retract the vertical couplings in succession as successive carriers enter successive sections (of carrier length) from the rear. Successive segments LC1, UC3, UC2, and UC1 are preferably overlapped at the ends to be electrically connected by shoes 660L or 660R sufficient to operate the relays.

Brake control

Each carrier 20 has brakes applied by solenoid 880 energized by a circuit from the positive of battery 462, back contacts of relay 676, line 874, contact lines 881 along the stopping positions of the transfer run, shoe 882 on each carrier engaging line 881, normally closed contacts of limit switch 883 opened by the vertical coupling 109, brake solenoid 880 to ground. Thus the brakes are released when coupling rod 109 is latched between latches 111 and are applied when the coupler is withdrawn after transfer to slow the carrier to a stop in a short distance, to reduce the length of the station track required and to reduce bumping between carriers. Successive uncoupling segments UC2, UC3, etc. are made longer than carrier length to prevent successive carriers from bumping when stopping. For single direction of traffic brakes can be set on successive carriers to stop in successively less distance. The brakes are controlled as described with FIGURE 38 on carriers having speed controls.

Relay 676 lifts after the train passes, deenergizing relays 632' 878 and 879 to reset and deenergize switch solenoids 873 to close the dip bypass for the movement of the carriers by tractor MT on track ST if the carriers are without motors and releasing the brakes on the carriers.

Vertical coupling control for higher speed

If the train speed for transfer is to exceed that which is safe or convenient for coupling standing carriers, carriers with speed controls, FIGURE 38, and the successive start timer, FIGURE 28, are provided to accelerate the carriers to coupling speed and successive vertical coupling accomplished preferably by extending a coupling pin from the carrier as in FIGURE 38 or by mounting and controlling vertical coupling latches 112 on the carriers as in FIGURES 53 and 54 and extending the vertical coupling pin 109 early, the latches being controlled to move into line of coupling when the carrier is within a car length ahead of alignment at safe coupling speed.

For this purpose latches 112 are mounted in a rectangular frame 111, FIGURES 53–54, mounted to slide lengthwise on square shaft 884 and rotate therewith. The ends of shaft 884 are turned round and supported to swing on brackets 885 secured to the bottom of the carrier's frame. Shaft 884 is passed through square holes along one side in the ends of frame 111 so the frame will swing to one side by gravity and weight W; moving the latches out of the line of coupling. A compression spring 886 is compressed between each end of frame 111 and a bracket 885 to position frame 111 along the carrier and take coupling shocks. A solenoid or cylinder 887 secured on the frame of the carrier has a rack engaging gear 888 secured to an end of shaft 884 to rotate shaft 884 to swing the coupling latches into the line of coupling pin 109 when cylinder 887 is energized by current from the positive of battery 172, back contacts of current relay 889, solenoid 887, in series to ground of battery 172 on each carrier. The coil of relay 889 is in series between DYN2 and ground to lift relay 889 whenever current through DYN2 indicates a speed in excess of coupling speed, dropping solenoid 887 to swing the coupling latches (or pin) out of the line of coupling by weight W' until current through DYN2 on the carrier drops to a value indicating a safe speed difference for coupling, dropping relay 889, energizing solenoid 887 which turns gear 888 swinging the coupling latches 112 (or pin) into the way of coupling when the car is within a car length of coupling the carrier. The coupling pins on each car reserved for transfer are extended ahead of coupling and retracted after transfer before the carrier is slowed on its programmed transfer run, FIGURES 40–42. If the coupling pin 109 is on the carrier it can be controlled from DYN2 similarly and in place of latches 112.

Carriage for coupling

The coupling can be mounted on a latch carriage, FIGURES 55–56, having a rectangular frame 111' through which extends axles 890 fitted with flanged wheels 891 on the outside of frame 111' to run in channels 892 on the bottom of the carrier's frame integral therewith. Latches 112 are each pivotally secured on an axle 890 between the sides of frame 111' to face each other and supported in the position shown in FIGURE 56 by engaging the end of frame 111'. A lief spring 893 is secured between notches 894 on the top of each latch 112 and under a central pin 895 between the sides of frame 111' to hold the latches out so that frame 111' can be mounted in any position on a carrier or railway car (see FIGURES 61 and 74 for roof mounting on a passenger car). A spring centered dashpot 896 is connected between the frame of the carriage and the carrier to center the carriage and cushion coupling forces. Latches 112 are spaced apart so that pin 109 enters between them by lifting one which drops to lock the railroad car on the carrier. The carrier is thereby carried along at train speed aligned fo transfer as in FIGURE 44.

Another vertical coupling as shown in FIGURES 57–58 where twin cylinders 108'' are connected at the top and braced by members 897 lengthwise the car and have plungers 109'' connected at the top by a plate 898 bent down on the ends to which a coupling plate or pin 109''' is secured at the middle. These cylinders take up less width for a given strength than a single cylinder.

Low lift transfer elevator

Low lift elevators 899 on the car 20f' are shown in FIGURES 46, 47, and 59 as another means for selective transfer. Each elevator 899 has a platform 900 supported on a lift cylinder 901 secured to the frame of the car and preferably held parallel the frame with a double parallelogram linkage 902 on each side or end. Two metering cylinders 904 and 905, positioned on end and secured to the car are connected at the bottom end to the head end of lift cylinder 901 and connected at the top through solenoid valves 906 and 907 respectively to supply AIR such as the train air system. Cylinders 904 and 905 each have a free piston separating the air on top from the liquid on the bottom. Cylinder 904 holds a volume of liquid (preferably oil) which when forced into cylinder 901 under pressure of the air supply will lift the elevator the required height to latch hooks 56 onto container 24 setting on the elevator. Cylinder 905 holds a volume of the same liquid which when forced into cylinder 901 under pressure of the air supply will lift the elevator the additional height required to unlatch hooks 56 from the container.

Solenoid valves 906 and 907 connect air to cylinders 904 and 905 respectively when energized and exhaust when deenergized and are respectively connected by stick relays L and U. Relays L and U are energized by the reservation circuits as described with FIGURES 26 or 31 and 32, the portion of which is on the car being shown in FIGURE 59 with elevator controls added. The closing circuit for relay L is from the positive of battery 160, reset switch 304, line 908, limit switch 168 closed when the elevator is empty, contacts of limit switch 910 closed when the elevator is down, coil of relay L, to shoe AL. The holding circuit for relay L is from line 908, front contacts and coil and front contacts of relay L to ground. The closing circuit for relay U is from the positive of battery 106, reset switch 304, line 908, flexible leads to elevator platform plug 68 contact 1 to routing box segment 204, brush 258, contact 3 of receptacle and plug 68, flexible lead from platform 900, coil of relay U, to shoe AU. The holding circuit for relay U is from line 908, front contacts and coil and front contacts of relay U, to ground. Connection is made from the positive of battery 160, reset switch 304, limit switch 870 closed by track ramp rail 868 along the transfer run where vertical coupling pin 109 is to be raised and where the elevators are to lift, line 914, front contacts of all relays L and U on the car to line 915, and from line 915, solenoid valve 869 to ground. Relay L closes a circuit from line 915 through its front contacts 918, solenoid valve 906 to ground and from line 915, front contacts 919 of relay L, solenoid valve 907, to ground, to position valves 906 and 907 to pass air into cylinders 904 and 905 to force the liquid from these cylinders into cylinder 901 to lift to height to receive a container from the carrier. Relay U closes a circuit from line 915, its front contacts, selenoid valve 906, to ground, to position valve 906 to pressure cylinder 904 to lift the elevator the height for hooking a container on the carrier above.

Passenger container transfer

Referring to FIGURES 60 and 61, the passenger carrier 20p has the elevator 104 described with FIGURE 12 and is shown transferring one container 24p to and one from the middle car 26p of a three-car unit articulated to reduce sway and provide more convenient passage to and from the container car. The elevator on the carrier also reduces sway over having the high lift elevator on the car. The carrier has a cab 920 and can be manually controlled by any suitable means and vertically coupled by lowering pin 109' to latch with double latch coupling 111 extending above the roof of car 26p and centered over each articulated truck. Pin 109' is lowered by the operator when the carrier speed is near train speed and the carrier and car approach alignment. Pin 109' extends nearly to the roof of the cars in the train to catch between latches 112 extended by spring 893'.

The passenger car has a partition 924 separating an aisle 925 along one side from a container area of two or more berths 926 along the opposite side. The car has sides, a roof with opening 928 over the container area, doors 930 in partition 924 which align with doors 931 in container 24p and are controlled as described in my earlier application to be opened when a passenger container is in the berth and closed before transfer and while the berth is empty, and preferably container guides strips 932 flaired out at the top to guide the container into position in the car and prevent the container from banging the partition and side of the car by sliding in and out.

The carrier has a wide frame 934 and open spaces 935 above the container berths to enable the containers to be removed through the top of the carrier by an elevator 938 in a station or building 940, FIGURES 62–66. This makes the carrier well suited for operation in subways as shown in FIGURES 62–63 where the containers 24p, after transfer from the train, are brought by carrier 20p under elevator 938 in, for example, a downtown office building or department store 940. The carrier can furnish heat to the containers through duct work 942 to vents in the container if desired. The elevators on the carriers can lower the containers at the stations for loading and unloading.

Elevator 938 runs in a shaft 944 on guide rails 946 and has a carriage frame 948, FIGURES 64–65, which has guide shoes 950 on rails 946, is hoisted by ropes 952 driven in a usual manner by a usual type of drive not shown. Frame 948 has two sets of facing channel rails 954 secured across the bottom as tracks for a container carrier 956.

The elevator riding carrier 956 has a channel sill or frame 958 swivelly supported on two trolleys 960 for running between facing channel rails 954. Two self engaging and opening hooks 56' are each pivotally secured on a pin between depending plates 961 on each end of the frame to engage hooks 962 on container 24p and lift the container out of carrier 20p by movement of the elevator 938. Hooks 56' each have a lever arm 963 extending from the top pivotally connected between adjacent hooks by a dashpot 964 for delaying closing when the container is set down.

A floor 966 swings under the container as it is lifted up the elevator shaft. The floor has a frame 967 with brackets 968 at each end on one side. Rollers 970 are secured to the outer sides of brackets 968 to roll in a vertical track 972 up each side of shaft 944. Tracks 972 widen at the bottom to let the upper wheels 970 swing in to drop the floor out of the way to the side of the carrier 20p as shown in FIGURE 65. Floor 966 is lifted by a carriage 974 also having wheels 970 which ride vertical track 972 above floor 966 and connected to the floor by a link 976 pivotally connected between the lower wheel on carriage 974 and upper wheel on floor 966 on each end to pull the floor back horizontal as carriage 974 ascends the shaft pulled at the speed of the elevator by cables driven from the elevator drive by an extra drum and pulleys arranged in a usual manner. The floor has a railing 978 at each end and a foot board 979 along the front as additional safety features.

Parallel facing channel ceiling tracks 954', FIGURE 66, align with tracks 954 on the elevator to enable the carrier 956 with container 20p to be pushed off the elevator into a storage area 980 or down a hall or aisle 982 for loading or unloading such things as office furniture, supplies, merchandise, etc. Floor 966 protects the open shaft 944 when the container is removed from the elevator. Carrier 956 with container 20p runs sidewise off the elevator onto tracks 954' which curves and has switches 954S to rotate trolleys 960 and connect them on one track 954 for lengthwise movement in the building.

The switch 954S, as shown in detail in FIGURES 67–68, has a frog 984 of tapered channel section secured to a depending headed pin 985 supported on the switch to pivot the frog between opposite channel rails 954'.

Elevator for car

A preferred car mounted elevator 998 is shown in FIGURES 69–75 extended to load container 24' on a carrier 20'. Elevator 998 has four stationary vertical guides 1000 which extend below the bottom of the car 26p' and are secured to the frame of the car. Each guide is channel shaped and has inside an interfitting telescoping channel slide 1002 of substantially equal length; see FIGURE 71.

An inner angle strip 1006 secured along the telescoping slide overlaps a vertical angle strip 1008 on each corner of the container to interlock the guides on each end with the container. Cross bracing 1009 connects slides 1002 at each end of the berth. The top of each slide 1002 has a V-trough for receiving a horizontal pin 1010 secured protruding from the end of the container to support it on the elevator. The tops of the slides 1002 and the bottoms of strips 1008 are tapered or chamfered to engage when the elevator is lifted. A sheave 1012 is mounted transverse to the car on a bracket and stud 1014 to the top inside of each stationary slide 1000. One or more ropes 1016 are anchored to the bottom of each telescoping slide 1002 and run up over sheave 1012 above and down around a drum 1018 central under each end of the berth. Both drums 1018 are secured on shaft 1012 which is mounted parallel the car in bearings and driven preferably through spur gears 1022 from gearmotor 1024. A vane or eddy current brake 1026 can be added for safety to prevent excessive speed if the motor fails.

Whenever the telescoping slides extend about a foot or more they are interlocked with a container making the elevator rigid even if the telescoping slides extend to within a few inches of the end of the stationary slides. This design eliminates the need for intermediate guides on the high lifting transfer elevator.

The carrier has two facing cam latching and opening hooks 56" at each end of each berth for engaging a hook 962 on each end of the container. Hooks 56" each have an arm 963 extending out from their pivot 850 and a dashpot 964' pivotally connected between the frame of the carrier and the outer end of arm 963 to delay closing only if opened much beyond latching position. The rod ends of dashpots 964' for each berth are connected by tubing 1030, and an intermediate port 1032, blocked by the piston in the dashpot except when the hook is open beyond latching positions, connected by tubing 1034 through holes in pin 109' to AIR pressure source or to exhaust according to whether the vertical coupling is extended or retracted. Thus while the carrier and car are coupled if hook 56" is opened beyond latching position enough to open port 1032 air forces the piston to open the hook and flows through tubing 1034 to lift the other hooks 56" for that berth wide open so as not to catch on the container. The dashpots 964' otherwise operate similarly as in my Patent No. 3,164,406 to provide vacuum closing delay for operation at the station.

As an alternative hooks 56" can be operated by cam valve 1038 on the carrier for engaging a trackway cam rail 1039 to connect tubing 1030 to 1034 to AIR to open only when hooks 56" are not bearing a load on a portion of the transfer run. This is especially suited for a dip transfer run exclusively for unloading the train.

A block 1040 is inserted ahead of the upper travel limit preferably on the top of each stationary member 1000 to engage a pin 1042 across the bottom of telescoping guide member 1002 to stop the elevator at a lower height for loading than for unloading to latch hooks 56" for loading and to cam open the hooks when unloading. The block 1040 is preferably the plunger of a two-coil solenoid 1044 which inserts or retracts the block depending on whether the elevator is to give or receive the container respectively.

A circuit for car to carrier transfer is completed from the positive of battery 160, contacts 164 closed by vertical coupling pin 109', normally open contacts of limit switch 168 closed by the container on the car, front contacts of relay U''' energized by a signal indicating an empty berth aligned, front contacts of relay U energized by a signal to transfer the container, all in series to line 1046, left-hand coil of solenoid 1044 to ground in parallel with contacts of limit switch 196' closed in retracted position of the elevator in series with middle coil of relay 180'. Relay U is energized by a circuit from the positive of battery 160, bottom contacts of limit switch 168 closed by the container on the car, line 206', normally open contacts of transfer button 202 or contact 204 in parallel, coil of relay U, to ground. Buttons 202 are on the passenger, express, and mail trains, preferably in the transfer car under control of an attendant but can be in a private passenger or personal container or more than one button can be provided in parallel. Relay U''' is preferably controlled by a lamp 152' on the carrier. Lamp 152' is connected across battery 172 in series with contacts of limit switch 178 closed when the berth is empty and shines down on photoelectric cell 150' through transparent cover 1050 over the cell. Cell 150' is connected to amplifier 170' whose output is connected to energize relay U''' when lamp 152' shines on cell 150' when aligned for transfer. Relay 180' closes a holding circuit from the positive of battery 160, line 208', limit switch 1052, front contacts and bottom coil of relay 180' in series to ground. Relay 180' operates the elevator to lift by closing a circuit from the positive of battery 160, line 208', line 1054, front contacts of relay 180' in parallel with normally closed contacts of switch 196' which close when the elevator leaves bottom, resistor of starter 192', field and armature of motor 128', front contacts of relay 180', in series to ground. The coil of starter 192' is connected ahead of motor 128' to ground to short out its resistance in steps for hoisting and lowering. A dynamic braking circuit is connected across the field and armature of motor 128' and includes resistance 1056 and back contacts of relay 180'. Regenerative lowering connections are made by a line 1058 from a point between the field and armature of motor 128' through back contacts of relay 180', resistance 1060, normally closed contacts of limit switch 196' opened by the elevator at bottom, to ground.

A circuit for carrier to car transfer is closed from the positive of battery 160, limit switch 164, normally closed contacts of limit switch 168 closed when the berth on the train is empty, front contacts of relay L''', line 1062, right-hand coil of solenoid 1044, to ground, in parallel from line 1062 with normally open contacts of limit switch 196' (closed when the elevator is down) and top coil of relay 180'. Relay L''' is controlled by lamp 153' on the carrier by means of photoelectric cell 151' and amplifier 171' connected similiary as for relay U, FIGURE 15. Lamp 153' is connected across battery 172 in series with front contacts of unload relay U' and normally open contacts of limit switch 178 and is directed down on cell 151' when aligned, to lift relay L''' for unloading the container.

Elevator 998 is applicable for freight and passenger cars. For high speed passenger service it is preferred to an elevator on the carrier, since it is fail safe in that if power fails the elevator drops and retracts at a safe speed and is assured to be down before the carrier should slow for the end of the transfer run.

Variations

Referring to FIGURES 73-75, passenger car 26p' is similar to car 26p, FIGURES 60-61, except car 26p' has an elevator 998 for each berth. The carrier 20p can then be used, or as shown the carrier can be a train comprising a tractor 1070 and a carrier 956' for each berth and an extra for local service between stations. The carriers 956' and tractor 1070 run on track ST' shown as an I-beam.

The tractor has a frame 1074 supported on trolley 960' and driven by two traction wheels 1078 through any suitable drive. The tractor has a cab 920' similar to cab 920 supported in the frame and has the vertical pin 109' for coupling to car 26p or 26p'.

The carriers each have a sill 958' suspended on two trolleys 960'. Two hooks 56'' are pivotally secured to the sill at each end to swing transversely to engage hooks 962 on a container. Hooks 56'' have lower latching cams and upper opening cams, and each is held open by a cylinder 964' connected between arm 963 on the hook and a bracket 1079 on frame 958' to delay closing only after opening beyond latching position. A coupling bar 1086 is pivotally secured to sill 958' to swing up from horizontal out one end of each carrier and has a vertical pin 1088, FIGURE 80, depending from the other end for engaging a hole 1089 in the sill of the carrier to the left.

Referring to FIGURES 76-80, carriers 956' are well suited for subway transfer and for application with an elevator 1090 for taking the carrier and container to street level or floors of a building 940. The carrier train runs through elevators 1090 in one or more buildings in a downtown area, and the carriers with or without containers run up and down on the elevator to deliver and pickup passengers or freight. Each container elevator 1090 has an open cage 1092 having four corner posts 1094 supporting floor 1096, monorail tracks 954I with revolving switches 1100 controlled by levers 1102 and linkage 1104 to be turned to rotate the carrier trolleys 960' to align ceiling tracks 954I at one or more floors or levels to take the container off the elevator for storage or loading or unloading as shown in FIGURE 79.

Lights 1110, 1111, and 1112 indicate to the carrier operator when the carrier has aligned a container on the elevator as well as when the elevator is aligned for loading and unloading. Three limit switches 1114, 1115, and 1116 are secured along the floor of the cage to engage the bottom of the container to detect and hold it when it is centered in a given direction as lengthwise, shown. The limit switches each have a conical cap on a stem lifted by a spring. When the container is centered the end limit switches 1114 and 1116 are up against the ends of the container and the middle switch 1115 is depressed. When the elevator is not positioned for transfer a red light 1111 is lighted by a circuit from the positive of battery 1120, line 1121, back contacts of relay 1122, red light 1111, to ground. A stop, solenoid 1124, is set to prevent the carriers running into the empty shaft. When the elevator is positioned for transfer green light 1110 is lighted by a circuit from the positive of battery 1120, line 1121, contact rail engaged by shoe 1126 on the elevator, limit switch 1128 closed when the monorail track on the elevator is turned straight i.e. parallel the carrier, line 1130, shoe 1132 on the elevator engaging a contact rail, back contacts of elevator control relay 1134 which is lifted for a time before the elevator can start, line 1136, green light 1110, all in series to ground of battery 1120. The coil of solenoid 1124 is connected across light 1110 to lift to let the carriers proceed onto the elevator when light 1110 is green. When the carrier is pushed into position on the elevator from the right coupling latch 1086 is opened by a cam roller 1138, FIGURE 80, on the coupling engaging a ramp cam 1140 supported from the ceiling or monorail support to flip up to let the carriers move by in the opposite direction without uncoupling. When the container is aligned on the elevator a circuit is closed from the positive of battery 1120, rail and shoe 1126, limit switch 1128, front contacts of end limit switches 1114 and 1116, back contacts of middle limit switch 1115, shoe and rail 1142, blue light 1112, all in series to ground of battery 1120. The blue light indicates to the tractor operator that the container is spotted on the cage correctly. The elevator can be dispatched by buttons 1146 in a usual manner preferably under control of the carrier operator. The pressing of a dispatch button lifts relay 1134, opening the circuit to the green light and dropping solenoid 1124 before the elevator is started.

The elevator can have an ordinary cage 1142 above the container cage as shown in FIGURE 78 for use when not in container transfer service. The elevators 938 and 1090, as seen from FIGURES 64 and 77, can take the container below the carrier loading station as well as above, since guide shoes 950 have flared ends for skipping the break in guide rails 946, which also mean that the elevators can transfer the containers between different carriers 20p at different levels.

The carriers serving a downtown area can have a call stop for receiving loading instructions which the operator can observe and follow to align the berths for loading under the elevator or which can be automatic.

Vehicle cage

Referring to FIGURES 81-83, a vehicle cage 24V on a carrier 956' on track ST' is shown on elevator 896' on car 26p'' in train 16 on track Tp running parallel under track ST'. Car 26p'' has container berths on one side separated by partition 924 from aisle 925. Cage 24V holds an automobile V the occupants of which can leave and return through doors 930 in partition 924 to use the facilities of the train in route. Elevator 896' has a platform 898' with end telescoping guides supported by cables to run in vertical guides on car 26p'' and is actuated as in my hoist, Patent No. 2,640,612, FIGURE 11, and controlled by suitable means according to alignment and transfer requirements as described for elevator 104, 896, or 998. Cage 24V can be handled by the other elevators described herein. Any of the transfer elevators or dip transfers described herein can replace elevator 896'.

Vehicle cage 24V has an open frame with hooks 962 at its upper ends conected by tubing at the corners to platform 1165, so vehicle V can be driven on and off the cage through open ends at the station.

Wheel chocks

The platform of cage 24V has an opening 1167 under each wheel of vehicle V to chock it. Each hole 1167 preferably has a U-shaped bracket 1168 having two lips 1170 each arranged to engage the platform along the side of hole 1167 and trapezoidal sides 1171 which widen to the bottom. Brackets 1168 on each side of the cage are shown connected by a skid 1172. Brackets 1168 have a floor 1174 to support the vehicle wheel at floor level when the cage is resting on the skids. When the cage is picked up, the skids with brackets 1168 remain down until the platform engages lips 1170, thus forming a depression for holding each wheel of the vehicle.

Two plates 1176 are provided to clamp each pneumatic tire of the vehicle. Each plate 1176 has secured thereon an angle iron 1177 faced one leg down and the other toward a hole 1167. Angles 1178 are secured leg down to the under side of the floor of platform 1165 on each side of each hole 1167 at a distance from the hole about equal to half the length of the hole. One or more rods 1180 are secured to the depending leg of each angle 1177 and extend therefrom through a hole 1182 in the depending leg of the angle 1178 on the same side of the hole 1167. Each rod 1180 has a compression spring thereabout pocketed between depending legs of angles 1177 and 1178 on the same side of each hole thus forcing plates 1176 on opposite sides of each hole 1167 toward each other. Plates 1176 at each hole 1167 are held apart by bracket 1168 and are forced wide apart by the tapered edges of bracket 1168 as the cage is rested on runners 1172. Plates 1176 are latched open until the pocket is formed and then released to engage the wheel. For that latches 1190 are pivoted at 1191 to the frame of platform 1165 and offset to engage the tire engaging edge of plate 1176 through opening 1167 while pivot 1191 is outward both laterally and longitudinally from hole 1167, so that pivot 1191 is substantially horizontally aligned with the point of latching. Springs 1192 hold the latches up. Linkage 1194 pivotally connects the latches on the same side of hole 1167 together. One link of linkage 1194 has a projection 1196 which engages lip 1170 to release the latches as the runners are about to lift. The latches are reset as the runners are forced toward the bottom of the cage as the cage is let down on the runners, the tapered edges of brackets 1168 forcing plates 1176 of each hole 1167 apart until latches 1190 hook over the edges of these plates. Dash pots 1198 on rods 1180 slow closing of plates 1176.

Elevators have openings 1200 for skids 1172 so as not to release the vehicle in cage 23V. A driveway at dolly bed height would be provided at stations for loading the vehicle cages, and skids 1172 would rest on the dollies to release the vehicle in cage 24V to drive off and on. Cages could be large enough for more than one vehicle and more than one deck high.

Variation for monorail

The system can be inverted, i.e. the monorail can be the main line transfer vehicle as shown in FIGURE 84. Two-car monorail train 16' on track T' has a transfer car 20'' which has two container berths separated from the passenger area and aisle 925 by partition 924, having access doors 930 to each berth. Doors 930 are provided with elevator hatchway-type locks, since the berths have no bottom. An elevator 104' is provided in each berth to extend down to pick up a container 24 aligned below to bring it into the berth and hold it in transit.

Elevator 104' preferably comprises two sets of downward extending vertical telescoping sets of cylinders 1240, the outer cylinder of each set being secured to the frame of car 20'' one at each end of a berth. Each set of cylinders has a plurality of telescoping cylinders each with an outer flange 1242 at the top to engage an inner flange 1244 on the next outer cylinder at full extension, to hold the cylinders from slipping apart. A lift bracket 1246 and a coupling bar 1248 are secured to the lower end of the inner cylinder. Each coupling bar 1248 has two facing hooks 56d each pivotally secured on the sides of arms 1250 and 1252 facing the berth, each arm being pivotally secured on the side of bar 1248 facing the berth. Hook 56d has one or more teeth to engage hooks 962' on containers 24. Optionally bar 1248 can support other hook arrangements such as shown in FIGURE 65. Bar 1248 extends through a hole in bracket 1246 into the bottom end of the inner tube of cylinders 1240 and is secured thereto air tight to form the end of the inner cylinder. The two sets of cylinders for each berth are positioned to extend down each end of container 24 to hook and lift it.

Each outer cylinder 1240 has two stub shafts 1254 secured thereto on a common horizontal axis transverse to car 20''. Each shaft 1254 supports two sheaves 1256. Lift brackets 1246 each have two arms transversely positioned with upturned ends each having a hole 1258 through which the end of a wire rope 1260 is secured. Each of the four ropes 1260 for each elevator 104' is run up and over the sheave 1256 above and run inward and secured and wrapped on drum 1262 secured on the shaft of gearmotor 128' mounted on car 20''. The four cables 1260 support both sets of hooks 56d at equal level to share the load.

A rope 1268 is secured to each arm 1250 to open the hook. Ropes 1268 are similarly run each over a sheave above and to drum 1262 on which they are secured and wrapped. A sheave 1270 rides on each rope 1268. Sheaves 1270 are secured on the rod ends of cylinders 1272 secured to the frame of car 20''. Cylinders 1272 extend to shorten ropes 1268 relative to ropes 1260 to open hooks 56d.

Container 24 is shown riding on a flat car 26d but can be considered riding in a berth in car 26f or 26p, FIGURE 11 or 61, or on a conveyor or other vehicle. Locating means 932' on car 26p guide the container into place and hold it. Car 26d is on track ST'' parallel track T' and can be driven in either direction to align with car 20'' for transfer by any suitable means such as cable 1274 the ends of which are fastened each to an opposite end of car 26'. Additional cars 26' can be positioned and clamped to the cable to register for transfer. Cable 1274 is wrapped on a traction drum 1276 at each end of the trackway ST''. Drums 1276 are each driven by a gearmotor TM' through a clutch 1280 to enable one drum to run free while the other is driven. Motor TM' is controlled by the start timer and circuits shown for motor TM, FIGURE 38.

Referring to FIGURES 84 and 87, alignment lamp 158 is secured to the platform of car 26d to direct light on cells 161–2 to control the field of DYN1 similarly as for DYN2 in FIGURE 38 to vary the speed of motor TM to align car 26d at speed with car 20″ for transfer. When cars 20″ and 26d are in alignment lamp 152 or 153 adjacent each berth on car 26d directs a beam up to respectively photoelectric cell 150 or 151 on car 20″ according to whether the berth on car 26d has a container or not. Output of cell 150 or 151 is amplified by 170 or 171 to energize respectively relay L″ or U″. Elevator 104′ is powered from line 704 or battery 172 through respectively front and back contacts of relay 1298 whose coil is connected from shoe 702 on line 704 to ground. Transfer is reserved by a circuit from line 1300 through normally closed contacts of "cancel" button CB, normally open contacts of button 202 in parallel with front contacts of relay U, coil of relay U, in series to ground. Reservation for lowering the container is held by a circuit from line 1300, limit switch 1301 opened when cylinders 1240 are sufficiently extended, line 1302, normally open contacts of limit switch 178 closed by the container in the berth and front contacts of relays U and 1305 in parallel from line 1302 with front contacts of relay 1306, coil of relay 1306 in series to ground. Reservation for picking up a container is held by a circuit from line 1302, normally closed contacts of limit switch 178 opened when a container is positioned in the berth, switch HS and front contacts of relay 1305 both in parallel with front contacts of relay 1307, coil of relay 1307 to ground. Relay 1305 is momentarily lifted by shoe 426 engaging rail 442 ahead of the transfer run to complete the reservations. Relay 1305 prevents reverse and late transfers. The circuit for driving gearmotor 128′ to unreel ropes 1260 to lower the elevator is from line 1300, line 1308, front contacts 1310 of reversing relay 180′, line 1312, armature of motor 128′, line 1314, front contacts 1316 of relay 180′, in series to ground. The circuit for driving gearmotor 128′ to raise elevator 104′ is from line 1300, line 1308, back contacts 1318 of relay 180′, front contacts of relay 1320, line 1314, armature of motor 128′, line 1312, back contacts 1322 of relay 180′, in series to ground. Reversing relay 180′ is energized by a circuit from line 1300, line 1324, front contacts of relays U″ and 1306 in series in parallel from line 1324 with front contacts of relays L″ and 1307 in series, line 1328, coil of relay 180′, in series to ground. Relay 1320 is energized by a circuit completed from line 1300, limit switch 1332 opened at the upper limit of travel of elevator 104′, line 1334, back contacts of relay 1306, line 1336, coil of relay 1320, in series to ground.

The head ends of cylinders 1240 for each berth are connected to the outlet of air compressor 1340 or exhaust according as valve 1342 for that berth is respectively energized or deenergized. Air forced into cylinders 1240 extend the cylinders when ropes 1260 are unreeled and give added rigidity to the sets of cylinders when extending. Pump 1340 supplies air pressure to four-way spring-returned solenoid valve 1344 which reversely connects this pressure to either the head or rod ends of cylinders 1272 in parallel according as valve 1344 is energized or deenergized respectively to open or close hooks 56″. The coil of valve 1342 is connected in parallel with the coil of relay 180′ to pressure cylinders 1240 when the ropes are unreeled. The coil of valve 1344 is connected in series with front contacts of relay 1346 across the coil of relay 1320. Relay 1346 is energized by a circuit including from line 1334, front contacts 1348 and 1350 of respectively relays 1306 and 1346 in parallel, coil of relay 1346, in series to ground. Gearmotor 128′ turns a threaded cylinder 1352 on which a rider 1354 rides to engage and open limit switches 1301 and 1332 at respectively the lower and upper limits for the elevator.

Operation of monorail elevator

Information that a container is to be removed at the next transfer is stored by relay U. Then with switch HS closed shoe 426 engages rail 440, lifting relay 1305, lifting relay 1306. When car 20″ comes into alignment with car 26d with an empty berth under the container to be removed from car 20″, relay U″ is lifted, lifting relay 180′, lowering the elevator and pressuring cylinders 1240. As soon as the elevator starts to lower, limit switch 1332 closes, picking up relays 1320 and 1346. When the elevator is fully lowered, i.e., when limit switch 1301 is opened, hooks 56d have latched over hooks 962′. The opening of switch 1301 drops relay 1306, closing contacts to line 1336 to energize valve 1344 and relay 1320 and opening contacts 1330 to drop relay 180′ and deenergize valve 1342 to exhaust cylinders 1240. Valve 1344 first connects pressure to cylinders 1272, opening hooks 56d. Then relay 1320, which has a closing delay, closes, reversely driving motor 128′ to reel up ropes 1260 and 1268, lifting the empty elevator until limit switch 1332 is opened, dropping relay 1320 and deenergizing valve 1344 to exhaust cylinders 1240 to drop hooks 56d to latching position.

To pick up a container the berth must be empty, i.e. switch 178 down, and switch HS closed. Then when shoe 426′ engages rail 442, lifting relay 1305, relay 1307 is lifted. When a lighted lamp 152, indicating a full berth, is aligned with cell 150, relay L″ is lifted, energizing relay 180′ and valve 1342 to drive motor 128′ to unreel ropes 1260 and 1268 and respectively pressure cylinders 1240. When the elevator starts down, limit switch 1332 closes, lifting relay 1320. Relay 1346 does not lift, because contacts 1348 remain open. When the elevator extends to where limit switch 1301 opens, hooks 56″ have latched over hooks 962′ on the container. The opening of switch 1301 deenergizes valve 1342, exhausting cylinders 1240, and drops relay 180′, completing a circuit through front contacts of relay 1320 to reversely drive motor 128′ to raise the elevator and container. Alternate trains can be arranged to have containers in alternate berths for geometric transfer, so containers need not be repositioned on the station vehicle.

Referring to FIGURE 88, station vehicle 26d′ can be self-propelled and use the controls FIGURE 38 to align for transfer and/or be coupled for transfer. The container can be located in any berth thereon by moving it on rollers or conveyor 1360 on the bed of the car to the correct spot according to signals from the approaching train and can be locked by wedges 932″ which are inserted in pockets or extended up between the rollers.

Carrier 20″, FIGURE 89, is engaging a vehicle type container 24V′ on concrete guideway SW. Vehicle 24V′ can be an automobile, bus, truck, or a container mounted on wheels. It can be pushed along by a conveyor, engaged and pushed by the train (by an arm or coupling extended therefrom) or driven to train speed as by an operator to align for transfer using a rod 1436 extendible out the front of the container vehicle to meet rod 1438 extended down from the carrier. A lamp 152 on the roof of the container or a limit switch 1440 on rod 1438 closed by rod 1436 controls the extension of elevator 104′ for picking up vehicle 24V′. Vehicle 24V′ can be set off on guideway SW or on flat pavement preferably with steering line 1442 for automatic or manual steering.

Referring to FIGURE 90, the container or vehicle 24 can have hooks 56W for latching on a carrier, elevator, or (as shown) guideway 27′ above to suspend it. Hooks 56W have wheels 1444 which run on V-rails 28′ and can be taken off or left on selectively by action of cylinders 1446 controlled by valve 1448 only when the container is lifted up off rails 28′ by elevator or track elevation.

Container 24V′ can be engaged by an elevator or carrier on an elevator 938 in building 940, FIGURE 91, and taken off railway car 26 or 26d′ spotted under the elevator. The railway car has wheel chocks, FIGURE 83, with brackets 1168 supported on springs 1450 to release and reset the wheel chocks when vehicle 24V′ is lifted off. Container 24V′ preferably has sliding doors.

Variations for side transfer

Referring to FIGURES 92–99, train 16 or 16' includes one or more side transfer cars 26S having one or more side transfer berths STB each for holding a container 24S for side transfer. Containers 24S and 24V' are suited for use with any of the cars or carriers shown with the required hooks added. The station vehicle or container supporting carrier 26d' runs on track ST" parallel both track Tp' and Tp (FIGURES 88 and 95) to serve for both vertical and side transfer.

Side transfer mechanism

A transfer mechanism is provided at each berth on car 26S and preferably has a track 1454 transverse to the car extendible therefrom to straddle container 24S and engage rollers 1456 secured near the top on each end of container 24S. Each rail of the track has an inner arm 1458 and an outer arm 1460 hinged on a pin 1462 secured to the frame of car 26S. A cylinder 1464 is pivotally connected between the outer arm and the frame of car 26S to swing the arm in and out. A cylinder 1466 of larger bore than 1464 is pivotally secured between the inner end of arm 1458 and the frame of car 26S to support the inner arm and control the tilt of track 1454 to run container 24S in and out of car 26S. Up-sweeping curves on the ends of track 1454 gently stop the container at ends of travel. Latch cylinders 1470 have a latch taper on their rod ends to latch the container in car 26S. Limit switches 1472 and 1474 are on arms 1458 and 1460 at respectively the inner and outer ends of track 1454 to be closed when the container is thereat. Two positive displacement pumps 1476 are connected on the shaft of motor 1478. Hydraulic connection is made from tank 1480 to the inlet of each pump 1476 and from the outlet of each pump separately through solenoid valve 1482 T-ed to the head of each cylinder 1464 and extending separately through valve 1484 T-ed to the head end of cylinder 1464 and to the rod end of latch cylinder 1470 separately for each track rail.

The transfer device is controlled by unload and load lamps 152 and 153 on vehicle 26d'. Lamp 152 can be on the container. Lamps 152 and 153 are connected through respectively back and front contacts of limit switch 163 across battery 172 to shine on cells 150 and 151 respectively when the berth on car 26d' is full and empty and aligned with car 26S for transfer. The output of cells 150 and 151 is connected to amplifiers 170 and 171 whose output is connected across relays L" and U" respectively. Valve 1482 connects pressure to the head ends of cylinders 1464 when energized by a circuit from the positive of battery 160, line 1486, normally closed limit switch 1472, front contacts of relay L", left-hand coil of valve 1482 in parallel with hold coil of relay L", to ground of battery 160, to extend the outer arms to lift the container and raise it to roll into car 26S. Limit switch 1472 is opened when the container is in, deenergizing valve 1482, which exhausts cylinders 1464 to tank to return arms 1460. Valve 1482 is also energized by a circuit completed from line 1486, normally closed contacts of limit switch 1474, front contacts of relay U", line 1488, right-hand coil of valve 1482 in parallel with hold coil of relay U", to ground, to extend the outer arms. Valve 1482 connects pressure separately to the head ends of cylinders 1486 to raise arms 1460, completing a circuit from line 1488, limit switch 1490 closed by an outer arm when raised parallel the inner arm, solenoid of valve 1484, to ground, to pressure cylinders 1466 and 1470 respectively to tilt the track and lift the latches to run the container out and to set it down when the outer arms are retracted by opening of limit switch 1474. The tandem pumps and valving synchronizes the cylinders of each rail to lift and tilt together.

The parallel running vehicles are preferably coupled before transfer by a double latch coupling 111 secured on the bottom along the side of car 26S and a coupling pin 109S mounted on parallel arms 1494 to swing in a transverse vertical plane on car 26d' out to engage the coupling 111 on either side when approaching alignment. Pin 109S is positioned by air cylinder 108S pivotally connected between an arm 1492 and the frame of car 26d'. Each end of cylinder 108S is connected to air tank 199 through a valve 169 when energized or to exhaust when deenergized to shift the piston of cylinder 108S from center to either end according to which valve 169 is energized. Valves 169 are each energized by a circuit from the positive of battery 172', ramp switch 870, front contacts of relay 845 and coil of valve 169 for that side, to ground. Lamp 158 on car 26S is connected through switch 1498 across battery 160 to shine on photoelectric cell 161 when approaching alignment. The output of cell 161 is connected across amplifier 834 whose output is across the coil of relay 845 for that side of the car to lift the valve 169 to pressure cylinder 108S to shift pin 109S to that side of the car to engage latch coupling 111. Switch 870 is closed along the transfer run by rail 868, FIGURE 59, and is dropped when the station vehicle is to uncouple.

Automatic container storage yard for bottom supporting station vehicles

Referring to FIGURE 95 for a simple station plan, railroad track TP runs parallel beside station track ST', and monorail track TP' runs over the station track along the transfer run so that one or more station vehicles 26d' can service side transfer cars 26S in train 16 and at other times service monorail trains 16' for transfer of containers 24S therebetween. The station track turns beyond the transfer run and runs parallel to a truck drive TA along side of the storage yard. One or more craneways 1500 run at right angles over track ST', drive TA, and over storage spots SAS, and each has a crane 1501 for transferring containers 24S between truck 46 on drive TA, storage spots SAS, and station cars 26d'.

The station cars are positioned to stop on call stop C1, FIGURE 99, until called for loading to meet a train and after are unloaded and returned to the call stop with similar control as for the carriers at the station, FIGURE 36, where rotary switch SS determines the stop set. Only one station train stop is shown in FIGURE 99, since only one craneway is shown. Additional parallel craneways can be spaced to align adjacent berths on the station cars and additional stops added to switch SS to the left of the fingers similarly as in FIGURE 36.

Each craneway has two I-beam rails 1504 which run along opposite sides of a single row of storage spots and having thereon crane 1501, FIGURES 96–98, having a frame 1506 supported on wheels 1508 which ride on beams 1504, an elevator 104' for lifting a container 24 to a height over containers on the vehicles and storage spots, gearmotor CM connected to drive wheels 1508 of the crane and stopping wheels 1510 for engaging ramp type stop arms 1512 and 1514, FIGURE 97, when set, to lift the crane when it rolls beyond the stopping spot to return it to align.

Stop arms 1512 and 1514 are pivotally mounted at one end to the top of beam 1504 central of the stop to swing in a vertical plane parallel the rail. A hydraulic cylinder 1516 is pivotally connected between a frame 1518 secured to the top of beam 1504 and the outer end of each arm 1512 and 1514 to raise to capture wheel 1510 between them or lower to pass the crane. When wheel 1510 is at a stop it engages a limit switch 1520 having a cam track 1522 mounted on parallelogram linkage to engage the top of wheel 1510 and lift to close contacts on the limit switch to close the stop on wheel 1510 if the stop is set. Wheel 1510 runs up alternate arms of a closed stop until the crane comes to rest aligned for transfer. Brake pads 1524 secured on brackets to the frame of the crane engage the under side of beam 1504 when the crane rides up an inclined arm to quickly stop the crane.

The containers are set down on pads on concrete slabs or runners in the storage area and engage contact plug 68 thereon to connect routing box 230. Lamps 153 and 152 are positioned along side each container spot to direct a beam on respectively cells 151 and 150 on crane 1501 when aligned for transfer accordingly if the spot is empty or has a container ready to be removed from storage. Lamps 153 and 152 are controlled respectively by limit switch 168 and brush 204 in routing box 230.

Storage crane controls

The crane rests between the storage area SAS and vehicle ways ST' and TA and runs to lift a container and carry it to an empty spot or berth only when a container is to be removed and a spot is available therefore under the craneway. Stops are set according to whether the crane is to load or unload either truck 46 or car 26d'. Far stops 1512 (limits of travel) are up before the crane is started, and the near stop, arm 1514, is lifted when the crane coasts into the far stop.

The traction motor CM of crane 1501 is controlled through line CCL run along the craneway. The field of motor CM is connected from shoe 480' on line CCL to ground and the armature connected reversibly through front contacts of relay DF' and DR' and between shoe 480' and ground. The coils of relays DF' and DR' are connected each in series with a rectifier 1530 between shoe 480' and ground to lift when line CCL is positive and negative respectively to drive the crane to the right and left respectively, or as in my Patent Nos. 3,037,461-2.

Control line CCL is divided into a wait section CLW, a section CL1, CL2, etc. each over a vehicle way to the right and a section CL1', CL2', etc. for each storage spot to the left of section CLW. Each section is connected by a line to successive points on a three-position spring-centered selector switch CSS. Each of these lines except that from wait section CLW is connected through back contacts of a relay stop 1512 operated with the solenoid for controlling the far stop for that section. These solenoids, shown connected each to an arm 1512 or 1514, would control the valve for cylinder 1516 omitted from FIGURE 99 for simplicity. Selector switch CSS has a conducting finger 1536 flanked by and insulated from an annular conducting segment 1538 on the left and 1539 on the right all secured to lever 1540 operated by opposed coils. Stationary segments 1542 and 1543 respectively left and right of center are connected to the positive and negative battery 462 or other source and engaged by segments 1538 and 1539 respectively in center position or to positive by both to the right or negative by both to the left of center. The center finger connects a grounded contact in center position of switch CSS only.

For unloading a vehicle circuits are completed from the negative of battery 462, line 1546, back contacts of load-unload relay SL'', line 1548, top normally closed contacts of limit switch 476' closed on each empty storage spot, solenoid of stop 1512 to ground, and from line 1548, next lower normally closed contacts of switch 476', line 1550, that craneway position contact on switch SS, brush 530, annular conductor 531, coil of relay 522, to ground, to hold switch SS, and from line 1548, lower normally closed contacts of limit switch 476' for the first storage spot to line 1552 in parallel with normally open contacts of switch 476' at first stop in series with normally closed contacts of switch 476' of the second spot to line 1552 etc., and from line 1552, lower front contacts of each relay U in parallel to line 1554, coil of relay 1556 to ground, and from line 1552, top front contacts of relay 1556 now closed, back contacts of relay 1558, right-hand coil of switch CSS, to ground. Relay 1556 energizes a holding relay 1560 from line 1552, front contacts of relay 1556 and coil of relay 1560, to ground. Relay 1560 closes front contacts in parallel with the front contacts of relay 1556. Switch CSS rotates counterclockwise connecting positive voltage to all craneway sections to the nearest vehicle setting a stop, and the crane moves to that section disconnected by the stop relay 1512 lifted, coasts, engages the far arm and limit switch 1520 which sets the near arm 1514 blocking the crane wheel in the valley between these stop arms. A lamp 152 on the vehicle shines up on cell 150 on the crane to start elevator 104', FIGURE 87, to transfer. When the container is lifted off the vehicle, limit switch 168, FIGURE 87, opens, extinguishing lamp 152, dropping relays U'' and 1556, deenergizing right-hand coil on switch CSS, which returns to center by spring. Relay 1560 completes a circuit from line 1552, back contacts of relay 1556, front contacts of relay 1560, line 1562, left-hand coil of switch CSS, to ground, to rotate switch CSS clockwise connecting negative of battery 462 to lines to sections of craneway to drive the crane to the nearest empty storage spot, which sets its stop to similarly align the crane for transfer. Lamp 153 shines on cell 151, FIGURE 87, on the crane to set the container on the empty spot aligned. Then limit switch 476' is engaged, light 153 extinguished, stops thereat released, coils of switch CSS deenergized to return the switch to center to set the waiting stop for the crane, which returns empty.

A routing card 200 is placed in the box 230. When the train for the container approaches it signals its number, as described with FIGURE 26, to each container in the storage area to position brush 258 over a hole in the card. When the train reaches way point 5, FIGURE 27, the loading signals on reserved cars are transferred to car 26d' on call spot where shown, lifting relay L' in berths which can be loaded. After the train passes way point 5, shoe 320 engages rail 456 resetting the stepping switches and lifting relay SL' to start loading. Car 26d' aligns the first berth to be loaded under the craneway similarly as carrier aligns for transfer at the station, FIGURE 36, using corresponding controls shown in FIGURE 99.

Shoe 502 is connected to the negative of battery 172' through normally open contacts of switch 168 closed by a container in the berth on car 26d'. Relay L' is connected between shoe 426 for each berth and ground for receiving energy from the call line section C1, C2, etc. corresponding to that berth and closes a holding circuit from the positive of battery 172', contacts of limit switch 168 closed when the berth is empty, front contacts and coil of relay L' for that berth, to ground. Relay L' closes a circuit from the positive of battery 172', normally closed contacts of limit switch 168, front contacts of relay L', shoe 502 for that berth engaging a stop 501 or a line 504 on each side of each stop 501. Each line 504 and stop 501 is connected to a corresponding brush on switch SS through front and back contacts of relay SL' respectively in series with a rectifier 1570 and 1571 to pass respectively current from the positive and negative of battery 172' to pass leading signals when SL' is lifted and unloading signals when relay SL' is dropped, for controlling relays CF, CS, and CR to control the voltage on line CL as in FIGURE 36, to align cars 26d' for transfer with a craneway having thereunder one or more containers for the train or empty spots according to whether relay SL' is lifted or not. Relay SL' closes a circuit from the positive of battery 462, line 1574, bottom front contacts of relay SL', coil of relay SL'', to ground, to start loading for car 26d'. The truck driver can operate load button 1576 from his cab when aligned, connecting a circuit from the positive of battery 462, line 1578, button 1576, coil of relay SL'', to ground, to load the truck with a container whose card 200 is out.

When car 26d' or truck 46 has positioned a berth for loading under the craneway, lamp 153 on the car or truck shines on cell 151 preferably along side, lifting relay L for that way. When relay SL'' lifts it closes loading circuits from the negative of battery 462, line 1546, front contacts of relay SL'', line 1580 run through back contacts of a relay 1582 for each storage spot line 1580 branching at each storage spot to contacts of receptacle 68 connected by brush 258 on each container for that train or truck, line 1584 for each storage spot, contacts of limit switch 476' closed by the container thereon, solenoid for stop arm 1512 to ground in parallel with solenoid for stop arm 1514 and limit switch 1520 to ground, and from line 1584, lamp 152 to ground, and from line 1584, coil of relay 1582 to ground, and from line 1580, upper front contacts of all relays 1582 in parallel to line 1550 to holding contact for that craneway on switch SS, and from line 1580, lower front contacts of relays L to line 1588 each after the first through back contacts of the preceding for each vehicle way under the craneway, and from line 1580 or 1588, upper front contacts of relay L, solenoid of far stop for that way in parallel with solenoid and limit switch for the near stop for that way, to ground, and from line 1588, lower front contacts of relays 1582 in parallel to line 1590, coil of relay 1556', to ground, and from line 1588, top front contacts of relay 1556' now closed, back contacts of relay 1558', left coil of switch CSS, to ground. Relay 1556' closes front contacts in parallel with front contacts of relay 1560' between line 1588 and coil of relay 1560', to ground, to hold relay 1560' when relay 1556 drops. Switch CSS rotates clockwise connecting positive voltage to all craneway sections to that at stop set at nearest storage spot with container to be loaded. The crane moves to that section disconnected by the stop relay 1512 lifted, coasts, engages limit switch 1520 to lift near arm 1514, blocking the crane at the stop. Lamp 152 for that spot shines up on cell 150 on the crane to start loading, which proceeds as described with FIGURE 87. When the container is lifted off receptacle 68 the crane stops are dropped, light 152 extinguished, relay 1582 dropped connecting line 1580 to the next container to be loaded after a delay sufficient for relay 1556' to drop to deenergize the left coil of switch CSS and close a circuit from line 1588, back contacts of relay 1556', front contacts of relay 1560', coil of relay 1558', to ground, to hold the left-hand coil of switch CSS deenergized if another container to be loaded closes relay 1556' after the delay. The dropping of relay 1556' completes a circuit from line 1588, bottom back contacts of relay 1556', front contacts of relay 1560' right-hand coil of switch CSS, to ground, reversing switch CSS to drive the crane to the right to the nearest stop set which is at the car to be loaded. When aligned, light 153 on the car controls elevator 104' to lower the container onto the car. When the container is set down, limit switch 168', FIGURE 87, is opened, extinguishing light 153, dropping relay 1560' and deenergizing switch CSS to return to center to return the crane to wait at CLW, and dropping relay 1558 to enable the left-hand coil of switch CSS to be energized again for transfer. Lamps BL and BU are connected in series with front contacts of relay L and U respectively for the truckway across lines 1552 and 1588 respectively and ground, so the truck operator can see when he has aligned for transfer.

When cars 26d' are loaded to meet the train according to train direction relay TL or TR lifts to set stop S6 or S7 respectively. Track circuit relay 696 is dropped by either a monorail or railway train in the vicinity of the station. Connection is made from the negative and positive of battery 462 respectively through front and back contacts of relay TL to front contacts of relay 676 to line CL as a simplified way to set stop S6 or S7 for the station vehicle to wait for the train and after transfer to return it to the station.

As a further simplification of FIGURE 99 over FIGURE 36, limit switch 168 for each berth on each carrier connects shoe 502 for that berth to the negative of battery 172' for unloading, but these signals are only received at the station when relay SL' is deenergized, connecting to contacts on switch SS through rectifier 1571 to pass only the unloading signal, thus eliminating relays U' from the carriers and rail 442 and ramp 433 from the station way. Circuits or features for successive starts, transfer run, and recoupling and return can be as in FIGURES 28, 37, and 38 respectively for the station of FIGURE 99, and controls and features of other figures can be added or substituted.

Container exchange transfer for full loading and high volume transfer

Referring to FIGURE 100, all containers 24p in car 26p can be transferred out and replaced with other containers 24p on one transfer run by two carriers 20T connected in tandem and controlled as in FIGURES 28 and 38 as modified by FIGURE 100 to regress between alignments of the rear and forward carriers 20T with car 26p on the transfer run. Each carrier 20T has trucks 96 spaced apart to align trucks on car 26p and a number of container berths each with an elevator 104 arranged to register with the container berths on car 26p. Each carrier has photoelectric cells 161 and 162 each connected through an amplifier 834 to respectively lines 1601 and 1602 each connected between carriers through front contacts on relay 845' on the carrier on the left and flexible leads. Lines 1601 and 1602 are connected alternately to relays 837 and 838 through reverse switch 714 to vary the speed of the carriers to align either carrier receiving light on cell 161 or 162 from lamp 158 on car 26p at speed in either direction as in FIGURE 38. Each carrier has a relay 845' with a coil connected from each of lines 1601 and 1602 to ground. Each relay 845' is the same as relay 845 except the dashpot is omitted and a hold coil added. Relay 845' on the carrier at the left has its hold coil connected from the positive of battery 172, contacts of limit switch 196 opened when the elevators on that carrier are at top, front contacts and bottom coil of the relay 845' to ground. The relay 845' on the carrier at the right has its hold coil connected from the positive of battery 172 back contacts of relay 845' on the left, flexible connection to line 1606 on the carrier at the right, contacts of limit switch 196 opened by elevators up, front contacts and bottom coil of relay 845' on the carrier at the right, to ground. The coils for the coupling pin 109' on each carrier are connected similarly as in FIGURE 38.

Way points 1–5 are not required for rapid transit, geometric transfer, or for car-full exchange transfer. Way point 6 is omitted for oneway operation on one track or if the carrier is always positioned at the required end of the transfer run ahead of the train. Shoe 644 engages rail 642 for the transfer run just ahead of way point 7 so that DYN1 can start motor 640 of timer 630 to bring drum 638, FIGURE 28, up to speed before a shoe such as B1 on car 26p engages rail 1rB1 to lift relay 632 to start the time interval substantially inversely proportional to train speed before the timer connects line CLT to DYN1 to complete the speed control circuit between the dynamos DYN1 and DYN2 to accelerate the carriers almost to train speed just ahead of alignment of the rear carrier with car 26p. When lamp 158 dwells on cell 161 at the left sensitive relay 845' on that carrier lifts, connecting the coil of the solenoid 844 for that carrier across battery 172 to lower the rear coupling pin 109' to latch with coupling 111 on car 26p to hold the rear carrier (then empty) in alignment for transfer. When the elevators remove the containers from car 26p as described with FIGURE 15 lamp 158 is extinguished, dropping relays 837 and 838, the elevator returned to top, opening switch 196, dropping relay 845' and lifting pin 109' on the rear carrier to slow as controlled by relays 837 and 838. Relays L and U have dashpots to delay relighting of lamp 158 until the carrier drops back so lamp 158 is ahead of the cells just aligned. Relay L closes to relight lamps 158 and 153 before the front carrier aligns for reloading car 26p. When containers 24p are inserted into cap 26p as described for the elevator FIGURE 15 the circuit of lamp 158 is opened by switch 168 on car 26p, dropping relays 837 and 838. When the elevator is returned, switch 196 is opened to drop relay 845 for pin 109' on the front carrier to lift. The carriers are slowed and continue on transfer run speed control. Relay U closes preferably after the transfer run to relight lamps 158 and 152. The carriers and controls can be used for traffic in both directions.

FIGURE 101 illustrates some variations over FIGURE 100 to further increase the capacity; one or more additional cars 26p are added in train 16p for transfer either in sequence of selectively to provide more time for unloading and reloading the containers in the train; larger containers 24L, one per car, with a plurality of doorways with doors 931 on each side; and one coupling pin 109' on the carrier for inserting in a number of latch heads 111 to align the container spots. The carriers can be operator controlled from cab 920 and pin 109' lowered ahead of alignment. When the container 24p on the left of FIGURE 101 is removed to the carrier above, pin 109' is lifted, the carriers slowed to coupling speed, pin 109' lowered ahead of the next latch block 111 for engaging therewith to align the forward carrier on the emptied car to transfer the container on that carrier to the empty car.

As an alternative to regressive alignment carrier 20A, FIGURE 102, has two sets of berths arranged abreast, one side full of containers and the other side empty, and alternate sides aligned with the berths on the transfer car for removing the containers thereon first and then for loading another set therein. This can be accomplished simply by a jog 1616 in the carrier track ST", FIGURE 103, separating the portions of the transfer run aligning the sets of berths for unloading and loading, or the railway track can have the jog to accomplish the same alignments.

The same containers that handle passengers at rush hours can handle mail sacks or express at other times or in a separate compartment 1654, FIGURE 101.

Referring to FIGURE 104, stations PA1 and PA2 on a two-track right-of-way are connected by a station track ST over each railway track Tp. The station tracks ST are connected at the stations so that the incoming carriers are switched in behind the outgoing loading carriers, so that carriers can enter and leave any time without conflict. The containers 24p can be set down at the loading spot at each station and be picked up by the elevators 104 that are in the berths required for loading each train.

Monorail carrier with container bottom hooks

If large containers or semitrailers are to be transferred it is preferred to lift and support them along the bottom to reduce the structural requirements of the container over that required when lifted on the sides or top. Accordingly a carrier 20ST for lifting semitrailer or container 24ST along the bottom is shown in FIGURES 105–107. The carrier has a frame 94R with raised center to reduce the overall height required, a hook frame 1622 supported on the bottom of double parallelogram linkage 1624 which can be actuated by a hydraulic cylinder connected in a usual way or as shown elevator 104SL is operated by nut 1626 on threaded rod 1628 the output shaft of gearmotor 286' gimbal mounted to the frame of carrier 20ST to lift and lower the elevator, coil springs 1630 which help counterbalance the weight of the hoist, and hooks 56L pivotally secured above the container to swing transversely on each side of frame 1622 and extending down each side of the container to latch under the bottom of the container. Each hook 56L has an upward and inward extending latch 1634 pivotally secured at the bottom on pin 1636 to swing in under the container, a stop 1640 limiting inward movement of the latch, a spring 1642 additional to gravity forcing the latch inward, and a roller or wheel 1644 on the latch to ride down the side of the container. Pockets 1646 along the sides of the bottom of the container receive the top ends of latches 1634 to hold the container. The hooks latch over the container when lowered thereon and cam open when lowered below latching position by an upper cam 1650 engaging the top edges of the container which pushes the hooks open. Dashpots 964 or other means holds the hooks open for removal from the container.

As a further alternative the elevator can be rope operated as in FIGURE 108 with ropes hoisted and controlled as in FIGURE 87, linkage 1624 serving to align frame 1622 as an alternative to telescoping cylinders 1240.

The semitrailer can be set down on wheel chocks, FIGURE 106, which are similar to the wheel chocks of FIGURE 83 except plates 1176 have up-standing brackets 1658 added for engaging the wheels and can be mounted on top of the floor of car 26f, or the semitrailer can be set on locking pedestals preferably as described with FIGURES 108–111.

Hook operated latch downs

Referring to FIGURES 108–111, the container 24f can be a semitrailer, vehicle, platform, or other load bearer and is preferably locked down with locking pins 1660 rather than depend on locators or nonlocking pins 68 to hold it on the transportation vehicle. The semitrailer or container 24f is set down on pedestals 1662 each having a stationary latch pin 1660 extending upon top which inserts in housing 1664 tapered to receive the pin. A latch hook 1666 is pivotally secured in housing 1664 on pin 1668 between walls thereof to swing against pin 1660 and latch therewith. A keeper block 1670 slides up and down in the housing against hook 1666 opposite pin 1660 to keep the hook engaged with pin 1660. Block 1670 has a bottom pocket 1672 into which up-pointing finger of latch 1634' engages to lift the block. Hook 1666 has an arm 1676 extending over block 1670 engaged by the block when pushed up to pivot hook 1666 on pin 1668 to release pin 1660 as hooks 56L lift the load off pedestals 1662. Outward travel of block 1670 is limited by pin. The latch hooks remain open until the load is set down. Spring 1678 aids gravity in lowering block 1670 and so aids in latching hook 1666. Pedestals 1662 elevate the load to provide room for the wheels of semitrailers above the floor and can be made to be lowered or removed for other loading on vehicle 26f.

This and various other features can be applied to various embodiments and various other combinations made within the spirit and scope of this invention. Various cooperating items can be added in this system such as conveyor and lift sections to unload, handle, turn, space, and reload containers onto carriers at stations according to train requirements. Some safety features which would be included are elevator type door locks to prevent transfer unless containers and partition doors are locked closed, limits to prevent late transfer, means to prevent faulty transfer or stop train, check circuits, and reserve power supply means. Various forms of this invention are described as combined or combinable in one system. The passenger cars can have an aisle on both sides of the container for quicker loading and unloading, or a row of containers can be placed on each side of the cars, with or without center aisle and extra wide cars.

This invention is not limited to the embodiments described and illustrated, since it may receive a variety of expressions which will be apparent to those skilled in the art. The structures, arrangements, operations, and controls described are intended as a beginning and not necessarily final and can be modified considerably and accessories and safety features added or changed and control features made more or less automatic or manual as desired all within the scope of my invention as defined by the appended claims.

I claim as my invention:

1. A container routing system comprising, a railway system, at least one train thereon, at least one container car in said train, at least one container therefore, a plurality of stations on said system, a station way for each said station including at least one transfer run along the railway of said system for a distance for transfer of said container between said car and said way, a storage spot for said container at said station, first means for transferring said container between said spot and said way, second means for moving said container on said way between said first means and said car to align for transfer, and means for transferring said container between said car and each said way controlled by the alignment, record and reading means for determining the route for each said container, and means for signaling the approach of each said train to each said station to control said first and second means to remove from storage, start, and align the containers for transfer only to a said train which takes them on their route controlled by said record and reading means, means for progressing said record means to follow movement of the train for each said container thereon.

2. A system as in claim 1, said record and reading means controlling the removal of each said container to be transferred off the train at the station recorded therefore.

3. A system as in claim 1 said transfer run being a station track along side at least one track of said system, said first means being a craneway with crane for transferring said container to and from at least one said storage spot automatically.

4. A system as in claim 1 said railway system including both monorail and railroad and at least one said transfer run being under said monorail and along said railroad for transfer with either.

5. A system as in claim 1 said transfer run having a dip for transfer, said second means being at least one container carrier on said suspended track, a dip bypass in said suspended track over the dip, said suspended track having a gage wider than the frame of said carrier thereon, and switches connecting the ends of said dip and bypass whereby said carrier can run selectively either through or over the dip.

6. A system for transferring loads to and from vehicles and comprising in combination at least one transfer vehicle, a first vehicle way, a train thereon, at least one car with at least one container in said train, a second vehicle way parallel said first, means for moving said vehicle on said second way at train speed and for coupling with said car in alignment for transfer, transfer means for transferring said container selectively either to or from said vehicle and car and means for controlling said transfer means to operate to transfer no more than once each time and only when aligned and coupled for transfer.

7. A system for coupling and uncoupling successive station vehicles with preselected cars in two guideways adjacent for a distance a plurality of container carrying vehicles on each, a train on one said guideway, the said vehicles thereon being cars in said train, each said vehicle on one said way having a parallel vehicle coupling extension, each on the other guideway having, a coupling latch block for coupling therewith for a transfer run, and selective means for extending successive said pins to engage successive said vehicles as the train passes and means for transferring the containers between adjacent coupled vehicles as they move along the distance where said guideways are adjacent.

8. A system as in claim 7 said vehicles which are the station vehicles having brakes set in advance of the train and means controlled by said coupling for releasing said brakes while coupled for the transfer run.

9. A system as in claim 7 and means for controlling the coupling position to restrict coupling to a safe speed difference.

10. A system as in claim 7 and means for disengaging coupling between the parallel running vehicles each successively one vehicle length in the direction opposite to travel.

11. A system as in claim 7 said vehicle ways being side by side parallel linkage suspending said pin for shifting from side to side for coupling on either or neither side according to position.

12. A first and a second substantially parallel way, nonstop vehicle means on said first, a container set thereon, station vehicle means on said second having an empty and a full complement of container berths for removing said set and replacing with another said set, and means for shifting alignment between removal and replacement of said set while said vehicles are parallelly operated.

13. A container storage and transfer system comprising in combination, at least one transfer container, a container storage yard therefore, a railroad track, one or more container cars thereon, a container carrier track suspended over said storage yard and extending lengthwise along and over said railroad track for a distance, conveying means for said container, run at right angles to said carrier track in said yard, and elevator means for transferring said container between said carrier and said conveying means, said conveying means having discrete spots for containers and means for shifting said conveying means to align a spot for a container under said carrier.

14. A system as in claim 13, said elevator being under said conveying means comprising a plurality of dolly runs each having a plurality of container dollies thereon each for receiving a container and means for shifting said dollies back and forth under said carrier track to align a dolly for transfer of a container.

15. A system as in claim 14, each said dolly having two separated sides connected only at the ends of the dolly run for straddling the elevator, said elevator being below the carrier.

16. A system as in claim 13, said elevator means being on said carrier and having stationary and telescoping guides thereon, sheaves at the tops of the stationary guides, sheaves at the bottom on the telescoping guides, lift cylinder means having a sheave on its rod end standing up on said stationary guide, roping and drum means therefore around said sheaves and hook means carried by said rope to and from engagement with a container.

17. A system as in claim 13, and a double latch vertical coupling between said carrier and each said car, and including a vertically floating pin.

18. A system as in claim 13, and automatic routing means for the container.

19. A system as in claim 13, and way points along said railroad track for signaling approach of the train, its number, determining transfers, reserving cars and carriers for transfer, signaling loading to carrier, signaling for carrier to load, starting carrier to align car for transfer of one or more said containers, resetting station signals, and for returning carrier to station after the train passes.

20. A system as in claim 13 and an elevator for said container on said car for transferring said container between said carrier and car, said elevator having telescoping vertical guides which interlock with said container to steady said elevator.

21. A carrier as in claim 13 having a wide frame so that the container can be lifted up through the carrier by an elevator in a building.

22. A carrier track as in claim 13 and a switch therein having sections which are vertically inserted to switch the switch.

23. A container transfer system comprising in combination: a railroad track, a train thereon having at least one container car, a container transfer run over said railroad track, a transfer dip which extends down and back up in said transfer run, at least one container carrier on said transfer run, support means for suporting at least one container for transfer between said car and said carrier, said support means controlling transfer of said container between said carrier and car at the bottom of the dip, and means for aligning and moving said carrier and car together through said transfer dip to transfer said container.

24. A system as in claim 23, said support means being hooks on said carrier which swing open and closed on the container as it passes the bottom of the dip and selective means for holding said hooks open to set the container on said car or to latch closed to lift the container off the car as the car and carrier pass the dip together.

25. In a system as in claim 23, said last means being a vertical coupling and means for selectively engaging said coupling to couple only the intended said car and carrier.

26. In a system as in claim 25, said coupling comprising a double latch block on one carrier and a vertical cylinder on said car, said cylinder having a ram which extends up to latch with said latch block from either direction when aligned for transfer.

27. In a system as in claim 23, said transfer run having vertical switches and track for bypassing over said dip, said suspended track having a gage wider than said carrier and container, said carrier having wheels extending outward from the carrier to run in said suspended track whereby the carrier with container can pass over the dip for movement to either end of the transfer run before and after transfer.

28. A wide gage suspended-track switch having opposite facing rails, two opposite rail drop sections, centrally pivoted arms suspending said sections secured on opposite ends of said arms to alternately drop in place between opposite rails and lift out, means for supporting each said section when dropped into running position, frame means for suspending said arms at said pivots to swing in vertical planes, and means for actuating said arms to seesaw together to throw said switch.

29. A container carrier for a wide gage suspended track, a container, said carrier having an opening through which said container can vertically pass and hook means on said carrier and on said container beyond the vertical projection of the container for securing said container on said carrier so that the container can be lifted vertically up to engage the carrier and lifted vertically off of these hook means up through the carrier.

30. In a container transfer system an elevator for lifting the container off of a vehicle, said elevator having: lifting means for engaging the container from above, a floor which swings out from under as it extends down to engage the container and swings back under below the space for the container as the elevator rises, and means including an elevator hatch door for removing the container from the elevator at an upper level, said floor protecting the hatch opening when said door is open and said container is out.

31. A routing tape reader for mounting on a container for routing it on trains and comprising means for driving the tape in one direction according to travel of the container, tape reading means adjacent the tape, means for driving said reading means at substantially right angles to the tape to a position representing a train code when the train approaches the station where the container is and for resetting the reading means after the reading, and routing tape therefore recorded in station spots in the direction of tape travel and train code spots transversely located with respect thereto, said spots being read to transfer the container.

References Cited

UNITED STATES PATENTS

| 822,777 | 6/1906 | See | 104—20 |
| 828,340 | 8/1906 | Rice | 104—20 |
| 881,377 | 3/1908 | Cook | 104—20 |
| 2,981,830 | 4/1961 | Davis et al. | 104—88 |

ARTHUR L. LA POINT, Primary Examiner

D. F. WORTH, Assistant Examiner

U.S. Cl. X.R.

104—88